US010305405B2

(12) United States Patent
Kitou et al.

(10) Patent No.: US 10,305,405 B2
(45) Date of Patent: May 28, 2019

(54) SPEED COMMAND CORRECTION DEVICE AND PRIMARY MAGNETIC FLUX COMMAND GENERATION DEVICE

(71) Applicant: DAIKIN INDUSTRIES, LTD., Osaka-Shi, Osaka (JP)

(72) Inventors: Minoru Kitou, Osaka (JP); Nobuki Kitano, Osaka (JP); Naoto Kobayashi, Osaka (JP); Hiroshi Hibino, Osaka (JP); Ryou Matsuyama, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/767,876

(22) PCT Filed: Oct. 27, 2016

(86) PCT No.: PCT/JP2016/081865
§ 371 (c)(1),
(2) Date: Apr. 12, 2018

(87) PCT Pub. No.: WO2017/073659
PCT Pub. Date: May 4, 2017

(65) Prior Publication Data
US 2018/0309398 A1 Oct. 25, 2018

(30) Foreign Application Priority Data

Oct. 29, 2015 (JP) ................................. 2015-212695
Jan. 6, 2016 (JP) ................................. 2016-000865
Mar. 7, 2016 (JP) ................................. 2016-043398

(51) Int. Cl.
*H02P 1/00* (2006.01)
*H02P 21/05* (2006.01)
*H02P 21/20* (2016.01)

(52) U.S. Cl.
CPC .............. *H02P 21/05* (2013.01); *H02P 21/20* (2016.02)

(58) Field of Classification Search
CPC .............. H02P 6/10; H02P 21/06; H02P 21/22
See application file for complete search history.

(56) References Cited

U.S. PATENT DOCUMENTS 6,501,243 B1 * 12/2002 Kaneko ............... B60L 11/1803
318/139
2004/0169482 A1 9/2004 Maeda
(Continued)

FOREIGN PATENT DOCUMENTS

JP 2551132 B2 11/1996
JP 3874865 B2 1/2007
(Continued)

OTHER PUBLICATIONS

International Search Report for PCT/JP2016/081865 dated Jan. 31, 2017.

*Primary Examiner* — Karen Masih
(74) *Attorney, Agent, or Firm* — Birch, Stewart, Kolasch & Birch, LLP

(57) ABSTRACT

A subtractor subtracts an angular speed correction amount from a rotational speed command to obtain a corrected rotational speed command. An adder adds a second-axis current correction value to a γc-axis current to obtain a corrected second-axis current. An angular ripple extraction unit obtains, from a rotational angle on a mechanical angle of a synchronous motor, a rotational angle difference being a ripple component of the rotational angle. An $n^{th}$-order component extraction unit extracts $n^{th}$-order components of a fundamental frequency of the rotational angle from the rotational angle difference. A torque conversion unit obtains $n^{th}$-order components of an estimated value of vibration (Continued)

torque. A correction amount calculation unit obtains the second-axis current correction value using the $n^{th}$-order components.

25 Claims, 34 Drawing Sheets

(56) References Cited

U.S. PATENT DOCUMENTS

| | | | |
|---|---|---|---|
| 2012/0212167 A1* | 8/2012 | Wu | H02P 6/14 318/400.13 |
| 2015/0229258 A1 | 8/2015 | Araki et al. | |
| 2015/0311846 A1 | 10/2015 | Araki et al. | |

FOREIGN PATENT DOCUMENTS

| | | |
|---|---|---|
| JP | 2008-48570 A | 2/2008 |
| JP | 2011-176950 A | 9/2011 |
| JP | 2014-50172 A | 3/2014 |
| JP | 5494760 B2 | 5/2014 |
| JP | 5556875 B2 | 7/2014 |
| WO | WO 03/071672 A1 | 8/2003 |

* cited by examiner

F I G. 1
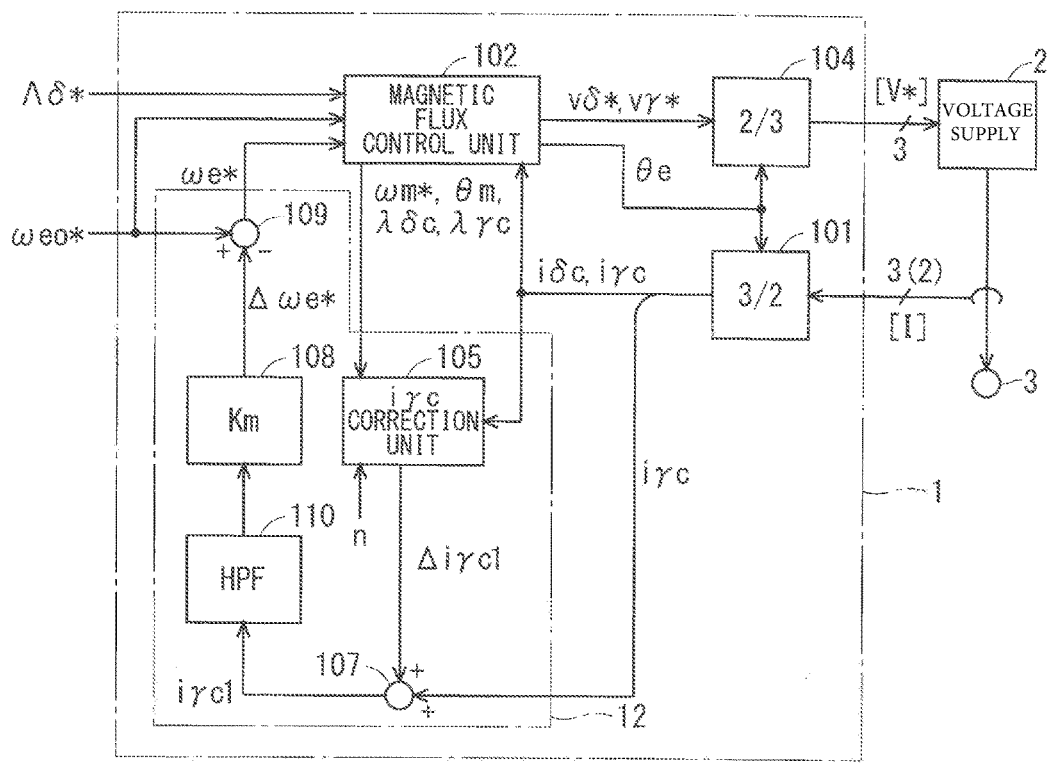

F I G . 3
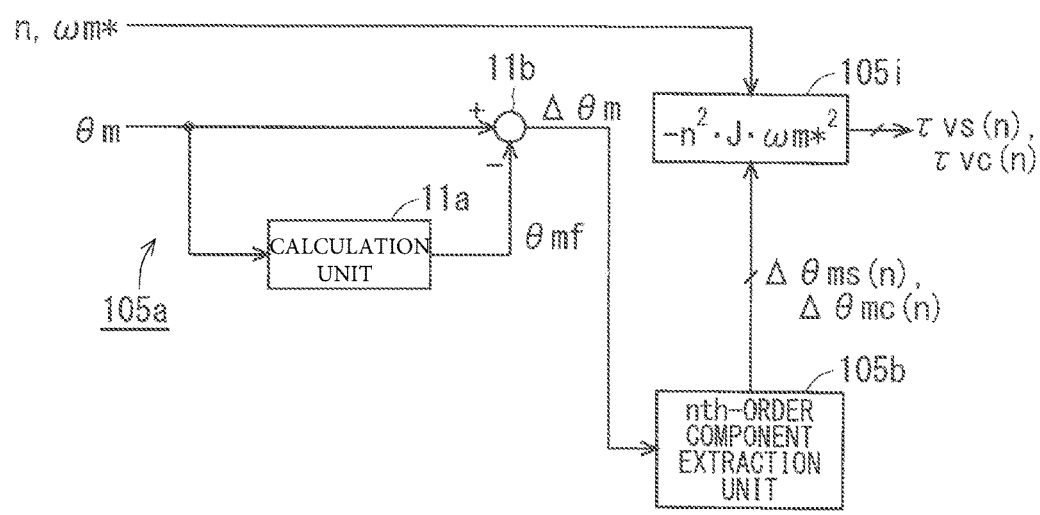

F I G. 5
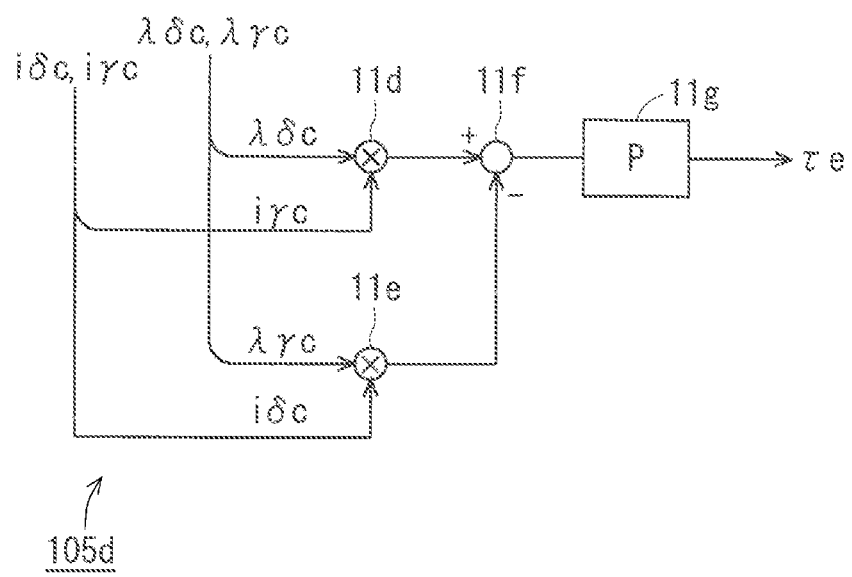

F I G. 6
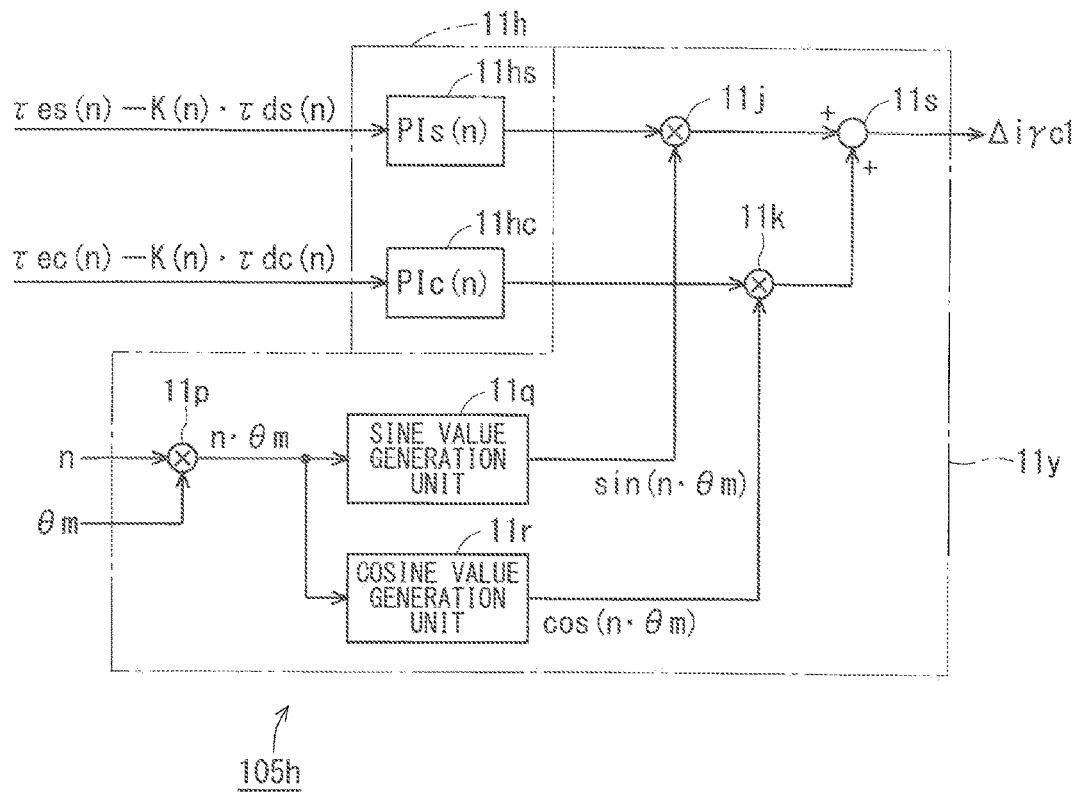
F I G. 7
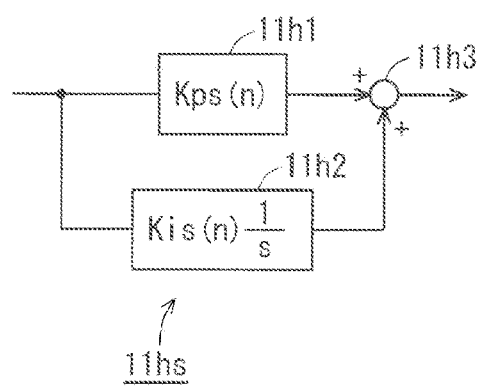

F I G . 1 2
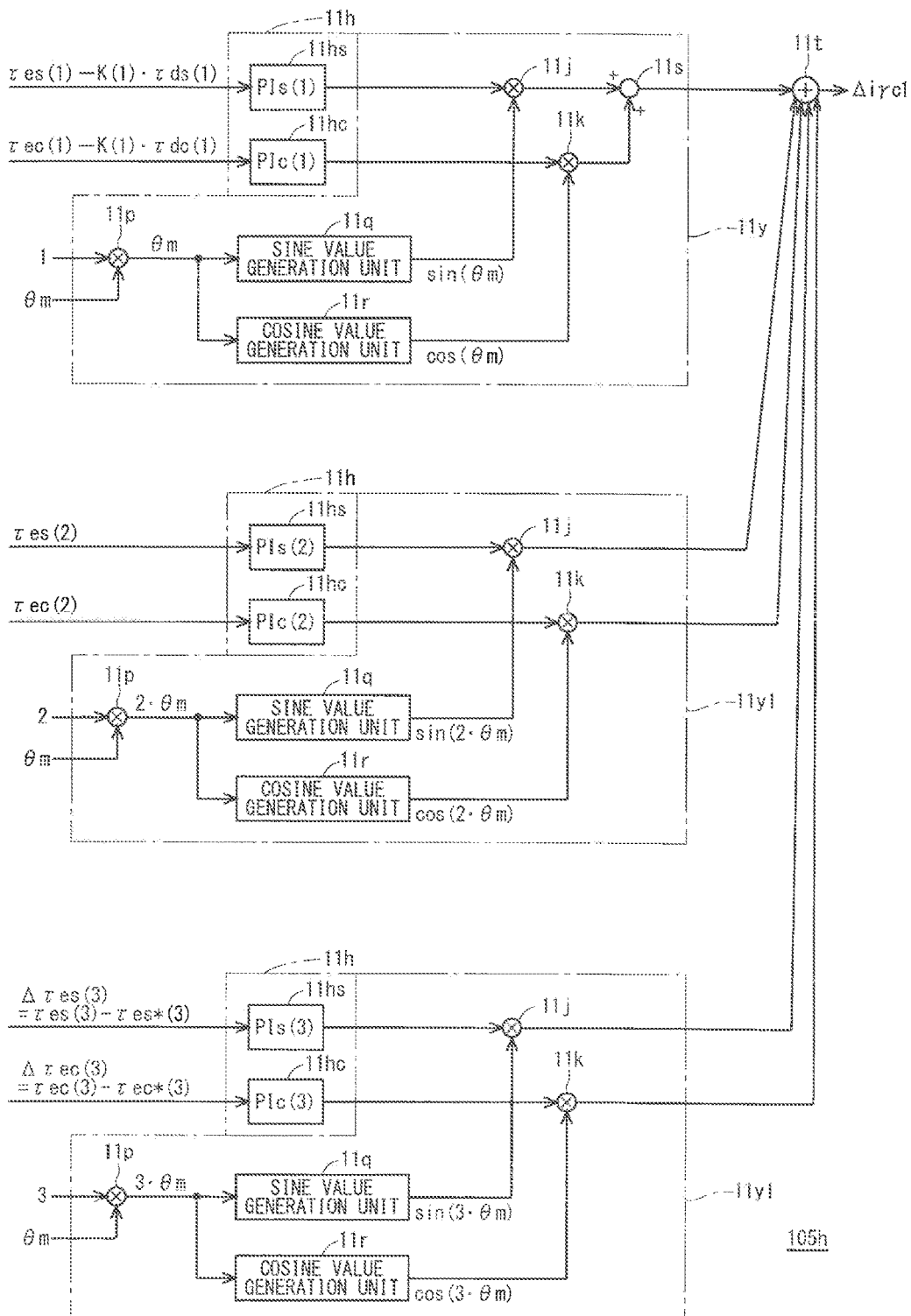

F I G. 1 4
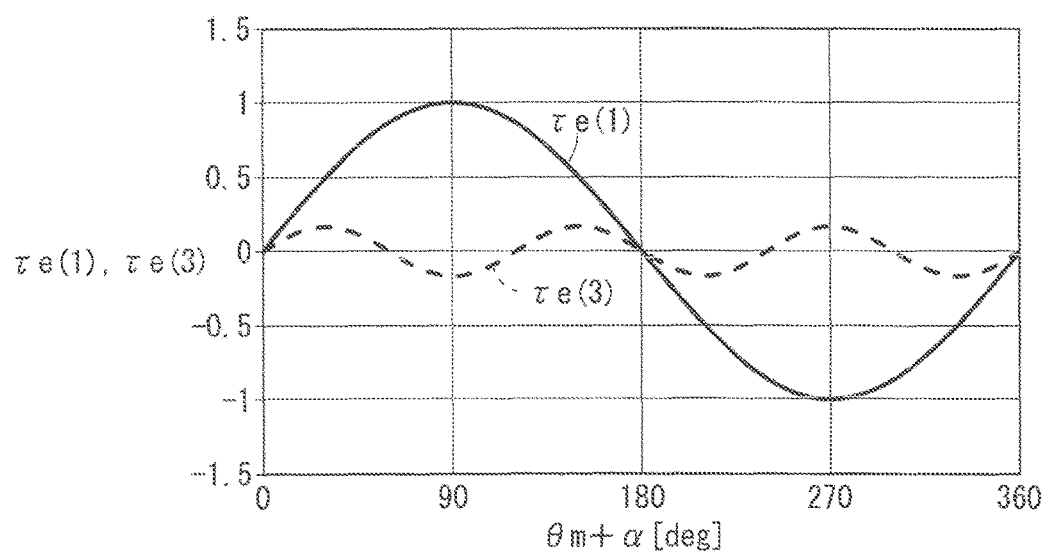
F I G. 1 5
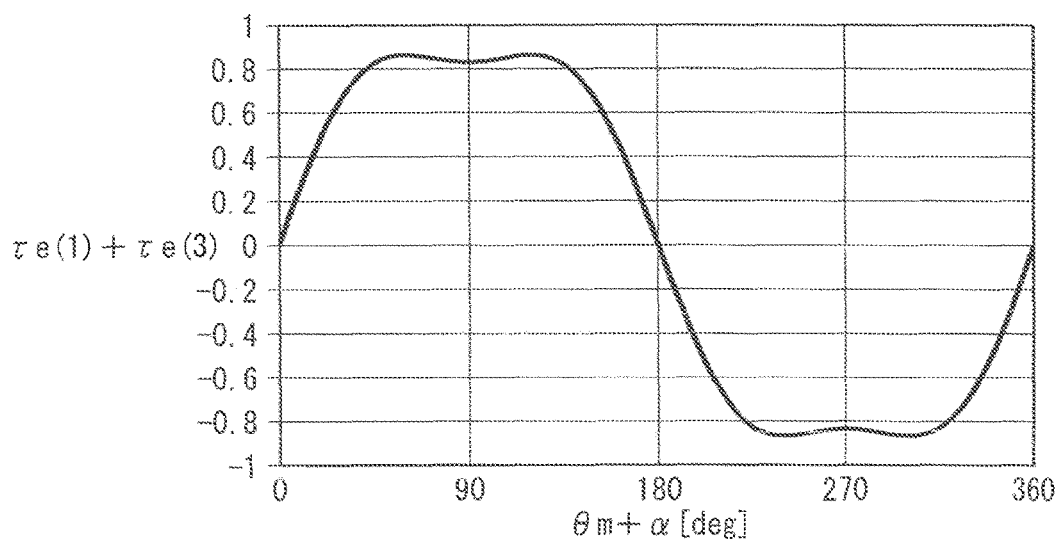

F I G. 1 6
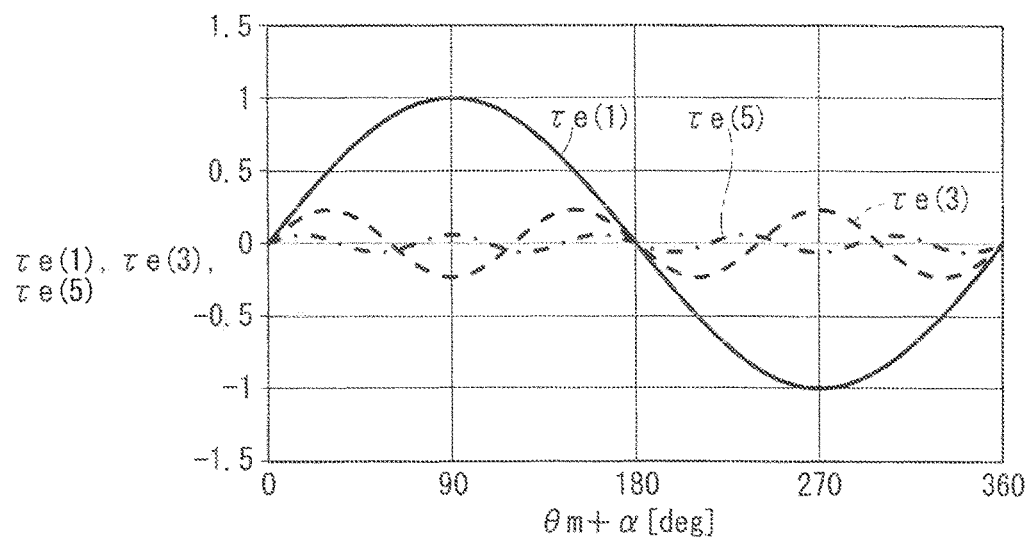
F I G. 1 7
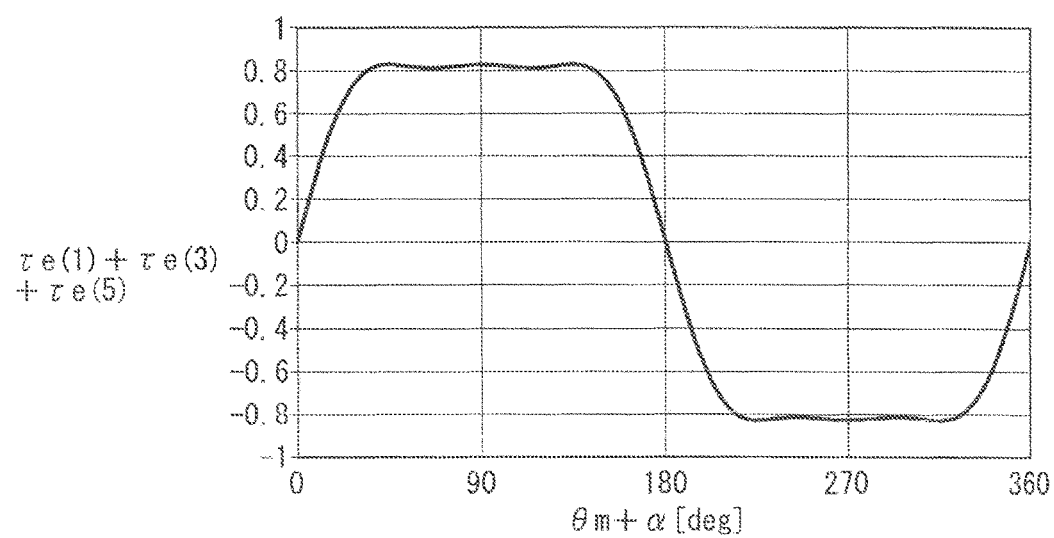

F I G . 1 9
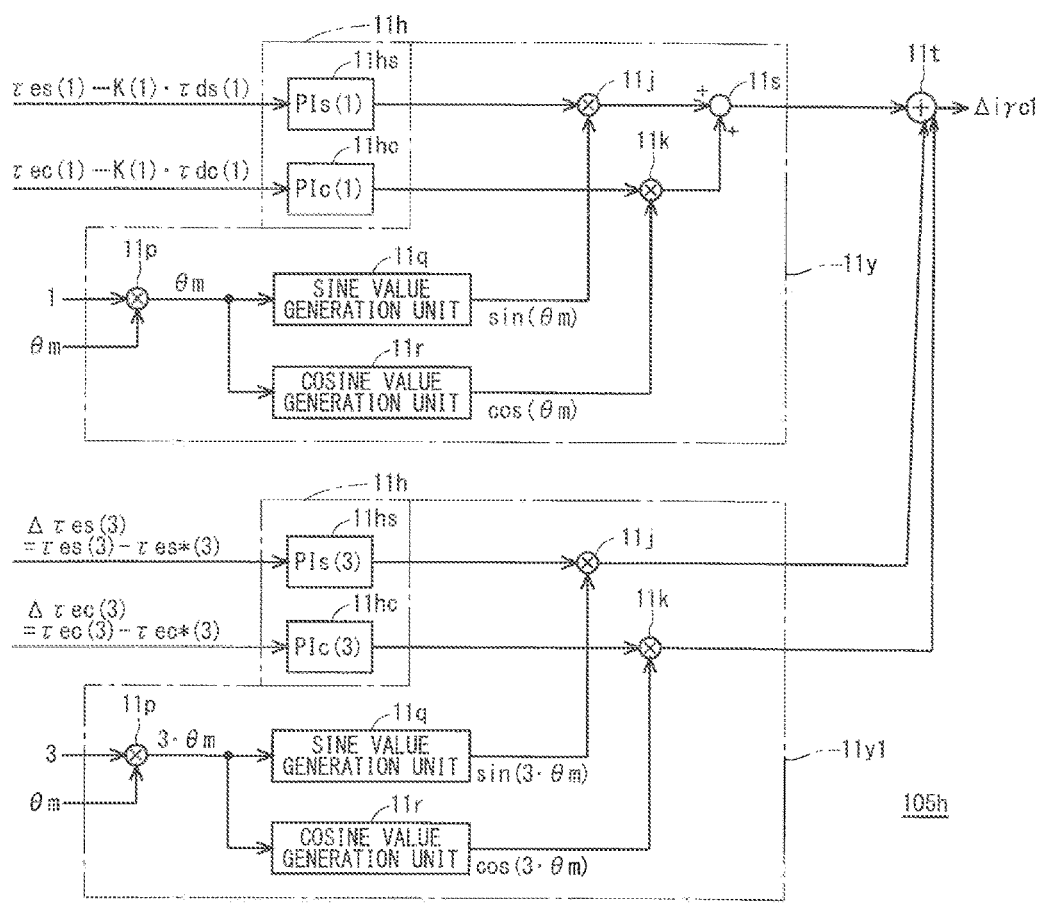

F I G. 2 3
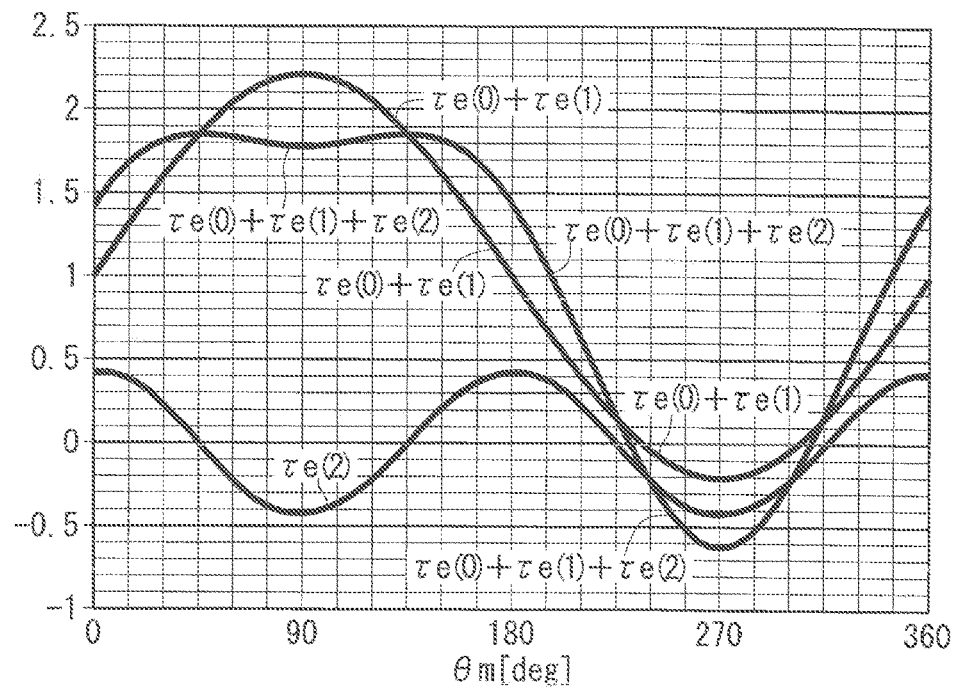
F I G. 2 4
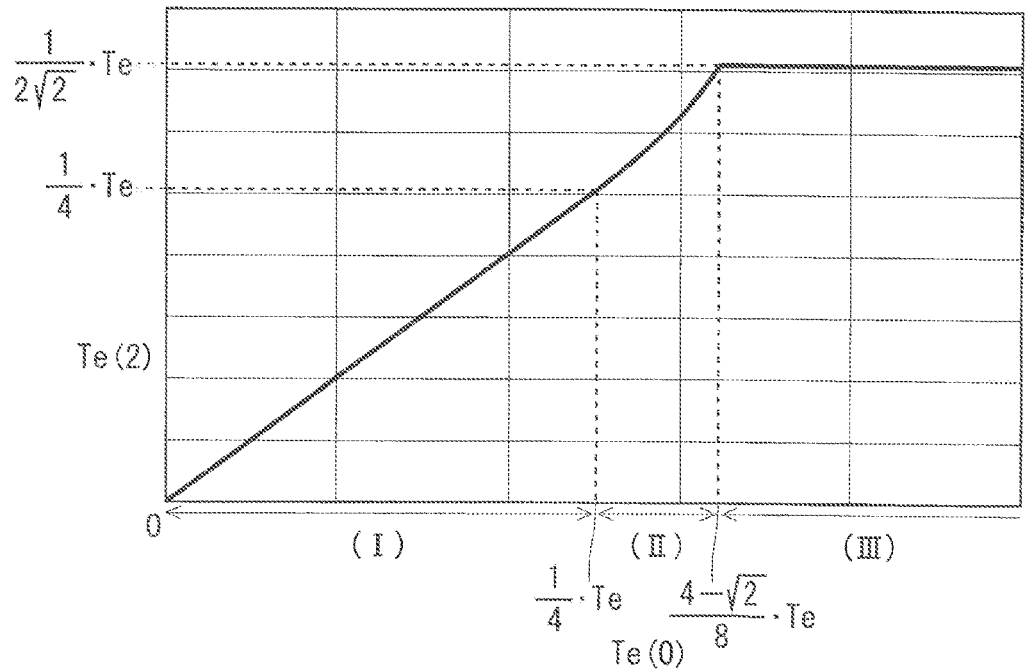

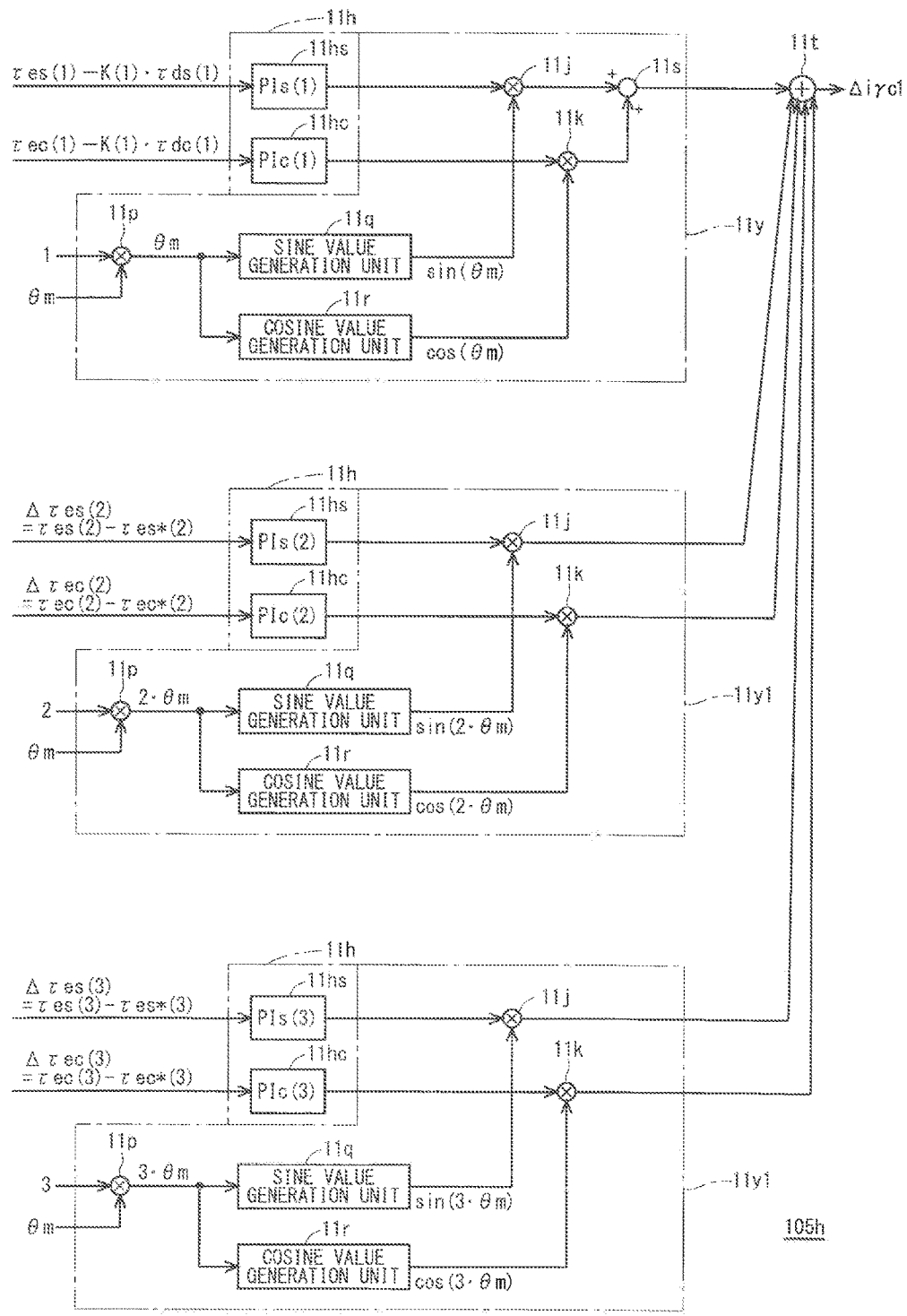
F I G . 2 9

F I G. 3 0
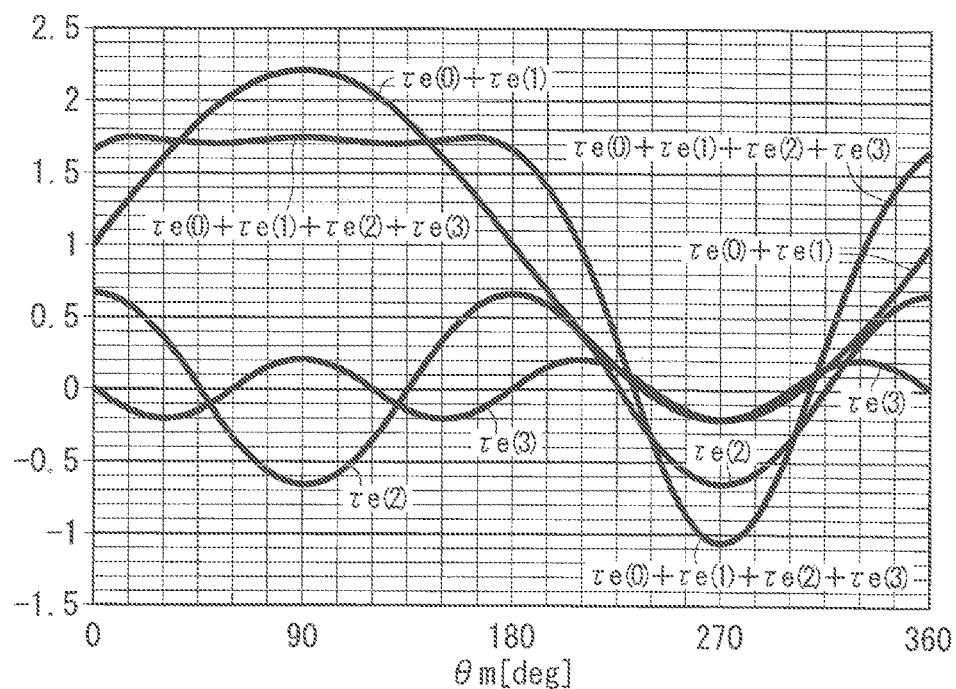
F I G. 3 1
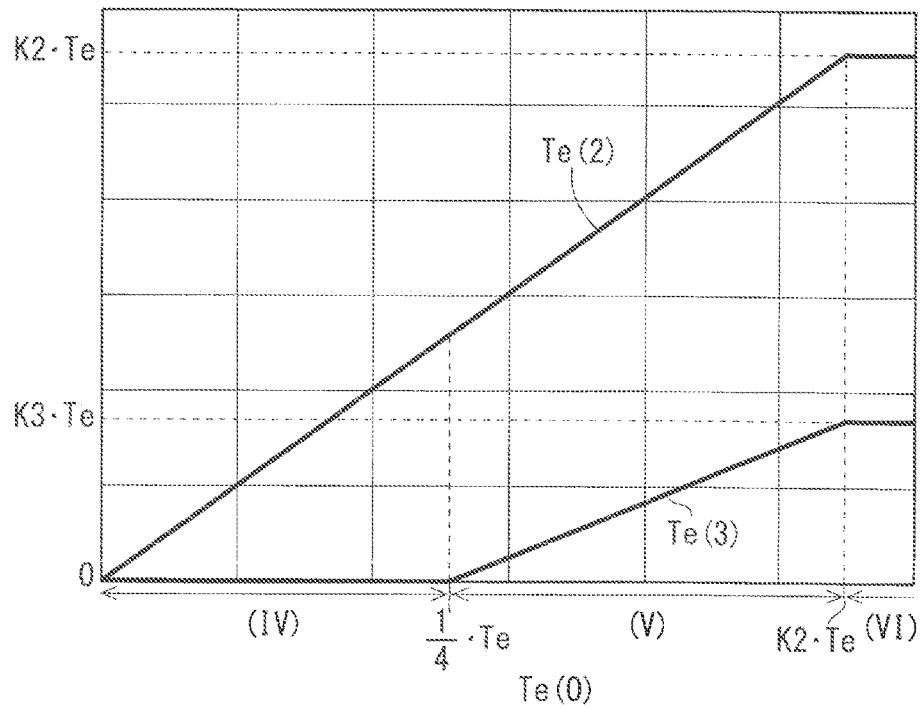

F I G . 3 3
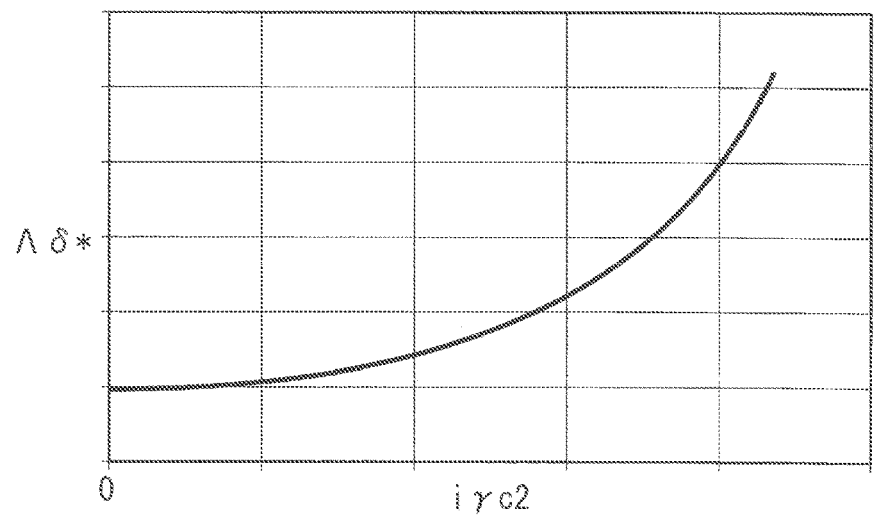
F I G . 3 4
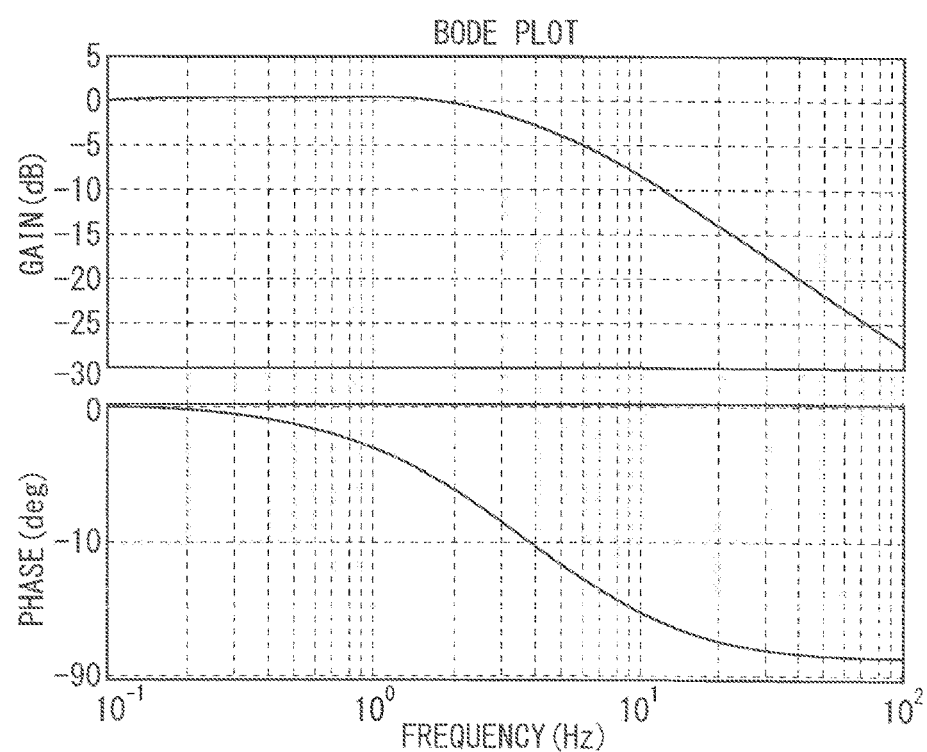

F I G . 3 6
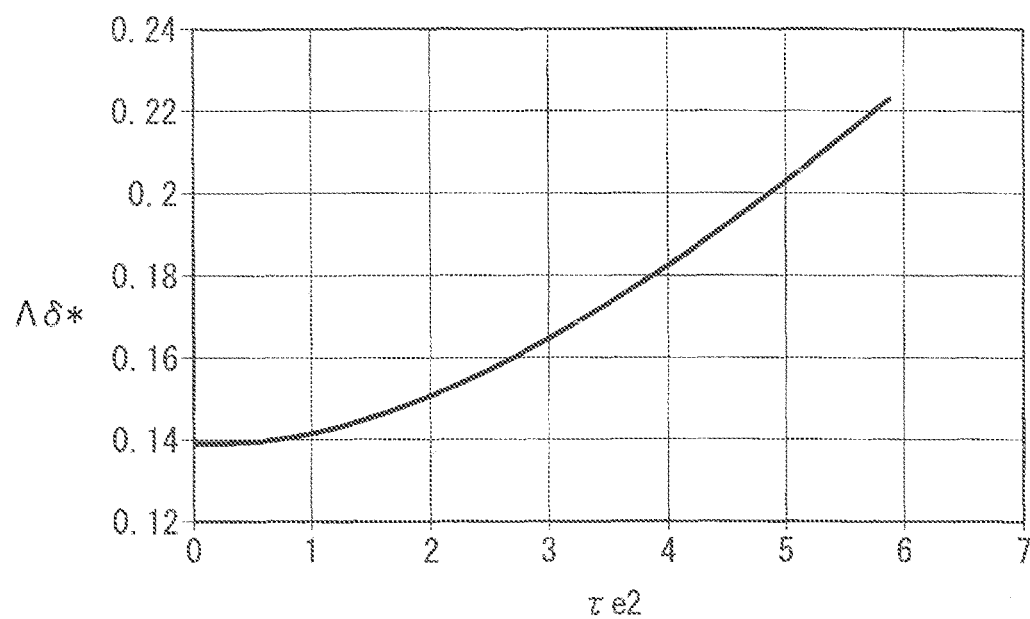

SPEED COMMAND CORRECTION DEVICE AND PRIMARY MAGNETIC FLUX COMMAND GENERATION DEVICE

TECHNICAL FIELD

The present invention relates to technology for controlling a synchronous motor including a field and an armature. The present invention relates, in particular, to technology for controlling the synchronous motor on the basis of the so-called primary magnetic flux, which is a composite of a field magnetic flux generated by the field and a magnetic flux due to armature reaction generated by an armature current flowing through the synchronous motor.

BACKGROUND ART

Various types of control of a synchronous motor based on a primary magnetic flux, which is the so-called primary magnetic flux control, have been proposed. Briefly stated, the primary magnetic flux control is control of the primary magnetic flux of the synchronous motor in accordance with a command value thereof (hereinafter, referred to as a "primary magnetic flux command") to control a phase difference (load angle) of a phase of the primary magnetic flux from a phase of a field magnetic flux so that the phase difference becomes a predetermined phase difference, for example. Specifically, a command value of a rotational speed (hereinafter, "rotational speed command") of the synchronous motor and the primary magnetic flux command are controlled to control a voltage applied to the synchronous motor, to thereby indirectly control a current flowing through the synchronous motor and, further, torque to obtain a desired rotational speed.

Japanese Patent No. 5494760 proposes technology for correcting a deviation of the load angle from the predetermined phase difference. Patent Japanese Patent No. 5556875 proposes technology for generating the primary magnetic flux command. Japanese Patent No. 2551132 proposes technology for controlling the current flowing through the synchronous motor so that the current becomes constant. Japanese Patent No. 3874865 and WO 2003/071672 propose technology for controlling the torque of the synchronous motor.

SUMMARY OF INVENTION

Problem to be Solved by the Invention

In Japanese Patent No. 5494760, the command value of the rotational speed is corrected using an AC part of a component of the current flowing through the synchronous motor in a phase (corresponding to a γc axis in a rotating coordinate system) leading, by 90 degrees, a phase (corresponding to a δc axis in the rotating coordinate system) that the primary magnetic flux should take to thereby correct the deviation of the load angle from the predetermined phase difference. However, correction focused on the periodicity of load torque of the synchronous motor is not made.

Japanese Patent No. 3874865 focuses on the periodicity of the load torque, but fails to make a specific reference to application to the primary magnetic flux control.

The present invention has been conceived in view of the above-mentioned background art, and an object thereof is to reduce ripple of vibration torque and/or output torque by correcting a rotational speed command while reflecting the periodicity of load torque in primary magnetic flux control.

Means to Solve the Problem

A speed command correction device (12) according to the present invention is a device for correcting a rotational speed command ($\omega eo^*$) that is a command value of a rotational speed on an electrical angle of a synchronous motor (3) for driving a periodic load in a method of matching a primary magnetic flux ($\lambda\delta c, \lambda\gamma c$) with a primary magnetic flux command ($\Lambda\delta^*$) in a first axis ($\delta c$) on the basis of the primary magnetic flux command and the rotational speed command. The primary magnetic flux ($\lambda\delta c, \lambda\gamma c$) is herein a composite of a magnetic flux generated by a current ([I]) flowing through the synchronous motor and a field magnetic flux ($\Lambda 0$) of the synchronous motor. The first axis leads the field magnetic flux ($\Lambda 0$) by a predetermined phase difference.

A first aspect of the speed command correction device according to the present invention includes: a first subtractor (109) that subtracts an angular speed correction amount ($\Delta\omega e^*$) from the rotational speed command ($\omega eo^*$) to obtain a corrected rotational speed command ($\omega e^*$); an adder (107) that adds a second-axis current correction value ($\Delta i\gamma c1$) to a second-axis current ($i\gamma c$) that is a component of the current in a second axis ($\gamma c$) leading the first axis by an electrical angle of 90 degrees to obtain a corrected second-axis current ($i\gamma c1$); a DC part removal unit (110) that removes a DC part from the corrected second-axis current to obtain the angular speed correction amount; an angular ripple extraction unit (105a) that obtains, from a rotational angle ($\theta m$) on a mechanical angle of the synchronous motor, a rotational angle difference ($\Delta\theta m$) that is a ripple component of the rotational angle to a time integral ($\omega ma \cdot t$) of an average value of an angular speed of the mechanical angle; a component extraction unit (105b) that extracts an $n^{th}$-order component ($\Delta\theta ms(n), \Delta\theta mc(n)$) ($n$ being a positive integer) of a fundamental frequency of the rotational angle ($\theta m$) from the rotational angle difference; a torque conversion unit (105i) that converts the $n^{th}$-order component into an $n^{th}$-order component ($\tau vs(n), \tau vc(n)$) of an estimated value of vibration torque ($\tau v$) of the synchronous motor; and a correction amount calculation unit (105h) that receives, as an input, the $n^{th}$-order component of the estimated value, and obtains the second-axis current correction value ($\Delta i\gamma c1$) using an input into the correction amount calculation unit.

A second aspect of the speed command correction device according to the present invention includes: a first subtractor (109) that subtracts an angular speed correction amount ($\Delta\omega e^*$) from the rotational speed command ($\omega eo^*$) to obtain a corrected rotational speed command ($\omega e^*$); an adder (107) that adds a second-axis current correction value ($\Delta i\gamma c1$) to a second-axis current ($i\gamma c$) that is a component of the current in a second axis ($\gamma c$) leading the first axis by an electrical angle of 90 degrees to obtain a corrected second-axis current ($i\gamma c1$); a DC part removal unit (110) that removes a DC part from the corrected second-axis current to obtain the angular speed correction amount; an output torque estimation unit (105d) that obtains an estimated value of output torque ($\tau e$) of the synchronous motor from the primary magnetic flux, a first-axis current ($i\delta c$) that is a component of the current in the first axis, and the second-axis current; a component extraction unit (105e) that extracts, from the estimated value, an $n^{th}$-order component ($\tau es(n), \tau ec(n)$) ($n$ being a positive integer) of a fundamental frequency of a rotational angle ($\theta m$) as a mechanical angle of the synchronous motor;

and a correction amount calculation unit (105*h*) that receives the $n^{th}$-order component as an input, and obtains the second-axis current correction value ($\Delta i\gamma c1$) using the input into the correction amount calculation unit.

A third aspect of the speed command correction device according to the present invention includes: a first subtractor (109) that subtracts an angular speed correction amount ($\Delta \omega e^*$) from the rotational speed command ($\omega eo^*$) to obtain a corrected rotational speed command ($\omega e^*$); an adder (107) that adds a second-axis current correction value ($\Delta i\gamma c1$) to a second-axis current ($i\gamma c$) that is a component of the current in a second axis ($\gamma c$) leading the first axis by an electrical angle of 90 degrees to obtain a corrected second-axis current ($i\gamma c1$); a DC part removal unit (110) that removes a DC part from the corrected second-axis current to obtain the angular speed correction amount; an angular ripple extraction unit (105*a*) that obtains, from a rotational angle ($\theta m$) on a mechanical angle of the synchronous motor, a rotational angle difference ($\Delta \theta m$) that is a ripple component of the rotational angle to a time integral ($\omega ma \cdot t$) of an average value of an angular speed of the mechanical angle; a first component extraction unit (105*b*) that extracts an $n^{th}$-order component ($\Delta \theta ms(n), \Delta \theta mc(n)$) (n being a positive integer) of a fundamental frequency of the rotational angle ($\theta m$) from the rotational angle difference; a torque conversion unit (105*i*) that converts the $n^{th}$-order component into an $n^{th}$-order component ($\tau vs(n), \tau vc(n)$) of an estimated value of vibration torque ($\tau v$) of the synchronous motor; an output torque estimation unit (105*d*) that obtains an estimated value of output torque ($\tau e$) of the synchronous motor from the primary magnetic flux, a first-axis current ($i\delta c$) that is a component of the current in the first axis, and the second-axis current; a second component extraction unit (105*e*) that extracts an $n^{th}$-order component ($\tau es(n), \tau ec(n)$) of the fundamental frequency from the estimated value of output torque; a proration unit (105*c*, 105*f*) that prorates the $n^{th}$-order component ($\tau vs(n), \tau vc(n)$) obtained by the torque conversion unit and the $n^{th}$-order component ($\tau es(n), \tau ec(n)$) extracted by the second component extraction unit with a predetermined proration rate ($K(n)/[1-K(n)]$) to respectively obtain a first value and a second value; an adder (105*g*) that obtains a sum of the first value and the second value; and a correction amount calculation unit (105*h*) that receives the sum as an input, and obtains the second-axis current correction value ($\Delta i\gamma c1$) using the input into the correction amount calculation unit.

A fourth aspect of the speed command correction device according to the present invention is the third aspect thereof in which the first component extraction unit (105*b*) extracts, from the rotational angle difference ($\Delta \theta m$), a vibration torque suppression component ($\Delta \theta ms(j), \Delta \theta mc(j)$) that is a component for at least one order including a $1^{st}$-order component ($\Delta \theta ms(1), \Delta \theta mc(1)$) of the fundamental frequency of the rotational angle ($\theta m$), the second component extraction unit (105*e*) extracts, from the estimated value of output torque, a component ($\tau es(j), \tau ec(j)$) for an order corresponding to the vibration torque suppression component, the speed command correction device further includes a third component extraction unit (105*m*) that extracts, from the estimated value of the output torque, an output torque suppression component ($\tau es(m), \tau ec(m)$) that is a component for at least one order other than the order corresponding to the vibration torque suppression component. The correction amount calculation unit (105*h*) further receives the output torque suppression component as an input, and obtains the second-axis current correction value ($\Delta i\gamma c1$) using the input into the correction amount calculation unit.

Fifth and seventh aspects of the speed command correction device according to the present invention are each the third aspect thereof in which the first component extraction unit (105*b*) extracts a $1^{st}$-order component ($\Delta \theta ms(1), \Delta \theta mc(1)$) of the fundamental frequency of the rotational angle ($\theta m$). The torque conversion unit (105*i*) converts a value extracted by the first component extraction unit into a $1^{st}$-order component ($\tau vs(1), \tau vc(1)$) of the estimated value of vibration torque.

The fifth aspect of the speed command correction device according to the present invention further includes: an odd-order component extraction unit (105*q*) that extracts, from the estimated value of output torque, an output torque odd-order suppression component ($\tau es(d), \tau ec(d)$) that is a component for at least one odd order equal to or greater than a $3^{rd}$ order of the fundamental frequency; an odd-order torque command generation unit (105*r*) that obtains a command value ($\tau es^*(d), \tau ec^*(d)$) of the output torque odd-order suppression component on the basis of the $1^{st}$-order component of the fundamental frequency of the estimated value of output torque; and a subtractor (105*s*) that obtains a difference ($\Delta \tau es(d), \Delta \tau ec(d)$) of the output torque odd-order suppression component from the command value.

The correction amount calculation unit (105*h*) further receives the difference as an input, and obtains the second-axis current correction value ($\Delta i\gamma c1$) using the input into the correction amount calculation unit.

A sixth aspect of the speed command correction device according to the present invention is the fifth aspect thereof further including an even-order component extraction unit (105*p*) that extracts, from the estimated value of output torque, an output torque even-order suppression component ($\tau es(e), \tau ec(e)$) that is a component for at least one even order of the fundamental frequency.

The correction amount calculation unit (105*h*) further receives the output torque even-order suppression component as an input, and obtains the second-axis current correction value ($\Delta i\gamma c1$) using the input into the correction amount calculation unit.

In the seventh aspect of the speed command correction device according to the present invention, the speed command correction device further includes: an even-order component extraction unit (105*p*) that extracts, from the estimated value of output torque, an output torque even-order suppression component ($\tau es(e), \tau ec(e)$) that is a component for at least one even order of the fundamental frequency; an even-order torque command generation unit (105*t*) that obtains a command value ($\tau es^*(e), \tau ec^*(e)$) of the output torque even-order suppression component on the basis of the $1^{st}$-order component of the fundamental frequency of the estimated value of output torque; and a subtractor (105*u*) that obtains a difference ($\Delta \tau es(e), \Delta \tau ec(e)$) of the output torque even-order suppression component from the command value.

The correction amount calculation unit (105*h*) further receives the difference as an input, and obtains the second-axis current correction value ($\Delta i\gamma c1$) using the input into the correction amount calculation unit.

An eighth aspect of the speed command correction device according to the present invention is the seventh aspect thereof further including an odd-order component extraction unit (105*q*) that extracts, from the estimated value of output torque, an output torque odd-order suppression component ($\tau es(d), \tau ec(d)$) that is a component for at least one odd order of the fundamental frequency.

The correction amount calculation unit (105*h*) further receives the output torque odd-order suppression component as an input, and obtains the second-axis current correction value (Δiγc1) using the input into the correction amount calculation unit.

A ninth aspect of the speed command correction device according to the present invention is the seventh aspect thereof further including: an odd-order component extraction unit (105q) that extracts, from the estimated value of output torque, an output torque odd-order suppression component (τes(d), τec(d)) that is a component for at least one odd order equal to or greater than a $3^{rd}$ order of the fundamental frequency; an odd-order torque command generation unit (105r) that obtains a command value (τes*(d), τec*(d)) of the output torque odd-order suppression component on the basis of the $1^{st}$-order component of the fundamental frequency of the estimated value of output torque; and a subtractor (105s) that obtains a second difference (Δτes(d), Δτec(d)) of the output torque odd-order suppression component from the command value.

The correction amount calculation unit (105h) further receives the second difference as an input, and obtains the second-axis current correction value (Δiγc1) using the input into the correction amount calculation unit.

A tenth aspect of the speed command correction device according to the present invention is any one of the seventh, eighth, and ninth aspects thereof in which the even-order torque command generation unit (105t) obtains the command value (τes*(e), τec*(e)) of the output torque even-order suppression component on the basis of the $1^{st}$-order component and a $0^{th}$-order component (τe(0)) of the fundamental frequency of the estimated value of output torque.

In each of the first to tenth aspects, the correction amount calculation unit (105h) preferably obtains, as a coefficient of a Fourier series, a value obtained by performing proportional integral control on the input into the correction amount calculation unit, and obtains the second-axis current correction value from a result of the Fourier series.

A primary magnetic flux command generation device (103) according to the present invention is a primary magnetic flux command generation device for outputting the primary magnetic flux command (Λδ*) used in the method together with the rotational speed command (ωe*) corrected by the above-mentioned speed command correction device (12), and includes: a fourth component extraction unit (103a) that extracts a $0^{th}$-order component of a parameter for setting output torque (τe) of the synchronous motor (3); a fifth component extraction unit (103b) that extracts an $n^{th}$-order component of the parameter; a composite value calculation unit (103c) that obtains a composite value of the $n^{th}$-order component of the parameter; a second adder (103d) that obtains a sum of the $0^{th}$-order component of the parameter and the $n^{th}$-order component of the parameter; and a magnetic flux command setting unit (103e) that sets the primary magnetic flux command on the basis of the sum obtained by the second adder, the current ([I]), the field magnetic flux (Λ0), and inductance (Ld, Lq) of the synchronous motor.

As the parameter, any of a first-axis current (iδc) that is a component of the current in the first axis, the second-axis current (iγc), and a load angle (φ) that is a phase difference of a phase of the primary magnetic flux (λδc, λγc) from a phase of the field magnetic flux (Λ0) can be used. Alternatively, the output torque itself can be used in place of the parameter.

Effects of the Invention

According to the first aspect of the speed command correction device according to the present invention, the vibration torque of the synchronous motor is suppressed.

According to the second aspect of the speed command correction device according to the present invention, ripple of the output torque of the synchronous motor is suppressed.

According to the third and fourth aspects of the speed command correction device according to the present invention, suppression of the vibration torque of the synchronous motor and suppression of the ripple of the output torque are prorated.

According to the fifth to tenth aspects of the speed command correction device according to the present invention, a peak value of the current flowing through the synchronous motor is suppressed.

According to the sixth and eighth aspects of the speed command correction device according to the present invention, suppression of the fundamental wave component of the vibration torque of the synchronous motor is not impaired.

According to the primary magnetic flux command generation device according to the present invention, the primary magnetic flux command suitable for the speed command correction device according to the first to third aspects is generated.

The objects, features, aspects, and advantages of the present invention will become more apparent from the following detailed description and the accompanying drawings.

BRIEF DESCRIPTION OF DRAWINGS

FIG. 1 is a block diagram illustrating the configuration of a motor control device in a first embodiment and peripherals thereof;

FIG. 3 is a block diagram illustrating the configuration of an angular ripple extraction unit;

FIG. 5 is a block diagram illustrating the configuration of an output torque estimation unit;

FIG. 6 is a block diagram illustrating the configuration of a correction amount calculation unit;

FIG. 7 is a block diagram illustrating the configuration of a PI controller;

FIG. 12 is a block diagram illustrating the configuration of the correction amount calculation unit in the third embodiment;

FIG. 14 is a graph showing a first example of waveforms of odd-order components of output torque in the third embodiment;

FIG. 15 is a graph showing a first example of a waveform of the sum of the odd-order components of the output torque in the third embodiment;

FIG. 16 is a graph showing a second example of the waveforms of the odd-order components of the output torque in the third embodiment;

FIG. 17 is a graph showing a second example of the waveform of the sum of the odd-order components of the output torque in the third embodiment;

FIG. 19 is a block diagram illustrating the configuration of the correction amount calculation unit in the fourth embodiment;

FIG. 23 is a graph showing components of the output torque in the fifth embodiment;

FIG. 24 is a graph showing an upper limit of a magnitude of a $2^{nd}$-order component of the output torque;

FIG. 29 is a block diagram illustrating the configuration of the correction amount calculation unit in the seventh embodiment;

FIG. 30 is a graph showing components of the output torque in the seventh embodiment;

FIG. 31 is a graph showing the upper limit of the magnitude of the $2^{nd}$-order component of the output torque;

FIG. 33 is a graph showing the dependence of a primary magnetic flux command on a second corrected γc-axis current;

FIG. 34 is a Bode plot showing a transfer characteristic of the calculation unit;

FIG. 36 is a graph showing the dependence of the primary magnetic flux command on the output torque after correction;

DESCRIPTION OF EMBODIMENTS

First Embodiment

Figure 2:
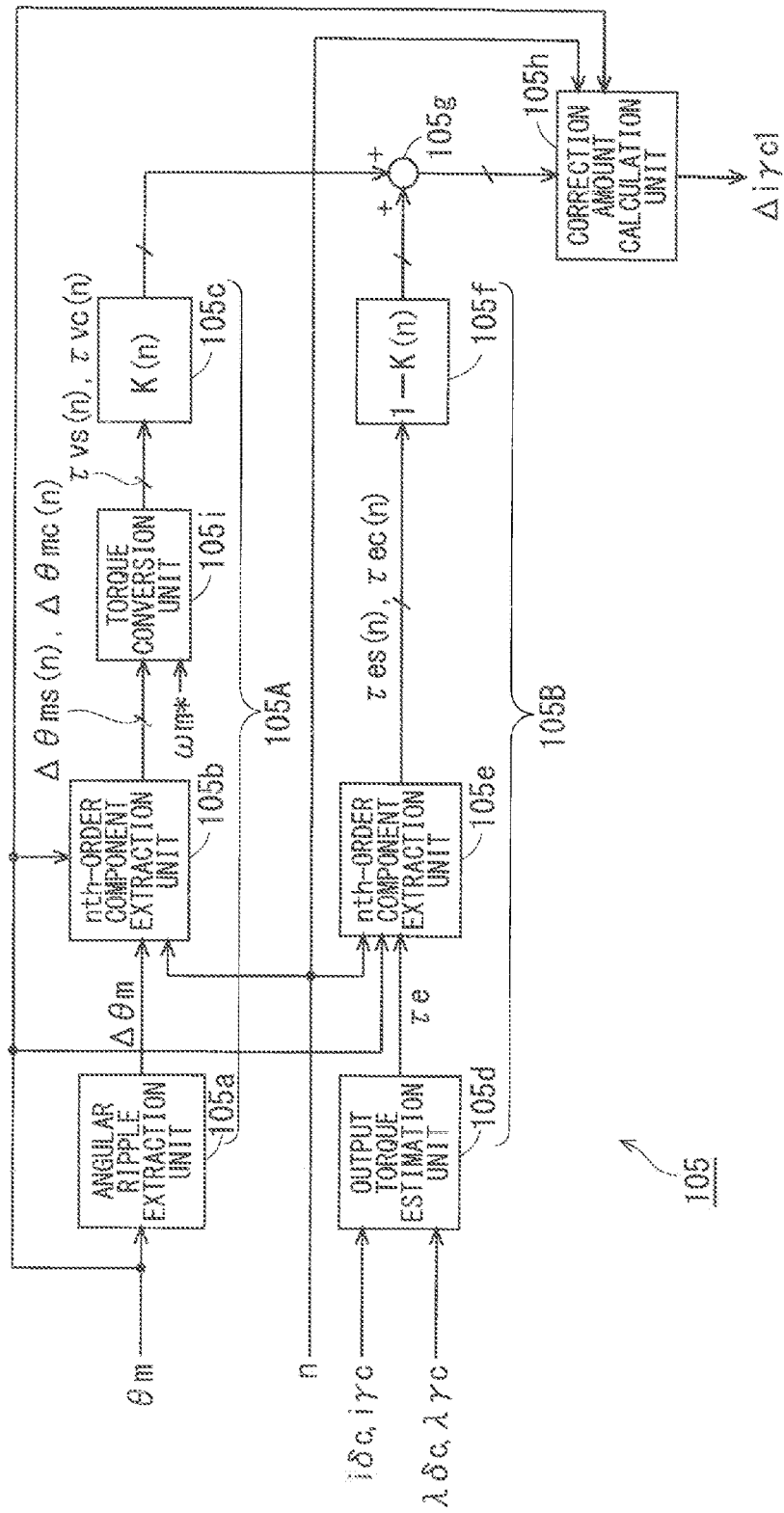
FIG. 2 is a block diagram illustrating the configuration of a γc-axis current correction unit.

FIG. 1 is a block diagram illustrating the configuration of a motor control device 1 in a first embodiment and peripherals thereof.

A synchronous motor 3 is a three-phase rotary motor, and includes an armature (not illustrated) and a rotor (not illustrated) as a field. It is common general knowledge that the armature includes an armature winding, and the rotor rotates relative to the armature. The field includes, for example, a magnet (field magnet: not illustrated) generating a field magnetic flux, and is of an embedded magnet type, for example.

A voltage supply 2 includes, for example, a voltage-controlled inverter and a control unit therefor, and applies a three-phase voltage to the synchronous motor 3 on the basis of a three-phase voltage command value [V*] (a symbol [ ] indicates that the value is a vector). This allows a three-phase current [I] to flow from the voltage supply 2 to the synchronous motor 3.

The motor control device 1 controls a primary magnetic flux and a rotational speed (rotational angular speed in the following example) of the synchronous motor 3. The primary magnetic flux is a composite of a field magnetic flux Λ0 generated by the field magnet and a magnetic flux due to armature reaction generated by an armature current (this is also the three-phase current [I]) flowing through the synchronous motor 3 (more specifically, through the armature). A primary magnetic flux command Λδ* is a command value of a magnitude Λδ of an actual primary magnetic flux.

The motor control device 1 performs control in a method of matching the primary magnetic flux of the synchronous motor 3 with the primary magnetic flux command Λδ* in a δc axis, which is a control axis of the primary magnetic flux, to control the synchronous motor 3. The δc axis leads a d axis, which indicates a phase of the field magnetic flux Λ0 in a rotating coordinate system, by a predetermined phase difference. The actual primary magnetic flux has a δc-axis component λδc in the δc axis and a γc-axis component λγc in a γc axis. The γc axis leads the δc axis by an electrical angle of 90 degrees. The δc-axis component λδc and the γc-axis component λγc are hereinafter also simply expressed as primary magnetic fluxes λδc and λγc.

As to the command value of the primary magnetic flux, the γc-axis component is zero and the δc-axis component is set to the primary magnetic flux command Λδ* as described above, usually. This means that the motor control device 1 performs control so that the γc-axis component λγc of the actual primary magnetic flux becomes zero to obtain the predetermined phase difference. Such control is commonly referred to as primary magnetic flux control, and is known in Japanese Patent No. 5494760 and Japanese Patent No. 5556875, for example. The primary magnetic flux and the rotational speed are usually used as controllable amounts in the primary magnetic flux control.

In the present embodiment, the primary magnetic flux may be either an estimated value or an observed value. Technology for estimating the primary magnetic flux itself is known, for example, in Japanese Patent No. 5494760.

The motor control device 1 includes a first coordinate transformation unit 101, a magnetic flux control unit 102, a second coordinate transformation unit 104, and a speed command correction device 12.

The first coordinate transformation unit 101 performs three-phase to two-phase transformation based on an electrical angle θe of the synchronous motor 3 obtained as described below. Specifically, the first coordinate transformation unit 101 transforms the three-phase current [I] into a δc-axis current iδc and a γc-axis current iγc in a δc-γc rotating coordinate system in which the primary magnetic flux control is performed. In this case, the sum of currents of three phases of the three-phase current becomes zero, and thus, if currents of two phases are obtained, a current of the remaining phase is estimated from the currents of the two phases. As described above, "3(2)" in FIG. 1 indicates that detected currents may be either currents of three phases or currents of two phases. It can be said that the δc-axis current iδc and the γc-axis current iγc are respectively the δc-axis component and the γc-axis component of a current flowing through the synchronous motor 3.

The second coordinate transformation unit 104 performs two-phase to three-phase transformation based on the electrical angle θe. Specifically, the second coordinate transformation unit 104 transforms a δc-axis voltage command value vδ* and a γc-axis voltage command value vγ* in the δc-γc rotating coordinate system into the three-phase voltage command value [V*].

The second coordinate transformation unit 104 may transform the δc-axis voltage command value vδ* and the γc-axis voltage command value vγ* into a voltage command value in another coordinate system, such as a d-q rotating coordinate system, in place of the three-phase voltage command value [V*]. Examples of the other coordinate system include an αβ fixed coordinate system, a uvw fixed coordinate system, and a polar coordinate system.

The magnetic flux control unit 102 obtains, from a rotational speed command ωeo* (on the electrical angle), a rotational speed command ωm* (on a mechanical angle) corresponding thereto. The function can easily be achieved by known technology, and thus details thereof are omitted.

The magnetic flux control unit 102 has an integration function, for example. A rotational speed command ωe* is integrated by the integration function to obtain the electrical angle θe. From the obtained electrical angle θe and a load angle φ to the d axis of the primary magnetic flux, a rotational angle θm as the mechanical angle can be obtained by an equation (1). Note that the number of pole pairs P of the synchronous motor 3 is introduced.

$$\theta m = \frac{1}{P}(\theta e - \varphi) \quad (1)$$

The load angle φ may be either an estimated value or an observed value. Technology for estimating the load angle φ itself is also known, for example, in Japanese Patent No. 5494760. Any known technology other than the equation (1) can be used as a method of obtaining the rotational angle θm.

The magnetic flux control unit 102 also generates the δc-axis voltage command value vδ* and the γc-axis voltage command value vγ* on the basis of the δc-axis current iδc, the γc-axis current iγc, the primary magnetic fluxes λδc and λγc, the primary magnetic flux command Λδ*, and the rotational speed command ωe*. The function, the configuration to achieve the function, and a technique of estimating the primary magnetic fluxes λδc and λγc are known, for example, in Japanese Patent No. 5494760, and thus details thereof are omitted herein.

The speed command correction device 12 includes a γc-axis current correction unit 105 ("iγc correction unit" in FIG. 1), an adder 107, a subtractor 109, and a high-pass filter 110.

The γc-axis current correction unit 105 obtains a first γc-axis current correction value Δiγc1 on the basis of the rotational angle θm, the rotational speed command ωm*, the primary magnetic fluxes λδc and λγc, the δc-axis current iδc, the γc-axis current iγc, and an order n. The first γc-axis current correction value Δiγc1 is an amount to reduce an $n^{th}$-order component (n is a positive integer) of a fundamental frequency of the rotational angle θm, and a specific meaning thereof and how to obtain the first γc-axis current correction value Δiγc1 will be described below.

The adder 107 adds the first γc-axis current correction value Δiγc1 to the γc-axis current iγc to obtain a first corrected γc-axis current iγc1. The high-pass filter 110 functions as a DC part removal unit that removes a DC part from the first corrected γc-axis current iγc1 to obtain an angular speed correction amount Δωe*. The speed command correction device 12 may further include a constant multiplication unit 108 as illustrated, and the angular speed correction amount Δωe* may be obtained as an amount obtained by multiplying an output of the high-pass filter 110 by a predetermined gain Km using the constant multiplication unit 108.

The subtractor 109 subtracts the angular speed correction amount Δωe* from the rotational speed command ωeo* on the electrical angle to obtain a corrected rotational speed command ωe*.

FIG. 2 is a block diagram illustrating the configuration of the γc-axis current correction unit 105. The γc-axis current correction unit 105 includes a vibration torque extraction unit 105A, an output torque extraction unit 105B, an adder 105g, and a correction amount calculation unit 105h.

The vibration torque extraction unit 105A includes an angular ripple extraction unit 105a, an $n^{th}$-order component extraction unit 105b, a torque conversion unit 105i, and a proration coefficient multiplication unit 105e.

The angular ripple extraction unit 105a obtains a rotational angle difference Δθm from the rotational angle θm and the rotational speed command ωm*. The $n^{th}$-order component extraction unit 105b extracts $n^{th}$-order components Δθms(n) and Δθmc(n) of the fundamental frequency of the rotational angle θm from the rotational angle difference Δθm. The torque conversion unit 105i converts the $n^{th}$-order components Δθms(n) and Δθmc(n) into torque. Specifically, the torque conversion unit 105i obtains $n^{th}$-order components τvs(n) and τvc(n) of an estimated value of vibration torque τv of the synchronous motor 3 at the rotational angle θm. The vibration torque τv and the estimated value thereof are each expressed as the "vibration torque τv" for convenience sake as a difference between the estimated value and an actual value of the vibration torque τv is not dealt with herein.

The vibration torque τv has a value obtained by subtracting load torque τd of a mechanical load (not illustrated) driven by the synchronous motor 3 from output torque τe of the synchronous motor 3. The load torque τd has the periodicity, that is, the synchronous motor 3 drives a periodic load. An example of the mechanical load includes a compression mechanism for compressing a refrigerant used in an air conditioner, for example.

When the synchronous motor 3 is rotating, the rotational angle θm is expressed as a function θm(t) of time t. Thus, when moment of inertia of the mechanical load is expressed as J, an equation (2) holds. The moment of inertia J is usually known.

$$\tau v = \tau e - \tau d = J \cdot \frac{d^2}{dt^2} \theta m(t) \quad (2)$$

The effect of the mechanical load on the rotational angle θm per 1/n rotation (n=1, 2, 3, . . . ) of the synchronous motor 3 is considered herein. The vibration torque τv has a component (the above-mentioned "$n^{th}$-order component") varying with a period of 1/n of the period of the rotational angle θm, and having independent amplitude for each order. For example, main amplitude is the amplitude of a $1^{st}$-order component corresponding to an equation n=1 when the mechanical load is a one-cylinder compressor, and is the amplitude of a $2^{nd}$-order component corresponding to an equation n=2 when the mechanical load is a two-cylinder compressor. The rotational angle θm(t) is approximated by an equation (3) by introducing an average value of an angular speed (hereinafter, referred to as an "average angular speed") ωma, and amplitude M(n) and a phase α(n) for each order. A symbol Σ herein indicates the sum for the order n.

$$\theta m(t) = \omega ma \cdot t + \Sigma[M(n) \cdot \sin(n \cdot \omega ma \cdot t + \alpha(n))] \quad (3)$$

An equation (4) holds from the equation (3).

$$\frac{d^2}{dt^2} \theta m(t) = -\omega ma^2 \cdot \Sigma[M(n) \cdot n^2 \cdot \sin(n \cdot \omega ma \cdot t + \alpha(n))] \quad (4)$$

Equations (5) hold from the equations (2) and (4).

$$\tau v = J \cdot (-\omega ma^2) \cdot \Sigma[n^2 \cdot \Delta \theta m], \Delta \theta m = \theta m(t) -$$
$$\theta m f \theta m f = \omega ma \cdot t \quad (5)$$

It can be said that the first term ωma·t of the right-hand side of the equation (3) is a time integral of the average angular speed ωma. If the rotational angle θm is expressed only by the first term of the right-hand side of the equation (3) (i.e., an equation M(n)=0 holds for each order n), it is a case where the synchronous motor 3 rotates in accordance with the rotational speed command ωm*, and the average angular speed ωma becomes constant by the rotational speed command ωm*. An angle θmf in such a case is the rotational angle θm when the synchronous motor 3 rotates at a constant speed by the rotational speed command ωm* (at the time of constant-speed rotation). This enables the angle θmf to be obtained as the product of the rotational speed command ωm* and the time t, and, once the time t is obtained, it is easy to obtain the rotational angle difference Δθm.

FIG. 3 is a block diagram illustrating the configuration of the angular ripple extraction unit 105a together with the $n^{th}$-order component extraction unit 105b and the torque conversion unit 105i. The angular ripple extraction unit 105a includes a calculation unit 11a and a subtractor 11b. The calculation unit 11a obtains the angle θmf from the rotational angle θm. The subtractor 11b subtracts the angle θmf from the rotational angle θm to obtain the rotational angle difference Δθm. The rotational angle difference Δθm corresponds to the second term of the right-hand side of the equation (3), and it can be said that the rotational angle difference Δθm is a ripple component of the rotational angle.

This means that the angular ripple extraction unit 105a extracts, from the rotational angle θm, the ripple component of the rotational angle θm at the time of constant-speed rotation of the synchronous motor 3.

Note that the time t is not obtained separately in the above-mentioned configuration example. An example of technology for obtaining the angle θmf without using the time t is thus described below.

Figure 4:
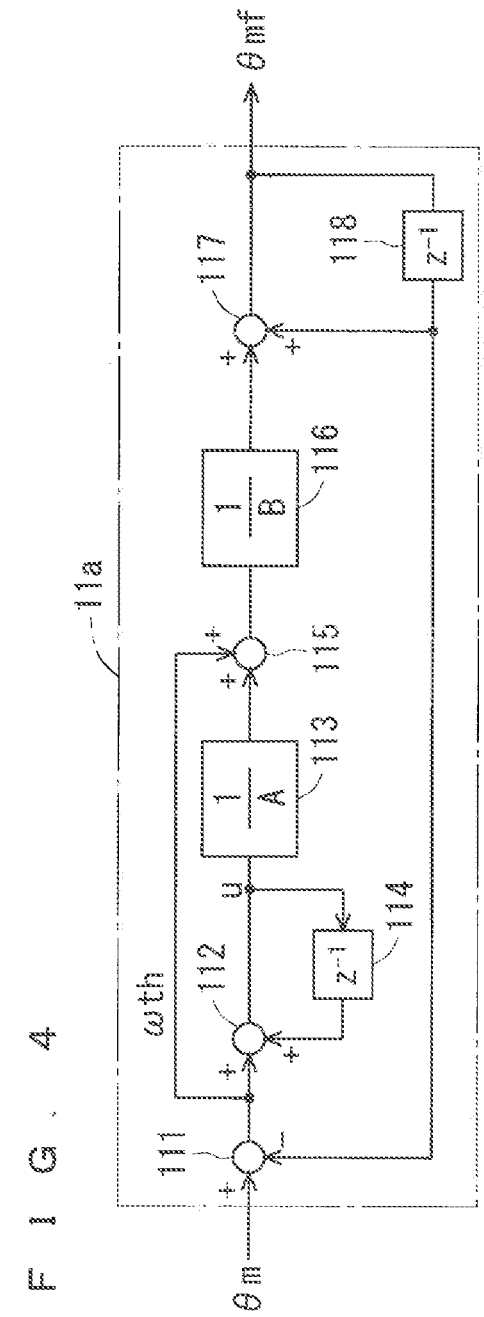
FIG. 4 is a block diagram illustrating the configuration of a calculation unit.

FIG. 4 is a block diagram illustrating the configuration of the calculation unit 11a. The calculation unit 11a includes a subtractor 111, adders 112, 115, and 117, dividers 113 and 116, and delayers 114 and 118.

The subtractor 111 subtracts an output of the delayer 118 from the rotational angle θm to obtain a value ωth. The adder 112 adds an output of the delayer 114 to the value ωth to obtain a sum u. The divider 113 divides the sum u by a constant A. The adder 115 adds the value ωth and a result of division performed by the divider 113. The divider 116 divides a result of addition performed by the adder 115 by a constant B. The adder 117 adds the output of the delayer 118 and a result of division performed by the divider 116. The angle θmf can be obtained as a result of addition performed by the adder 117. The delayer 114 delays the sum u, and the delayer 118 delays the angle θmf by the same time. A case where the delayers 114 and 118 use one period of calculation performed by the calculation unit 11a as a delay amount is herein shown as an example.

The above-mentioned calculation performed by the calculation unit 11a is expressed by equations (6):

$$\theta mf = z^{-1} \theta mf + \frac{1}{B}\left(\omega th + \frac{1}{A} \cdot \mu\right), \quad (6)$$
$$\omega th = \theta m - z^{-1} \theta mf,$$
$$u = \omega th + z^{-1} u$$

FIG. 34 is a Bode plot showing a transfer characteristic of the calculation unit 11a. The calculation unit 11a has a characteristic of a low-pass filter, and removes a high-frequency component. The calculation unit 11a herein removes, from the rotational angle θm, the rotational angle difference Δθm as the ripple component to obtain the angle θmf.

The $n^{th}$-order component extraction unit 105b extracts the $n^{th}$-order component of the vibration torque τv from the first equation of the equations (5). The component of the rotational angle difference Δθm for the order to be extracted is herein handled by being divided into a sine value component Δθms(n) and a cosine value component Δθmc(n) instead of calculating a phase α(n). Specific operation of the $n^{th}$-order component extraction unit 105b will be described below.

Referring to FIG. 3 and the equations (5), the torque conversion unit 105i receives the order n and the rotational speed command ωm* as inputs, and multiplies the $n^{th}$-order components Δθms(n) and Δθmc(n) of the rotational angle difference Δθm by the product of the moment of inertia J, the square of the rotational speed command ωm*, and the square of the order n to obtain the $n^{th}$-order component of the vibration torque τv. Specifically, a sine value component τvs(n) and a cosine value component τvc(n) of the vibration torque τv for the $n^{th}$ order are obtained.

The output torque extraction unit 105B includes an output torque estimation unit 105d, an $n^{th}$-order component extraction unit 105e, and a proration coefficient multiplication unit 105f.

The output torque estimation unit 105$d$ uses the primary magnetic fluxes λδc and λγc, the δc-axis current iδc, and the γc-axis current iγc to obtain an estimated value of the output torque τe from an equation (7):

$$\tau e = P \cdot (\lambda \delta c \cdot i \gamma c - \lambda \gamma c \cdot i \delta c) \quad (7)$$

The output torque τe and the estimated value thereof are each expressed as the "output torque τe" for convenience sake as a difference between the estimated value and an actual value of the output torque τe is not dealt with herein.

FIG. 5 is a block diagram illustrating the configuration of the output torque estimation unit 105$d$. The output torque estimation unit 105$d$ includes multipliers 11$d$ and 11$e$, a subtractor 11$f$, and a constant multiplication unit 11$g$.

The multiplier 11$d$ obtains the product λδc·iγc of the δc-axis component λδc of the primary magnetic flux and the γc-axis current iγc. The multiplier 11$e$ obtains the product λγc·iδc of the γc-axis component λγc of the primary magnetic flux and the δc-axis current iδc. The subtractor 11$f$ subtracts the product λγc·iδc from the product λδc·iγc. The constant multiplication unit 11$g$ multiplies a result of subtraction obtained by the subtractor 11$f$ by the number of pole pairs P to obtain the output torque τe.

The $n^{th}$-order component extraction unit 105$e$ extracts, from the output torque τe, $n^{th}$-order components τes(n) and τec(n) of the fundamental frequency of the rotational angle θm, as with the $n^{th}$-order component extraction unit 105$b$.

Specifically, the $n^{th}$-order component extraction units 105$b$ and 105$e$ each obtain a sine value component and a cosine value component of an input amount using the Fourier transform. The rotational angle difference Δθm and the output torque τe are each a function of the rotational angle θm, and, when each of them is expressed as a function F(θm), equations (8) hold.

$$F(\theta m) = \frac{a0}{2} + \sum_{n=1}^{\infty} \{an \cdot \cos(n \cdot \theta m) + bn \cdot \sin(n \cdot \theta m)\} \quad (8)$$

$(n = 1, 2, 3, \ldots)$ $$\begin{cases} a0 = \frac{1}{\pi} \int_{-\pi}^{\pi} F(\theta m) d\theta m \\ an = \frac{1}{\pi} \int_{-\pi}^{\pi} \{F(\theta m) \cdot \cos(n \cdot \theta m)\} d\theta m \\ bn = \frac{1}{\pi} \int_{-\pi}^{\pi} \{F(\theta m) \cdot \sin(n \cdot \theta m)\} d\theta m \end{cases}$$

Here, a value a0 denotes a DC component ($0^{th}$-order component) of the function F(θm), a value an denotes the amplitude of a cosine value of an $n^{th}$-order component of the function F(θm), and a value bn denotes the amplitude of a sine value of the $n^{th}$-order component of the function F(θm). To perform the above-mentioned Fourier transform, the $n^{th}$-order component extraction units 105$b$ and 105$e$ each receive the order n and the rotational angle θm as inputs. In the equations (8), the time t may be used in place of the rotational angle θm as an integration variable. This is because the angle θmf can be substituted for the rotational angle θm in calculation performed in the Fourier transform, and the variable can be transformed using the third equation of the equations (5).

The $n^{th}$-order component extraction unit 105$b$ receives the rotational angle difference Δθm as an input to use it as the above-mentioned function F(θm), outputs the value bn as the sine value component Δθms(n) of the rotational angle difference Δθm, and outputs the value an as the cosine value component Δθmc(n) of the rotational angle difference Δθm.

The $n^{th}$-order component extraction unit 105$e$ receives the output torque τe as an input to use it as the above-mentioned function F(θm), outputs the value bn as the sine value component τes(n) of the output torque τe, and outputs the value an as the cosine value component τec(n) of the output torque τe.

The proration coefficient multiplication unit 105$c$ multiplies each of the sine value component τvs(n) and the cosine value component τvc(n) by a proration coefficient K(n) set for each order n. The proration coefficient multiplication unit 105$f$ multiplies each of the sine value component τes(n) and the cosine value component τec(n) by a proration coefficient [1−K(n)]. Note that an in equation 0≤K(n)≤1 holds for each order n. The proration coefficient multiplication units 105$c$ and 105$f$ can thus be seen as proration units that prorate the sine value component τvs(n) and the sine value component τes(n) with a predetermined proration rate K(n)/[1−K(n)], and prorate the cosine value component τvc(n) and the cosine value component τec(n) with the proration rate. The proration coefficients K(n) and [1−K(n)] may be externally provided for the proration coefficient multiplication units 105$c$ and 105$f$. In this case, the proration coefficient multiplication units 105$c$ and 105$f$ can be achieved by simple multipliers.

The adder 105$g$ adds, for each order n, the product τvs(n)·K(n) and the product τes(n)·[1−K(n)] relating to the sine value components, adds the product τvc(n)·K(n) and the product τec(n)·[1−K(n)] relating to the cosine value components, and outputs paired sums.

A plurality of orders n may be used as targets of extraction performed by the $n^{th}$-order component extraction units 105$b$ and 105$e$. For example, when only a value 1 is used as the order n, the adder 105$g$ outputs one pair of sums τvs(1)·K(1)+τes(1)·[1−K(1)] and τvc(1)·K(1)+τec(1)·[1−K(1)]. Alternatively, when two values 1 and 2 are used as the orders n, the adder 105$g$ outputs two pairs of sums, that is, a pair of sums τvs(1)·K(1)+τes(1)·[1−K(1)] and τvc(1)·K(1)+τec(1)·[1−K(1)] and a pair of sums τvs(2)·K(2)+τes(2)·[1−K(2)] and τvc(2)·K(2)+τec(2)·[1−K(2)]. In FIG. 2, slants "/" attached to arrows each indicate such paired inputs/outputs.

When a sine value component τds(n) and a cosine value component τdc(n) of the load torque τd for the $n^{th}$ order are introduced, equations (9) are obtained from a left equation of the equation (2).

$$\tau vs(n) = \tau es(n) - \tau ds(n)$$

$$\tau vc(n) = \tau ec(n) - \tau dc(n) \quad (9)$$

The adder 105$g$ can thus output paired values τes(n)−K(n)·τds(n) and τec(n)−K(n)·τdc(n).

FIG. 6 is a block diagram illustrating the configuration of the correction amount calculation unit 105$h$. The correction amount calculation unit 105$h$ includes a PI control unit 11$h$ and a composite value calculation unit 11$y$. A case where the number of orders n is one is herein shown as an example for simplicity.

The PI control unit 11$h$ includes PI controllers 11$hs$ and 11$hc$ each performing proportional integral control. The PI controller 11$hs$ performs proportional integral control on a value relating to the sine value components. The PI controller 11$hc$ performs proportional integral control on a value relating to the cosine value components.

FIG. 7 is a block diagram illustrating the configuration of the PI controller 11$hs$. The PI controller 11$hs$ includes a proportion unit 11$h$1, an integration unit 11$h$2, and an adder 11$h$3. The proportion unit 11$h$1 outputs the product obtained by multiplying an input into the PI controller 11$hs$ by a gain Kps(n) set for each order n. The integration unit 11$h$2 outputs the product obtained by multiplying an integral value of the above-mentioned input by a gain Kis(n) set for each order n. The adder 11$h$3 outputs the sum obtained by adding the above-mentioned two products.

Figure 8:
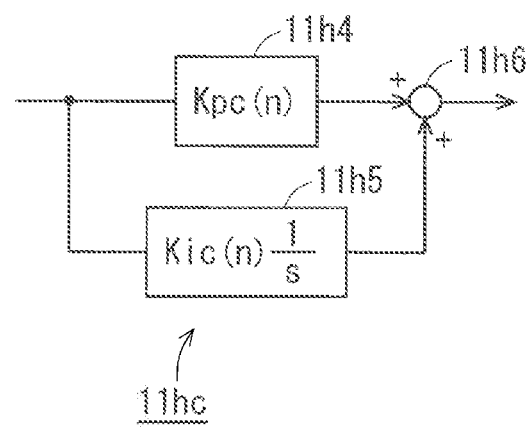
FIG. 8 is a block diagram illustrating the configuration of a PI controller.

FIG. 8 is a block diagram illustrating the configuration of the PI controller 11$hc$. The PI controller 11$hc$ includes a proportion unit 11$h$4, an integration unit 11$h$5, and an adder 11$h$6. The proportion unit 11$h$4 outputs the product obtained by multiplying an input into the PI controller 11$hc$ by a gain Kpc(n) set for each order n. The integration unit 11$h$5 outputs the product obtained by multiplying an integral value of the above-mentioned input by a gain Kic(n) set for each order n. The adder 11$h$6 outputs the sum obtained by adding the above-mentioned two products.

How to set the gains Kps(n), Kpc(n), Kis(n), and Kic(n) is a matter of design choice, and the proportional integral control itself is known technology, so that further detailed description is omitted herein.

The PI controller 11$hs$ receives the value $\tau es(n)-K(n)\cdot\tau ds(n)$ as an input, and outputs a result obtained by performing the proportional integral control thereon. The PI controller 11$hc$ receives the value $\tau ec(n)-K(n)\cdot\tau dc(n)$ as an input, and outputs a result obtained by performing the proportional integral control thereon.

The composite value calculation unit 11$y$ obtains a composite value by combining the result of the proportional integral control relating to the sine value components obtained by the PI controller 11$hs$ and the result of the proportional integral control relating to the cosine value components obtained by the PI controller 11$hc$ in the following manner.

The composite value calculation unit 11$y$ includes multipliers 11$j$, 11$k$, and 11$p$, a sine value generation unit 11$q$, a cosine value generation unit 11$r$, and an adder 11$s$.

The multiplier 11$p$ receives the order n and the rotational angle $\theta m$ as inputs, and obtains the product $n\cdot\theta m$ of them. The sine value generation unit 11$q$ receives the product $n\cdot\theta m$ as an input, and obtains a sine value $\sin(n\cdot\theta m)$. The cosine value generation unit 11$r$ receives the product $n\cdot\theta m$ as an input, and obtains a cosine value $\cos(n\cdot\theta m)$.

The multiplier 11$j$ obtains the product of the result obtained by the PI controller 11$hs$ and the sine value $\sin(n\cdot\theta m)$. The multiplier 11$k$ obtains the product of the result obtained by the PI controller 11$hc$ and the cosine value $\cos(n\cdot\theta m)$. The adder 11$s$ obtains the composite value by combining the trigonometric functions. Specifically, the adder 11$s$ obtains the composite value as the sum of the product obtained by the multiplier 11$j$ and the product obtained by the multiplier 11$k$. The composite value is output from the composite value calculation unit 11$y$ as the first $\gamma c$-axis current correction value $\Delta i\gamma c1$. This corresponds to obtaining, using the results obtained by the PI controllers 11$hs$ and 11$hc$ as coefficients of a Fourier series, the first $\gamma c$-axis current correction value $\Delta i\gamma c1$ from a result of the Fourier series.

As described above, by obtaining the first $\gamma c$-axis current correction value $\Delta i\gamma c1$ on the basis of the $n^{th}$-order components of the vibration torque $\tau v$ and the output torque $\tau e$, and subtracting the first $\gamma c$-axis current correction value $\Delta i\gamma c1$ from the $\gamma c$-axis current $i\gamma c$, the subtractor 109 eventually corrects the rotational speed command $\omega e^*$ so that the rotational speed command $\omega e^*$ increases with increasing vibration torque $\tau v$ and/or increasing output torque $\tau e$. As described above, the first $\gamma c$-axis current correction value $\Delta i\gamma c1$ is obtained by performing the proportional integral control on the ripple of the vibration torque $\tau v$ and the output torque $\tau e$, and thus the corrected rotational speed command $\omega e^*$ is controlled to suppress the ripple of the vibration torque $\tau v$ and the output torque $\tau e$.

Before the correction amount calculation unit 105$h$ performs the proportional integral control, the effect of the vibration torque $\tau v$ and the output torque $\tau e$ on the rotational speed command $\omega eo^*$ is prorated with the proration coefficients K(n) and [1−K(n)]. This is preferable not only from the viewpoint of being capable of maintaining the proration rate regardless of the gain in the proportional integral control but also from the viewpoint of not requiring a frequency band according to the rotational speed of the mechanical angle in the proportional integral control.

When a plurality of orders n are set, the correction amount calculation unit 105$h$ includes the PI control unit 11$h$ and the composite value calculation unit 11$y$ excluding the adder 11$s$ for each order. The adder 11$s$ adds all the outputs of the composite value calculation units 11$y$ set for respective orders, and outputs the added outputs as the first $\gamma c$-axis current correction value $\Delta i\gamma c1$.

Assume that the proration coefficient K(n) is one for the $n^{th}$ order. In this case, an output of the proration coefficient multiplication unit 105$f$ is zero, and the output torque $\tau e$ does not contribute to the first $\gamma c$-axis current correction value $\Delta i\gamma c1$ and only the vibration torque $\tau v$ contributes to correction of the rotational speed command $\omega eo^*$. In this case, correction of the rotational speed command $\omega eo^*$ contributes mainly to suppression of the vibration torque $\tau v$.

Assume that the proration coefficient K(n) is zero for the $n^{th}$ order. In this case, an output of the proration coefficient multiplication unit 105$c$ is zero, and the vibration torque $\tau v$ does not contribute to the first $\gamma c$-axis current correction value $\Delta i\gamma c1$ and only the output torque $\tau e$ contributes to correction of the rotational speed command $\omega eo^*$. In this case, correction of the rotational speed command $\omega eo^*$ contributes mainly to suppression of the ripple of the output torque $\tau e$, making it easy to maintain the amplitude of the current [I] constant.

It can be seen from the above-mentioned description that the effect of suppressing the vibration torque $\tau v$ through correction of the rotational speed command $\omega eo^*$ can be obtained even if the adder 105$g$, the output torque extraction unit 105B, and the proration coefficient multiplication unit 105$c$ are omitted from the $\gamma c$-axis current correction unit 105, and the correction amount calculation unit 105$h$ obtains the first $\gamma c$-axis current correction value $\Delta i\gamma c1$ using the sine value component $\tau vs(n)$ and the cosine value component $\tau vc(n)$ (more specifically, by performing the proportional integral control thereon) without using the sine value component $\tau es(n)$ and the cosine value component $\tau ec(n)$.

Similarly, it can be seen that the effect of suppressing the ripple of the output torque $\tau e$ through correction of the rotational speed command $\omega eo^*$ can be obtained even if the adder 105$g$, the vibration torque extraction unit 105A, and the proration coefficient multiplication unit 105$f$ are omitted from the $\gamma c$-axis current correction unit 105, and the correction amount calculation unit 105$h$ obtains the first $\gamma c$-axis current correction value $\Delta i\gamma c1$ using the sine value component $\tau es(n)$ and the cosine value component $\tau ec(n)$ (more specifically, by performing the proportional integral control thereon) without using the sine value component $\tau vs(n)$ and the cosine value component $\tau vc(n)$.

Second Embodiment

In the present embodiment, technology for improving the efficiency of the synchronous motor 3 using the first $\gamma c$-axis current correction value $\Delta i\gamma c1$ is described. A case where a vibration of a fundamental frequency of the vibration torque $\tau v$ is suppressed in the first embodiment is considered. As described above, the fundamental frequency of the vibration torque $\tau v$ corresponds to the equation n=1 when the mechanical load is the one-cylinder compressor, and corresponds to the equation n=2 when the mechanical load is the two-cylinder compressor. First, description will be made on the assumption that the mechanical load is the one-cylinder compressor for simplicity.

In the first embodiment, the $1^{st}$-order component of the fundamental frequency (hereinafter, referred to as a "fundamental wave component") of the vibration torque $\tau v$ is suppressed by using the vibration torque extraction unit 105A and the output torque extraction unit 105B, and using only the value 1 as the order n. In particular, the fundamental wave component of the vibration torque $\tau v$ almost disappears by setting K(1) to one.

However, the ripple of a component other than the component of the fundamental frequency of the output torque $\tau e$ is not necessarily suppressed. On the other hand, the ripple can be the origin of a harmonic component of the current flowing through the synchronous motor 3. The efficiency of the synchronous motor 3 deteriorates with increasing number of harmonic components flowing through the synchronous motor 3. The efficiency of the synchronous motor 3 is thus improved by suppressing the ripple of the output torque $\tau e$. Note that the fundamental wave component of the vibration torque $\tau v$ is suppressed as described above. Thus, in the present embodiment, the ripple of the output torque $\tau e$ is suppressed for an order other than the order of the fundamental wave component to improve the efficiency of the synchronous motor 3.

Figure 9:
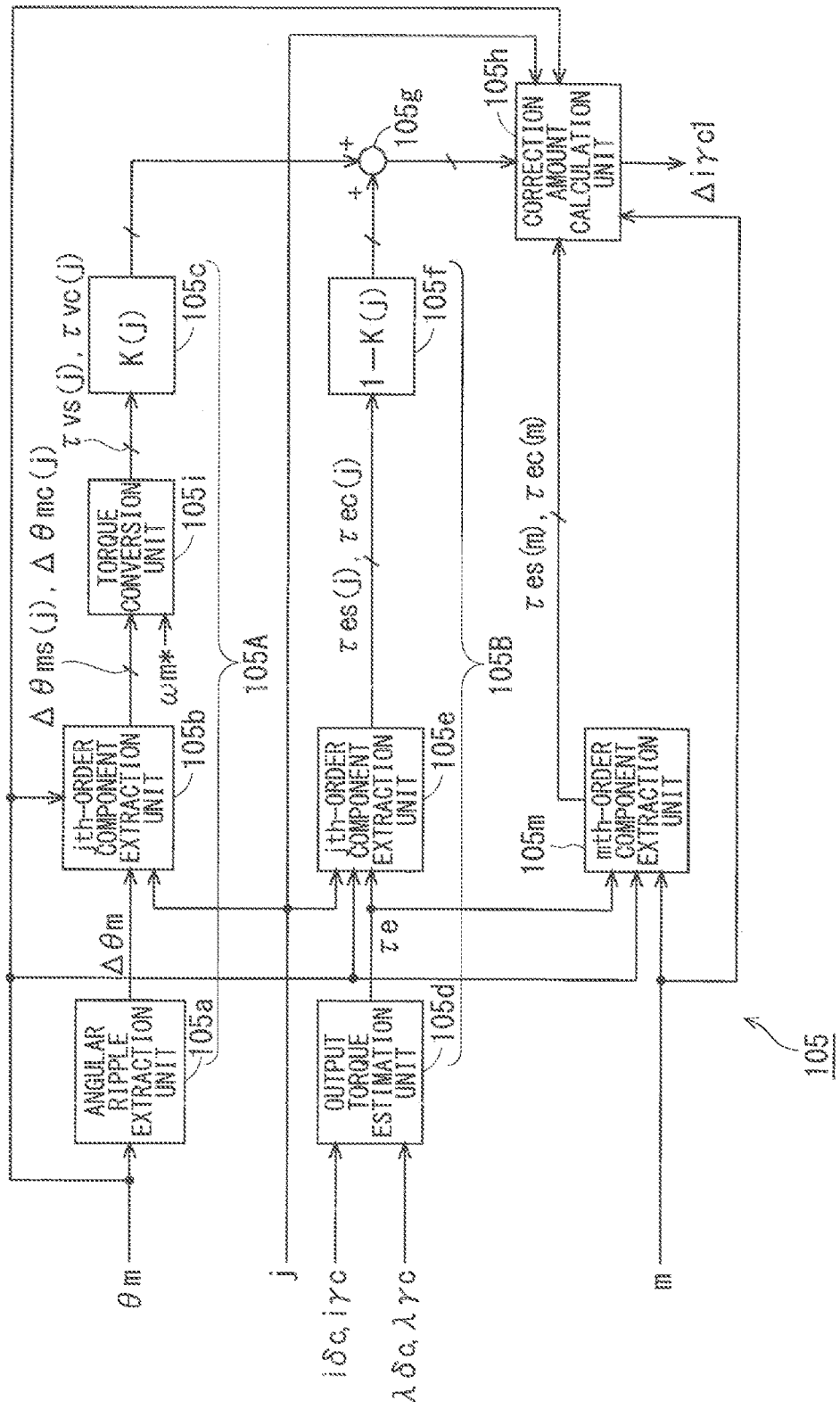
FIG. 9 is a block diagram illustrating the configuration of the γc-axis current correction unit in a second embodiment.

FIG. 9 is a block diagram illustrating the configuration of the $\gamma c$-axis current correction unit 105 used in the present embodiment. The $\gamma c$-axis current correction unit 105 includes the vibration torque extraction unit 105A, the output torque extraction unit 105B, the adder 105g, and the correction amount calculation unit 105h as in the first embodiment. The configuration of the correction amount calculation unit 105h in the present embodiment will be described in details below.

The vibration torque extraction unit 105A, the output torque extraction unit 105B, and the adder 105g have similar configuration to that in the first embodiment. Note that the symbol "n" representing the order in FIG. 2 is replaced, in FIG. 9, by a symbol "j" representing the order, as a case where $j^{th}$-order components of various amounts are extracted is shown herein. An equation j=1 holds when the mechanical load is the one-cylinder compressor, and an equation j=2 holds when the mechanical load is the two-cylinder compressor. A plurality of orders j can naturally be used to suppress the vibration torque $\tau v$ for the plurality of orders. Such suppression for the plurality of orders is described in the first embodiment, and thus description thereof is omitted herein.

That is to say, a $j^{th}$-order component extraction unit 105b extracts, from the rotational angle difference $\Delta\theta m$, vibration torque suppression components $\Delta\theta ms(j)$ and $\Delta\theta mc(j)$ as components for at least one order including the $1^{st}$-order components of the fundamental frequency of the vibration torque $\tau v$. A $j^{th}$-order component extraction unit 105e extracts, from the output torque (to be exact, an estimated value thereof) $\tau e$, components $\tau es(j)$ and $\tau ec(j)$ for the $j^{th}$ order corresponding to the vibration torque suppression components $\Delta\theta ms(j)$ and $\Delta\theta mc(j)$.

In the present embodiment, the $\gamma c$-axis current correction unit 105 further includes an $m^{th}$-order component extraction unit 105m. The $m^{th}$-order component extraction unit 105m has similar configuration to the $j^{th}$-order component extraction unit 105e, and extracts $m^{th}$-order components $\tau es(m)$ and $\tau ec(m)$ from the output torque (to be exact, the estimated value thereof) $\tau e$. The order m, however, is at least one order used from among orders other than the order j corresponding to the vibration torque suppression components $\Delta\theta ms(j)$ and $\Delta\theta mc(j)$.

Figure 10:
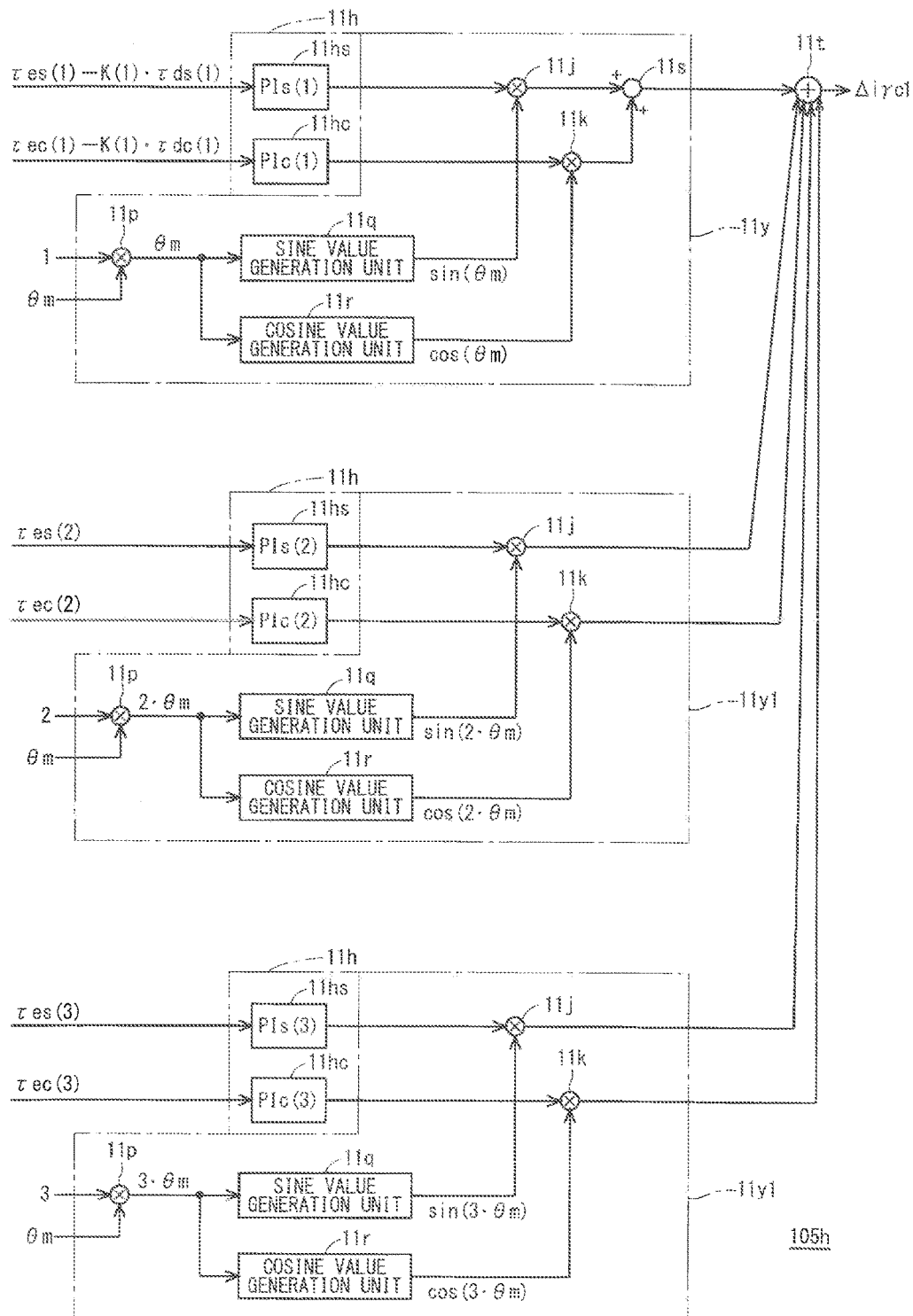
FIG. 10 is a block diagram illustrating the configuration of the correction amount calculation unit in the second embodiment.

Description will be made below by taking, as an example, a case where equations j=1 and m=2, 3 hold for simplicity. FIG. 10 is a block diagram illustrating the configuration of the correction amount calculation unit 105h in the present embodiment. The correction amount calculation unit 105h includes three PI control units 11h, the composite value calculation unit 11y, two composite value calculation units 11y1, and an adder 11t.

The PI control unit 11h at the top of FIG. 10 and the composite value calculation unit 11y have similar configuration to that in the correction amount calculation unit 105h shown in the first embodiment. They, however, herein function to correspond to the vibration torque suppression components $\Delta\theta ms(1)$ and $\Delta\theta mc(1)$, and the PI control unit 11h receives values $\tau es(1) - K(1) \cdot \tau ds(1)$ and $\tau ec(1) - K(1) \cdot \tau dc(1)$ as inputs. While a value 1 representing the order j is input into the composite value calculation unit 11y, and is multiplied by the rotational angle $\theta m$ by the multiplier 11p, it is obvious that the multiplier 11p may be omitted when the order j is 1.

The PI control unit 11h at the middle of FIG. 10 receives values $\tau es(2)$ and $\tau ec(2)$ as inputs. The PI control unit 11h at the bottom of FIG. 10 receives values $\tau es(3)$ and $\tau ec(3)$ as inputs. That is to say, the $m^{th}$-order component extraction unit can be seen as an apparent modification of the configuration of the output torque extraction unit 105B in the first embodiment, other than the output torque estimation unit 105d, obtained by setting the proration coefficient K(m) to zero for the $m^{th}$ order. The $m^{th}$-order components $\tau es(m)$ and $\tau ec(m)$ can thus be understood as output torque suppression components for suppressing the output torque for the $m^{th}$ order.

The composite value calculation units 11y1 each have the configuration of the composite value calculation unit 11y from which the adder 11s has been omitted, and the multipliers 11p, 11j, and 11k, the sine value generation unit 11q, and the cosine value generation unit 11r in each of them have the same functions as those shown in the first embodiment.

The adders 11s and 11t each receive the sum of the output of the multiplier 11j and the output of the multiplier 11k for a corresponding one of the orders 1, 2, and 3, and output it as the first $\gamma c$-axis current correction value $\Delta i\gamma c1$. This means that, in the present embodiment, the $\gamma c$-axis current correction unit 105 obtains the first $\gamma c$-axis current correction value $\Delta i\gamma c1$ using the sum obtained by the adder 105g and the output torque suppression components $\tau es(m)$ and $\tau ec(m)$ obtained by the $m^{th}$-order component extraction unit 105m. It is obvious from the description in the first embodiment that the first $\gamma c$-axis current correction value $\Delta i\gamma c1$ thus obtained contributes to suppression of the ripple of the $m^{th}$-order components of the output torque $\tau e$ in correction of the rotational speed command $\omega eo^*$.

As described above, the $j^{th}$-order components of the vibration torque $\tau v$ and the $m^{th}$-order ($m \neq j$) components of the output torque $\tau e$ can be suppressed in the present embodiment.

The composite value calculation unit 11y at the top of FIG. 10 may be replaced by the composite value calculation unit 11y1, and the adder 11t may further have the function of the adder 11s.

The output torque suppression components τes(m) and τec(m) are not prorated with the m$^{th}$-order components of the vibration torque τv, and thus may individually be amplified for each order before being input into the correction amount calculation unit 105h. Similarly, the outputs of the adder 105g may individually be amplified for each order in the first embodiment. In other words, proration coefficients C(n)·K(n) and C(n)·[1−K(n)] (note that C(n) is a positive number for each order n) may be used in place of the proration coefficients K(n) and [1−K(n)]. It is obvious that the proration rate K(n)/[1−K(n)] is maintained in such a case.

Third Embodiment

In the present embodiment, technology for suppressing a peak value of a current flowing through the synchronous motor 3 (hereinafter, referred to as a "motor current") using the first γc-axis current correction value Δiγc1 is described. The case where the vibration of the fundamental frequency of the vibration torque τv is suppressed in the first embodiment is considered. As described above, the fundamental frequency of the vibration torque τv corresponds to the equation n=1 when the mechanical load is the one-cylinder compressor, and corresponds to the equation n=2 when the mechanical load is the two-cylinder compressor. First, description will be made on the assumption that the mechanical load is the one-cylinder compressor for simplicity.

In the first embodiment, the fundamental wave components of the vibration torque τv and the output torque τe are suppressed by using the vibration torque extraction unit 105A and the output torque extraction unit 105B, and using only the value 1 as the order n. The ripple of the vibration torque τv and the output torque τe is caused mainly by the fundamental wave components thereof, and thus suppression of the fundamental wave components is important.

In a case where the first γc-axis current correction value Δiγc1 required to suppress the fundamental wave components of the vibration torque τv is obtained, however, the peak value of the motor current can increase. Control to limit the peak value of the motor current (e.g., control to set the upper limits of the δc-axis voltage command value vδ* and the γc-axis voltage command value vγ* shown in FIG. 1 in the magnetic flux control unit 102) is usually used in many cases from the viewpoint of overcurrent protection.

It is thus desirable to decrease the peak value of the motor current so that suppression of the fundamental wave components of the vibration torque τv is not impaired by the control to limit the peak value of the motor current. In the present embodiment, technology for reducing the peak of the sum of the n$^{th}$-order components τes(n) and τec(n) for the n$^{th}$ order while maintaining fundamental wave components τes(1) and τec(1) of the output torque to is shown.

In a case where the peak of the sum of the n$^{th}$-order components τes(n) and τec(n) for the n$^{th}$ order is reduced, a waveform of the sum of components for the odd order can show a rectangular wave if the value of the order n does not have an upper limit. When the amplitude of the rectangular wave is assumed to be one, the rectangular wave is expressed by an equation (10) shown below if an upper limit value D is set to infinity in a function R(Ψ) of a phase Ψ. Note that an odd number d is introduced, and the symbol Σ herein indicates the sum for the odd number d.

$$R(\Psi) = \frac{4}{\pi} \sum_{d=1}^{D} \frac{1}{d} \cdot \sin(d \cdot \Psi) \quad (10)$$

Thus, in the present embodiment, as for an odd-order component of the output torque τe for the odd order d equal to or greater than a 3$^{rd}$ order, a command value of the odd-order component (hereinafter, referred to as an "odd-order torque command") in view of reduction of the above-mentioned peak value is obtained. The first γc-axis current correction value Δiγc1 is obtained also based on a difference between the odd-order component and the odd-order torque command.

On the other hand, as for a higher-order component of the output torque τe for the even order, a sine value component τes(e) and a cosine value component τec(e) thereof (introducing an even number e) are extracted to be used for calculation to obtain the first γc-axis current correction value Δiγc1 by assuming that an equation K(e)=0 holds in line with the first embodiment.

Figure 11:
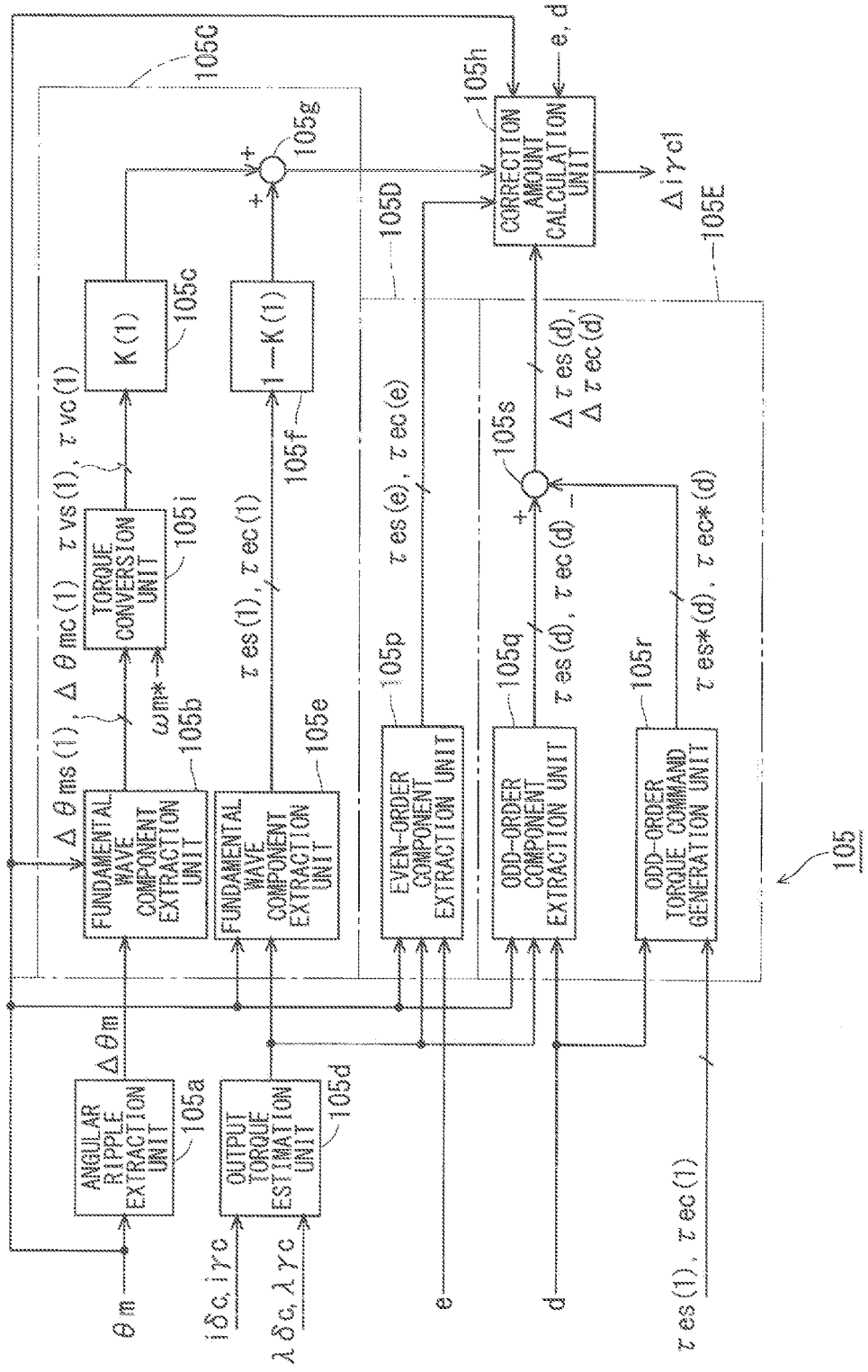
FIG. 11 is a block diagram illustrating the configuration of the γc-axis current correction unit in a third embodiment.

FIG. 11 is a block diagram illustrating the configuration of the γc-axis current correction unit 105 used in the present embodiment. The γc-axis current correction unit 105 includes the angular ripple extraction unit 105a, the n$^{th}$-order component extraction units 105b and 105e, the torque conversion unit 105i, the proration coefficient multiplication units 105c and 105f, the output torque estimation unit 105d, the adder 105g, and the correction amount calculation unit 105h as in the first embodiment. The configuration of the correction amount calculation unit 105h in the present embodiment will be described in details below.

In the present embodiment, however, the n$^{th}$-order component extraction units 105b and 105e each extract only the fundamental wave components. Specifically, the n$^{th}$-order component extraction unit 105b extracts the fundamental wave components Δθms(1) and Δθmc(1) of the rotational angle θm from the rotational angle difference Δθm. This allows the torque conversion unit 105i to output a sine value component τvs(1) and a cosine value component τvc(1) of the fundamental wave components of the vibration torque τv, and the proration coefficient multiplication unit 105c multiplies each of them by a proration coefficient K(1). For this reason, the n$^{th}$-order component extraction unit 105b is shown as a "fundamental wave component extraction unit" in FIG. 11.

Similarly, the n$^{th}$-order component extraction unit 105e extracts the sine value component τes(1) and the cosine value component τec(1) of the fundamental wave components of the output torque τe (to be exact, the estimated value thereof). The proration coefficient multiplication unit 105f multiplies each of them by a proration coefficient [1−K(1)]. For this reason, the n$^{th}$-order component extraction unit 105e is shown as a "fundamental wave component extraction unit" in FIG. 11.

From the above-mentioned description, in the present embodiment, the n$^{th}$-order component extraction unit 105b, the torque conversion unit 105i, the proration coefficient multiplication unit 105c, the n$^{th}$-order component extraction unit 105e, the proration coefficient multiplication unit 105f, and the adder 105g can be considered as a fundamental wave component proration unit 105C that extracts the fundamental wave components of each of the vibration torque τv and the output torque τe, and prorates them with a predetermined proration rate (K(1)/[1−K(1)]).

In a case where the ripple of the vibration torque τv is not suppressed, the angular ripple extraction unit 105a, the $n^{th}$-order component extraction unit 105b, the torque conversion unit 105i, the proration coefficient multiplication unit 105c, and the adder 105g can be omitted by assuming that an equation K(1)=0 holds. This means that, in the present embodiment, the vibration torque τv including the fundamental wave components thereof are not necessarily extracted.

The γc-axis current correction unit 105 further includes an output torque even-order output unit 105D and an output torque odd-order output unit 105E.

The output torque even-order output unit 105D obtains even-order components, which are components for the even order e, of the output torque τe, and outputs them to the correction amount calculation unit 105h. The output torque odd-order output unit 105E obtains differences between odd-order components of the output torque and odd-order torque commands, and outputs them to the correction amount calculation unit 105h.

Specifically, the output torque even-order output unit 105D includes an even-order component extraction unit 105p. The even-order component extraction unit 105p receives the rotational angle θm, the output torque τe (to be exact, the estimated value thereof: obtained from the output torque estimation unit 105d), and the even order e as inputs, and obtains the sine value component τes(e) and the cosine value component τec(e) as components (output torque even-order suppression components) for suppressing the output torque for the even order. The even-order component extraction unit 105p has similar configuration to that of the $n^{th}$-order component extraction unit 105e described in the first embodiment, and differs from the $n^{th}$-order component extraction unit 105e only in that the order n as input is limited to the even order e. The sine value component τes(e) and the cosine value component τec(e) are used as the above-mentioned even-order components.

A plurality of orders e may be used. In this case, a plurality of even-order component extraction units 105p may be provided in the output torque even-order output unit 105D for respective orders e.

The output torque odd-order output unit 105E includes an odd-order component extraction unit 105q, an odd-order torque command generation unit 105r, and a subtractor 105s.

The odd-order component extraction unit 105q receives the rotational angle θm, the output torque τe, and the odd order d equal to or greater than the $3^{rd}$ order as inputs, and obtains a sine value component τes(d) and a cosine value component τec(d) as components (output torque odd-order suppression components) for suppressing the output torque for the odd order. The odd-order component extraction unit 105q also has similar configuration to that of the $n^{th}$-order component extraction unit 105e described in the first embodiment, and differs from the $n^{th}$-order component extraction unit 105e only in that the order n as input is limited to the odd order d equal to or greater than the $3^{rd}$ order.

The odd-order torque command generation unit 105r obtains a command value (hereinafter, referred to as an "odd-order torque command sine value component") τes*(d) of the sine value component τes(d) and a command value (hereinafter, referred to as an "odd-order torque command cosine value component") τec*(d) of the cosine value component τec(d). Details thereof will be described below.

The subtractor 105s obtains a deviation Δτes(d) of the sine value component τes(d) from the odd-order torque command sine value component τes*(d) and a deviation Δτec(d) of the cosine value component τec(d) from the odd-order torque command cosine value component τec*(d). Specifically, equations Δτes(d)=τes(d)−τes*(d) and Δτec(d)=τec(d)−τec*(d) hold.

A plurality of orders d may be used. In this case, a plurality of odd-order component extraction units 105q, a plurality of odd-order torque command generation units 105r, and a plurality of subtractors 105s may be provided in the output torque odd-order output unit 105E for respective orders d.

Description will be made below by taking, as an example, a case where equations d=3 and e=2 hold for simplicity. FIG. 12 is a block diagram illustrating the configuration of the correction amount calculation unit 105h in the present embodiment. The correction amount calculation unit 105h includes the three PI control units 11h, the composite value calculation unit 11y, the two composite value calculation units 11y1, and the adder 11t. The configuration shown herein itself is the same as the configuration shown in FIG. 10.

However, inputs into the PI control unit 11h at the bottom differ from those in the second embodiment, and deviations Δτes(3) and Δτec(3) are respectively input into the PI controllers 11hs and 11hc. The configuration other than the inputs is similar to that in the second embodiment, and the first γc-axis current correction value Δiγc1 is obtained also in the present embodiment.

While the order 1 is input into the composite value calculation unit 11y, and is multiplied by the rotational angle θm by the multiplier 11p, it is obvious that the multiplier 11p can be omitted.

Figure 13:
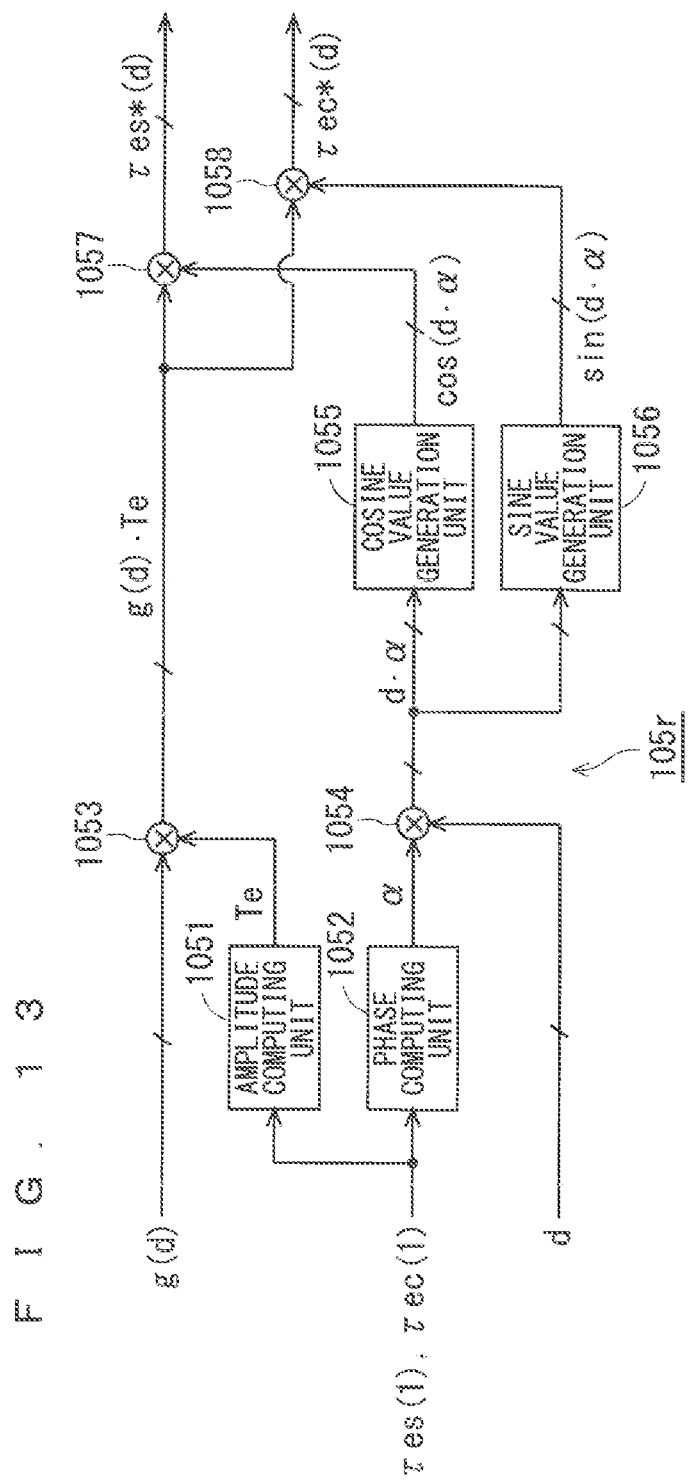
FIG. 13 is a block diagram illustrating the configuration of an odd-order torque command generation unit in the third embodiment.

FIG. 13 is a block diagram illustrating the configuration of the odd-order torque command generation unit 105r. The odd-order torque command generation unit 105r includes an amplitude computing unit 1051, a phase computing unit 1052, multipliers 1053, 1054, 1057, and 1058, a cosine value generation unit 1055, and a sine value generation unit 1056.

The amplitude computing unit 1051 obtains a magnitude Te of fundamental wave components τe(1) of the output torque τe. The phase computing unit 1052 obtains a phase α of the output torque τe relative to the rotational angle θm. Specifically, an equation (11) holds, and thus the magnitude Te and the phase α are obtained by equations (12).

$$\tau e(1) = \tau es(1) \cdot \sin\theta m + \tau ec(1) \cdot \cos\theta m \qquad (11)$$
$$= Te \cdot \sin(\theta m + \alpha)$$

$$\alpha = \tan^{-1}\frac{\tau ec(1)}{\tau es(1)}, \; Te = \sqrt{\tau es(1)^2 + \tau ec(1)^2} \qquad (12)$$

That is to say, the phase α is obtained as a value of an arctangent function of a value obtained by dividing the cosine value component τec(1) by the sine value component τes(1), and the magnitude Te is obtained as a square root of the sum of the square of the sine value component τes(1) and the square of the cosine value component τec(1).

When an angle (θm+α) is 0 degrees, 180 degrees, and 360 degrees (see also FIGS. 14 and 16 described below), the output torque for the odd order always takes a value 0, and thus a sum τea of the output torque for the odd order (excluding the $1^{st}$-order components as the fundamental wave components) is expressed by an equation (13). Note that the upper limit value D is equal to that in the equation (10).

$$\tau ea = \sum_{d=3}^{D} g(d) \cdot Te \cdot \sin\{d \cdot (\theta m + \alpha)\} \qquad (13)$$

$$= \sum_{d=3}^{D} [\tau es*(d) \cdot \sin(d \cdot \theta m) + \tau ec*(d) \cdot \cos(d \cdot \theta m)]$$

The peak of the sum tea can be reduced by setting a coefficient g(d) in the first equation of the right-hand side of the equation (13) on the basis of the order d and the upper limit value D. Specifically, if the upper limit value D is set to infinity, the coefficient g(d) should be set to 1/d of a coefficient g(1) with reference to the equation (10). The peak of the sum τea can thereby be a minimum value thereof. Assume that an equation g(1)=1 holds in the following description unless otherwise noted.

On the other hand, the sum τea can be rewritten to the second equation of the right-hand side of the equation (13) by introducing the odd-order torque command sine value component τes*(d) and the odd-order torque command cosine value component τec*(d). The odd-order torque command sine value component τes*(d) and the odd-order torque command cosine value component τec*(d) can thus be obtained by equations (14):

$$\tau es*(d) = g(d) \cdot Te \cdot \cos(d \cdot \alpha),$$

$$\tau ec*(d) = g(d) \cdot Te \cdot \sin(d \cdot \alpha) \qquad (14)$$

Calculation in the equations (14) is achieved by the odd-order torque command generation unit 105r in the following manner. The multiplier 1053 multiplies the coefficient g(d) and the magnitude Te for each order d to obtain the product g(d)·Te. The multiplier 1054 multiplies the order d and the phase α for each order d to obtain the product d·α.

The cosine value generation unit 1055 obtains a cosine value cos(d·α) of the product d·α for each order d, and the sine value generation unit 1056 obtains a sine value sin(d·α) of the product d·α for each order d. The multiplier 1057 multiplies the product g(d)·Te and the cosine value cos(d·α) for each order d to obtain the odd-order torque command sine value component τes*(d). The multiplier 1058 multiplies the product g(d)·Te and the sine value sin(d·α) for each order d to obtain the odd-order torque command cosine value component τec*(d).

FIG. 14 is a graph showing a first example of the waveforms of the odd-order components of the output torque in the third embodiment. FIG. 15 is a graph showing the waveform of the sum of the odd-order components shown in FIG. 14. In this first example, the upper limit value D is set to an odd number 3. In the case of the first example, the peak of the waveform of the sum of the odd-order components is minimized by setting a coefficient g(3) to ⅙.

FIG. 16 is a graph showing a second example of the waveforms of the odd-order components of the output torque in the third embodiment. FIG. 17 is a graph showing the waveform of the sum of the odd-order components shown in FIG. 16. In this second example, the upper limit value D is set to an odd number 5. In the case of the second example, the peak of the waveform of the sum of the odd-order components is minimized by setting the coefficient g(3) to 0.232 and a coefficient g(5) to 0.06.

In each of the first and second examples, the peak of the fundamental wave components τe(1) is drawn to be 1. It can be seen that, in each of the first and second examples, the waveform of the sum of the odd-order components has a smaller peak than that of the fundamental wave components τe(1). In view of the equation (10), it can be seen that the peak of the waveform approaches a value (π/4) as the upper limit value D increases, in line with FIGS. 14 to 16.

As described above, the 1$^{st}$-order component of the vibration torque τv can be suppressed, and the peak of the output torque to can be suppressed.

The composite value calculation unit 11y at the top of FIG. 12 may be replaced by the composite value calculation unit 11y1, and the adder 11t may further have the function of the adder 11s as in the second embodiment.

The sine value component τes(e) and the cosine value component τec(e) for the even order, the sine value component τes(d) and the cosine value component τec(d) for the odd order, and the odd-order torque command sine value component τes*(d) and the odd-order torque command cosine value component τec*(d) are not prorated with the vibration torque τv, and thus may individually be amplified for each order before being input into the correction amount calculation unit 105h.

Fourth Embodiment

In some cases, there is no need to reduce the ripple of the output torque τe for the even order in the third embodiment. In this case, the output torque even-order output unit 105D can be omitted from the configuration shown in the third embodiment.

Figure 18:
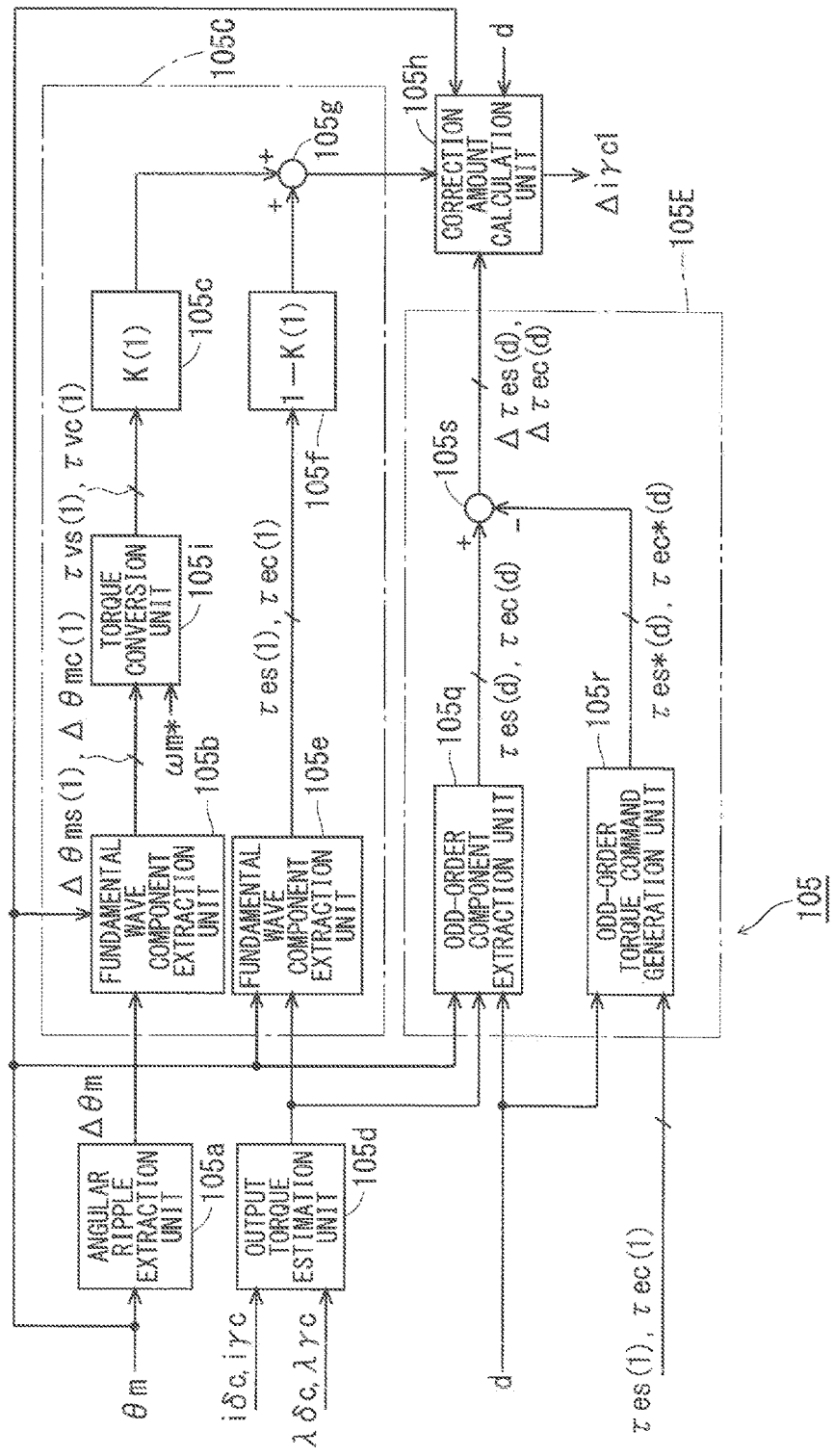
FIG. 18 is a block diagram illustrating the configuration of the γc-axis current correction unit used in a fourth embodiment.

FIG. 18 is a block diagram illustrating the configuration of the γc-axis current correction unit 105 used in the present embodiment. The γc-axis current correction unit 105 includes the angular ripple extraction unit 105a, the output torque estimation unit 105d, the correction amount calculation unit 105h, the fundamental wave component proration unit 105C, and the output torque odd-order output unit 105E as in the third embodiment. The output torque even-order output unit 105D, however, is not included as described above.

FIG. 19 is a block diagram illustrating the configuration of the correction amount calculation unit 105h in the present embodiment. The correction amount calculation unit 105h includes the composite value calculation unit 11y, the composite value calculation unit 11y1, the adder 11t, and the two PI control units 11h shown in the third embodiment. In contrast to the third embodiment, however, the sine value component τes(e) and the cosine value component τec(e) for the even order are not dealt with in the present embodiment. Thus, one of the PI control units 11h and the composite value calculation unit 11y1 obtain the composite value from deviations for the odd order, herein the deviations Δτes(3) and Δτec(3) for the 3$^{rd}$ order, in the present embodiment.

In the present embodiment, the correction amount calculation unit 105h does not deal with the sine value component τes(e) and the cosine value component τec(e) for the even order. Thus, there is no need to input the even order e into the correction amount calculation unit 105h (see FIG. 18).

The effect of reducing the peak value of the motor current can be obtained also in the present embodiment as in the third embodiment.

Fifth Embodiment

In the present embodiment, in contrast to the third embodiment, technology for reducing the peak value of the motor current through control using components for the even order while reducing the ripple of the output torque τe for the odd order is described.

Figure 20:
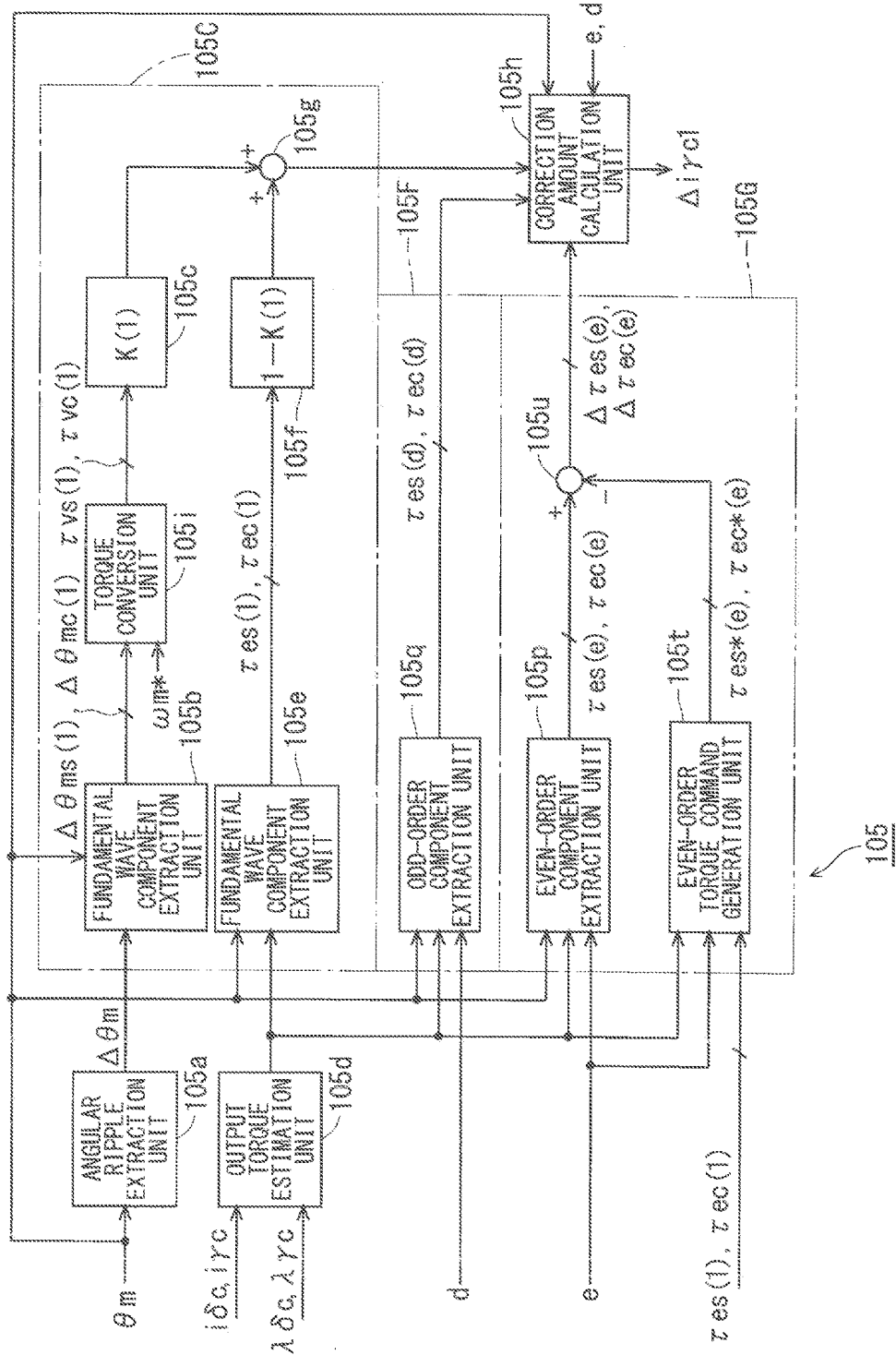
FIG. 20 is a block diagram illustrating the configuration of the γc-axis current correction unit used in a fifth embodiment.

FIG. 20 is a block diagram illustrating the configuration of the γc-axis current correction unit 105 used in the present embodiment. The γc-axis current correction unit 105 includes the angular ripple extraction unit 105a, the output torque estimation unit 105d, the correction amount calculation unit 105h, and the fundamental wave component proration unit 105C as in the third embodiment. In the present embodiment, however, the output torque even-order output unit 105D and the output torque odd-order output unit 105E in the third embodiment are respectively replaced by an output torque odd-order output unit 105F and an output torque even-order output unit 105G.

The output torque odd-order output unit 105F includes the odd-order component extraction unit 105q. The odd-order component extraction unit 105q is already described in the third embodiment, and thus details thereof are omitted herein. The odd-order component extraction unit 105q obtains the sine value component τes(d) and the cosine value component τec(d) as the components (output torque odd-order suppression components) for suppressing the output torque for the odd order.

The output torque even-order output unit 105G includes the even-order component extraction unit 105p, an even-order torque command generation unit 105t, and a subtractor 105u.

The even-order component extraction unit 105p is already described in the third embodiment, and thus details thereof are omitted herein. The even-order component extraction unit 105p outputs the sine value component τes(e) and the cosine value component τec(e).

The even-order torque command generation unit 105t obtains a command value (hereinafter, referred to as an "even-order torque command sine value component") τes*(e) of the sine value component τes(e) and a command value (hereinafter, referred to as an "even-order torque command cosine value component") τec*(e) of the cosine value component τec(e). Details thereof will be described below.

The subtractor 105u obtains a deviation Δτes(e) of the sine value component τes(e) from the even-order torque command sine value component τes*(e) and a deviation Δτec(e) of the cosine value component τec(e) from the even-order torque command cosine value component τec*(e). Specifically, equations Δτes(e)=τes(e)−τes*(e) and Δτec(e)=τec(e)−τec*(e) hold.

A plurality of orders e may be used. In this case, a plurality of even-order component extraction units 105p, a plurality of even-order torque command generation units 105t, and a plurality of subtractors 105u may be provided in the output torque even-order output unit 105G for respective orders e.

Figure 21:
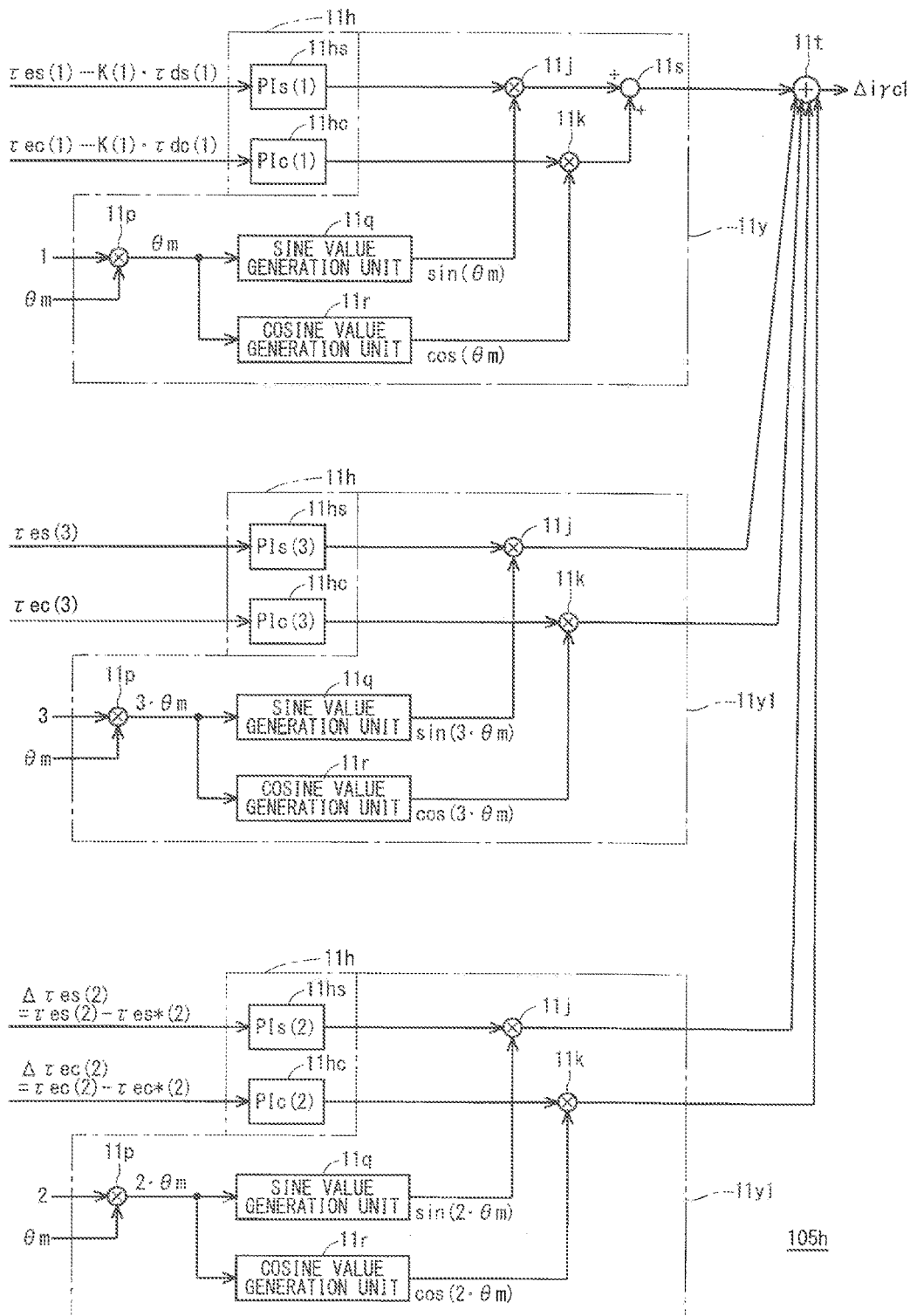
FIG. 21 is a block diagram illustrating the configuration of the correction amount calculation unit in the fifth embodiment.

Description will be made below by taking, as an example, a case where the equations d=3 and e=2 hold for simplicity also in the present embodiment. FIG. 21 is a block diagram illustrating the configuration of the correction amount calculation unit 105h in the present embodiment. The correction amount calculation unit 105h includes the three PI control units 11h, the composite value calculation unit 11y, the two composite value calculation units 11y1, and the adder 11t. The configuration shown herein itself is the same as the configuration shown in FIG. 12.

However, inputs into the PI control units 11h at the middle and at the bottom differ from those in the third embodiment. In the present embodiment, components for the odd order are considered for the ripple of the output torque, and components for the even order are considered for suppression of the peak value of the motor current. A sine value component τes(3), a cosine value component τec(3), and deviations Δτes(2) and Δτec(2) are thus used in place of the deviations Δτes(3) and Δτec(3), the sine value component τes(2), and the cosine value component τec(2) in the third embodiment, respectively.

Figure 22:
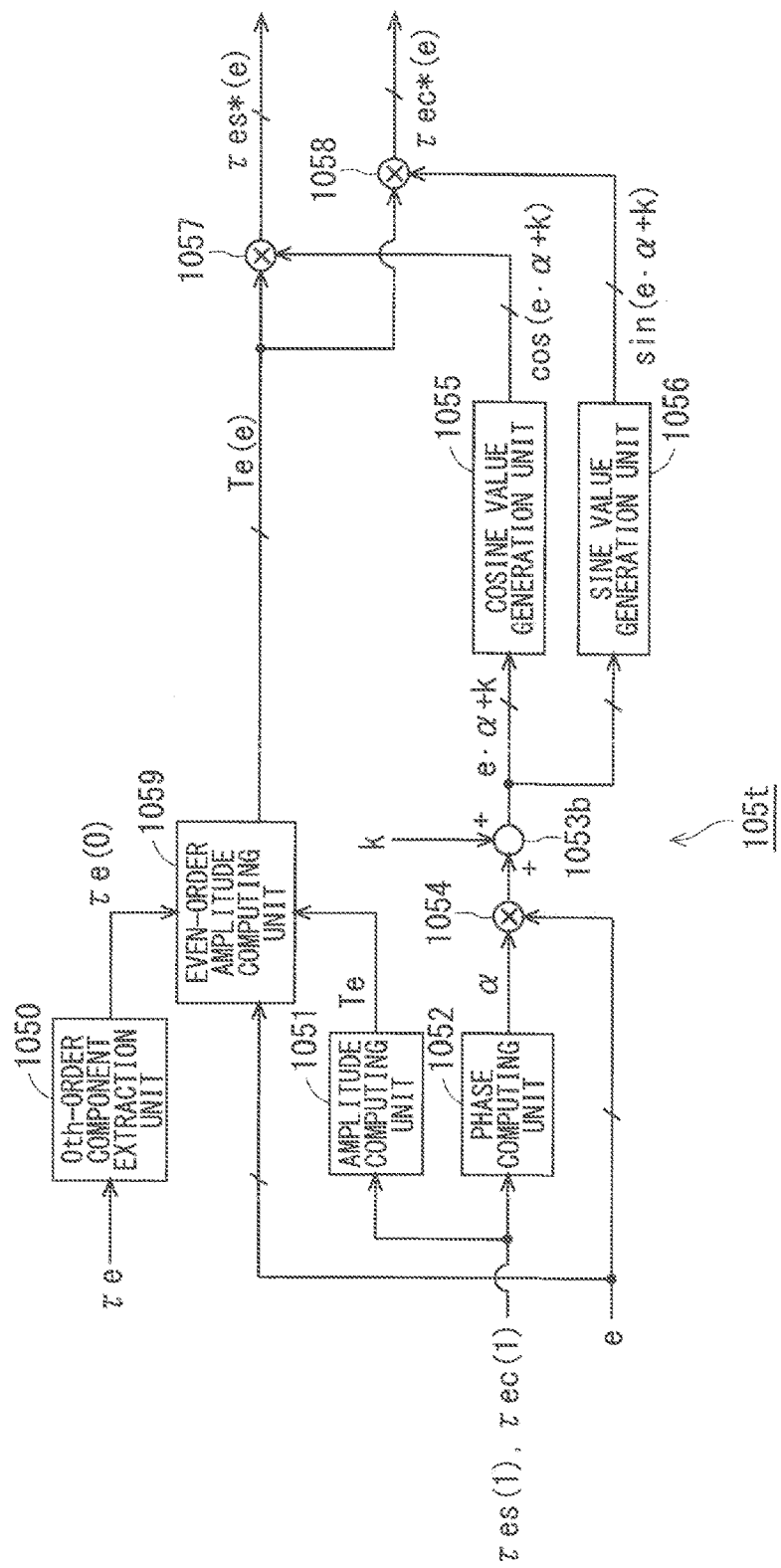
FIG. 22 is a block diagram illustrating the configuration of an even-order torque command generation unit in the fifth embodiment.

FIG. 22 is a block diagram illustrating the configuration of the even-order torque command generation unit 105t. The even-order torque command generation unit 105t includes a $0^{th}$-order component extraction unit 1050, the amplitude computing unit 1051, the phase computing unit 1052, the multipliers 1054, 1057, and 1058, the cosine value generation unit 1055, the sine value generation unit 1056, an even-order amplitude computing unit 1059, and an adder 1053b.

The amplitude computing unit 1051, the phase computing unit 1052, the multipliers 1054, 1057, and 1058, the cosine value generation unit 1055, and the sine value generation unit 1056 are already described in the third embodiment, and thus description thereof is omitted herein.

In the present embodiment, however, the even order e is provided for the multiplier 1054 in place of the odd order d. The multiplier 1054 thus outputs not the product d·α but the product e·α.

The multiplier 1057 receives a cosine value cos(e·α+k) as an input in place of the cosine value cos(d·α) shown in the third embodiment. The multiplier 1058 receives a sine value sin(e·α+k) as an input in place of the sine value sin(d·α) shown in the third embodiment.

In the present embodiment, the cosine value generation unit 1055 and the sine value generation unit 1056 each receive a value (e·α+k) as an input to obtain the cosine value cos(e·α+k) and the sine value sin(e·α+k). To obtain the value (e·α+k), the product e·α obtained from the multiplier 1054 and a shift amount k are added by the adder 1053b.

The multipliers 1057 and 1058 each receive a magnitude Te(e) of the even-order components as an input in place of the product g(d)·Te shown in the third embodiment. In the third embodiment, the product g(d)·Te input into each of the multipliers 1057 and 1058 is determined by the coefficient g(d) based on the rectangular wave and the magnitude Te of the fundamental wave components τe(1) of the output torque τe. However, suppression of the current using the components for the even order is further complicated for a reason described below, and it is necessary to perform calculation also using a $0^{th}$-order component τe(0) of the output torque τe.

Due to the need for such calculation, the $0^{th}$-order component extraction unit 1050 and the even-order amplitude computing unit 1059 are provided for the even-order torque command generation unit 105t. The $0^{th}$-order component extraction unit 1050 extracts the $0^{th}$-order component τe(0) from the output torque τe as a constant component thereof. The extraction itself is achieved by known technology, and thus description thereof is omitted.

FIG. 23 is a graph showing components of the output torque when only the equation e=2 holds for the even order e. A magnitude of $2^{nd}$-order components τe(2) of the output torque τe required to reduce the peak value of the motor current are dependent on a waveform of the sum of the $0^{th}$-order component τe(0) and the fundamental wave components τe(1) of the output torque τe. The $2^{nd}$-order components τe(2) vary to have the same magnitude Te(2) in positive and negative directions from a value 0. On the other hand, the above-mentioned sum (τe(0)+τe(1)) is asymmetric in the positive and negative directions. It is thus necessary to determine the magnitude Te(2) so that each of the absolute value of a maximum value (in the positive direction) and the absolute value of a minimum value (in the negative direction) of the sum (τe(0)+τe(1)+τe(2)) is smaller than a greater one of the absolute value of a maximum value (in the positive direction) and the absolute value of a minimum value (in the negative direction) of the sum (τe(0)+τe(1)).

In FIG. 23, the greater one of the absolute value (approximately 2.2) of the maximum value (in the positive direction) and the absolute value (approximately 0.2) of the minimum value (in the negative direction) of the sum (τe(0)+τe(1)) is the absolute value of the maximum value (in the positive direction), and each of the absolute value (approximately 1.85) of the maximum value (in the positive direction) and the absolute value (approximately 0.6) of the minimum value (in the negative direction) of the sum (τe(0)+τe(1)+τe(2)) is smaller than the absolute value of the maximum value (in the positive direction) of the sum (τe(0)+τe(1)).

As obvious from FIG. 23, however, the sum (τe(0)+τe(1)) swings greater in the positive direction, and thus a phase in which the $2^{nd}$-order components τe(2) take a local minimum value is required to match a phase in which the sum (τe(0)+τe(1)) takes a local maximum value. Thus, a value π/2 is used as the above-mentioned shift amount k when the equation e=2 holds.

FIG. 24 is a graph showing an upper limit of the magnitude Te(2), and a magnitude Te(0) of the $0^{th}$-order component τe(0) is expressed on the horizontal axis using the magnitude Te. An inequation 0≤Te(0)≤(¼)·Te is satisfied in an area (I), an inequation (¼)·Te≤Te(0)≤((4−√2)/8)·Te is satisfied in an area (II), and an inequation ((4−√2)/8)·Te≤Te(0) is satisfied in an area (III). In the area (I), the upper limit of the magnitude Te(2) is equal to the magnitude Te(0). In the area (III), the upper limit of the magnitude Te(2) is equal to a magnitude Te/2√2. In the area (II), the upper limit of the magnitude Te(2) is a function of the magnitudes Te(0) and Te, and is Te·Te/(8(Te−2·Te(0))).

When the magnitude Te(2) is equal to or smaller than the upper limit described above, a degree of suppression of the peak value of the motor current becomes conspicuous as the magnitude Te(2) increases, but, when the magnitude Te(2) takes a value greater than the upper limit, the peak value of the motor current may not be suppressed. It is thus desirable that the magnitude Te(2) take the upper limit. As described above, the magnitude Te(2) is obtained by the even-order amplitude computing unit 1059.

In FIG. 23, since equations Te=1.2 and Te(0)=1.0 hold, and the conditions shown on the area (III) are satisfied, an equation Te(2)=Te/2√2 (approximately 0.43) is used.

It is desirable that the shift amount k take the value π/2 when an equation e=2, 6, 10, . . . holds, and take a value 3π/2 when an equation e=4, 8, 12, . . . holds.

The output torque τe often satisfies the conditions on the area (III). Thus, configuration other than the configuration shown in FIG. 22 may be used as the configuration of the even-order torque command generation unit 105t.

Figure 25:
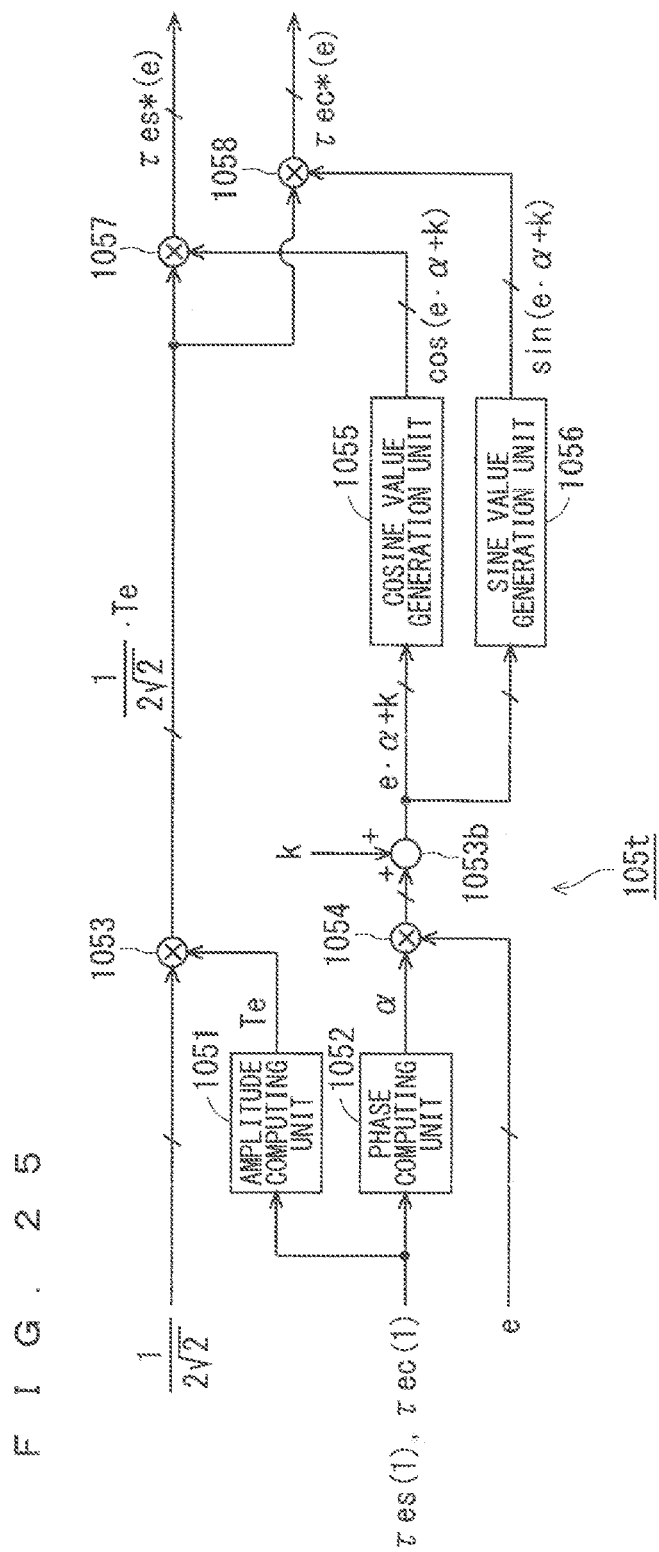
FIG. 25 is a block diagram illustrating another example of the configuration of the even-order torque command generation unit in the fifth embodiment.

FIG. 25 is a block diagram showing the other configuration of the even-order torque command generation unit 105t. The configuration differs from the configuration of FIG. 22 only in that the even order e (e=2) is input, and the multiplier 1053 that uses a coefficient ½√2 as a multiplier is used in place of the $0^{th}$-order component extraction unit 1050 and the even-order amplitude computing unit 1059, and thus detailed description thereof is omitted.

It is desirable to use (¼)·cos(3π/8) as the coefficient if an equation e=4 holds.

Sixth Embodiment

In some cases, there is no need to reduce the ripple of the output torque to for the odd order in the fifth embodiment. In this case, the output torque odd-order output unit 105F can be omitted from the configuration shown in the fifth embodiment.

Figure 26:
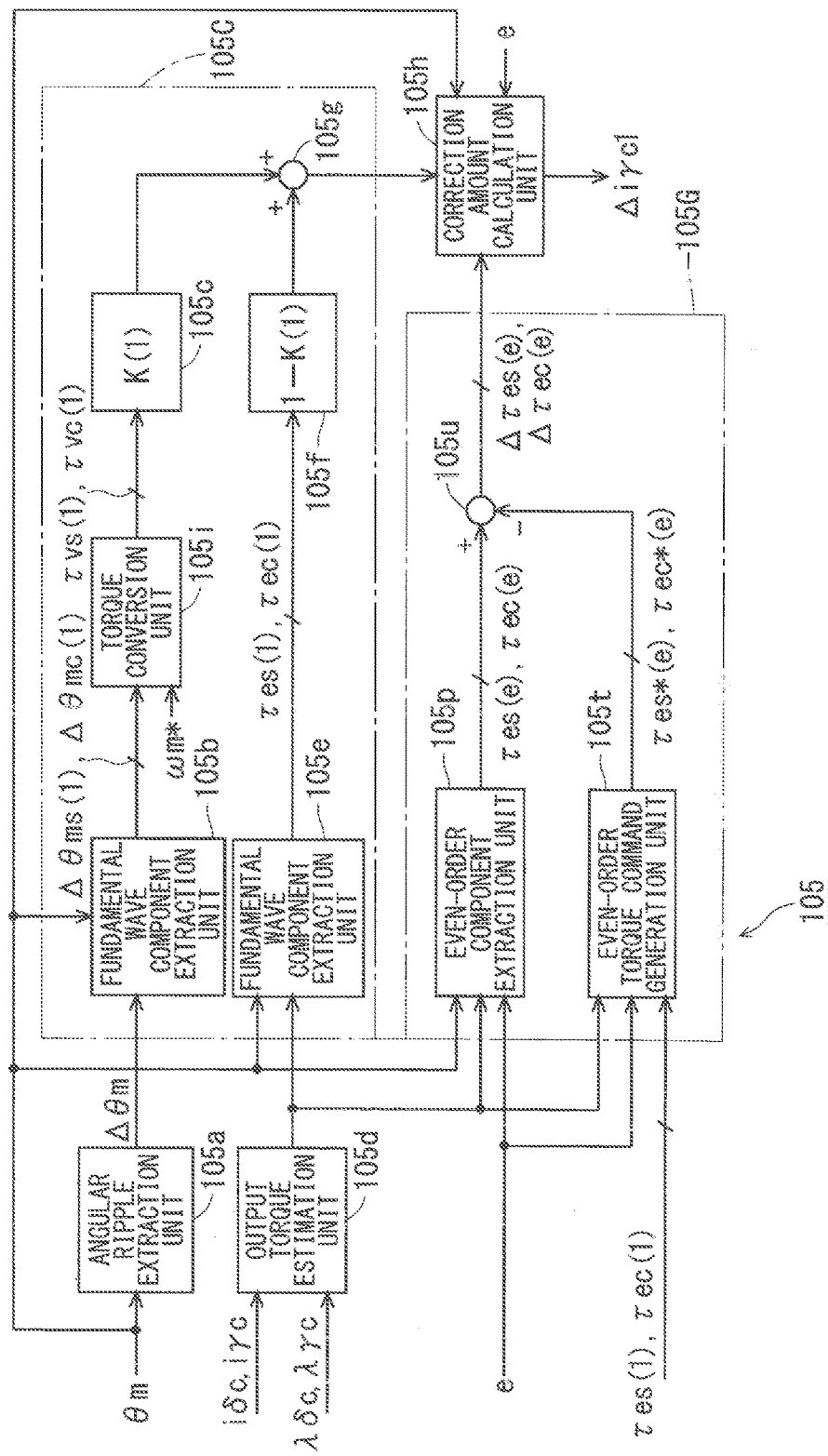
FIG. 26 is a block diagram illustrating the configuration of the γc-axis current correction unit used in a sixth embodiment.

FIG. 26 is a block diagram illustrating the configuration of the γc-axis current correction unit 105 used in the present embodiment. The γc-axis current correction unit 105 includes the angular ripple extraction unit 105a, the output torque estimation unit 105d, the correction amount calculation unit 105h, the fundamental wave component proration unit 105C, and the output torque even-order output unit 105G as in the fifth embodiment. The output torque odd-order output unit 105F, however, is not included as described above.

Figure 27:
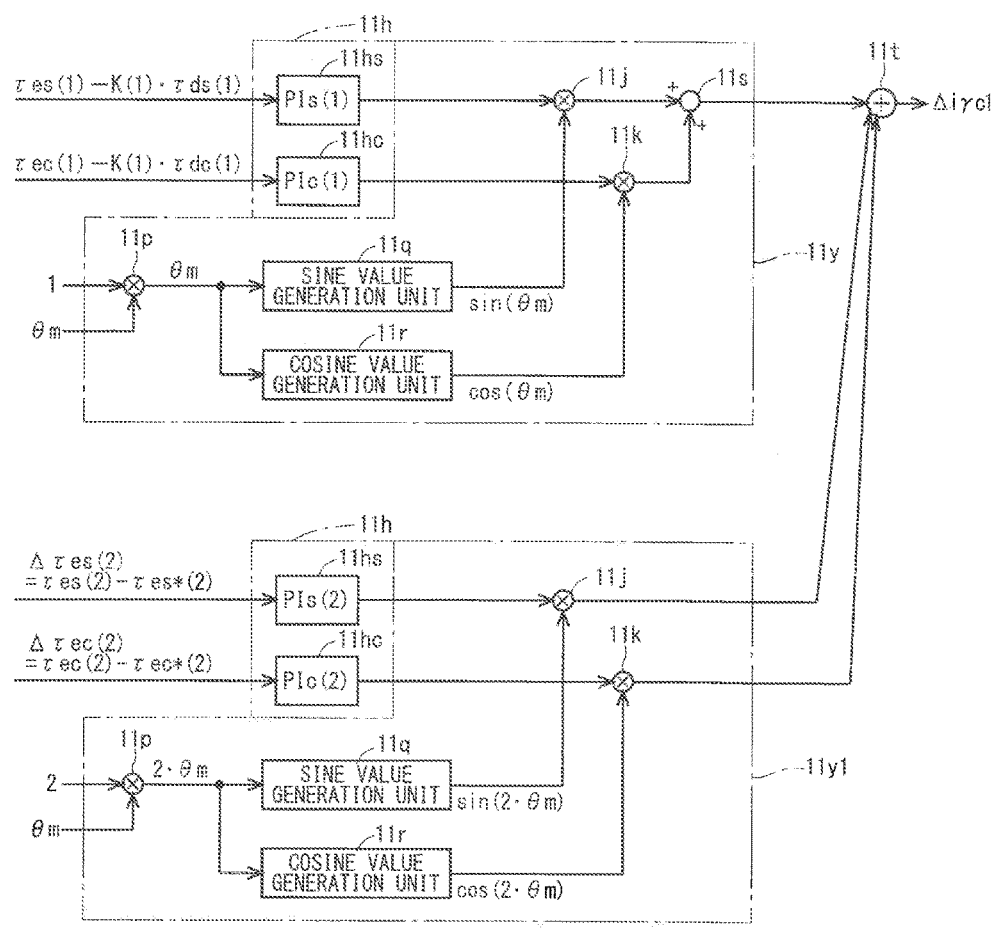
FIG. 27 is a block diagram illustrating the configuration of the correction amount calculation unit in the sixth embodiment.

FIG. 27 is a block diagram illustrating the configuration of the correction amount calculation unit 105h in the present embodiment. The correction amount calculation unit 105h includes the composite value calculation unit 11y, the composite value calculation unit 11y1, the adder 11t, and the two PI control units 11h shown in the fifth embodiment. In contrast to the fifth embodiment, however, the sine value component τes(d) and the cosine value component τec(d) for the odd order are not dealt with in the present embodiment. Thus, one of the PI control units 11h and the composite value calculation unit 11y1 obtain the composite value from deviations for the even order, herein the deviations Δτes(2) and Δτec(2) for the $2^{nd}$ order, in the present embodiment.

In the present embodiment, the correction amount calculation unit 105h does not deal with the sine value component τes(d) and the cosine value component τec(d) for the odd order. Thus, there is no need to input the odd order d into the correction amount calculation unit 105h (see FIG. 26).

The effect of reducing the peak value of the motor current can be obtained also in the present embodiment as in the fifth embodiment.

Seventh Embodiment

In the sixth embodiment, the even-order components of the output torque τe are considered to reduce the peak value of the motor current. Furthermore, the odd-order components of the output torque τe can be considered for the same purpose.

Figure 28:
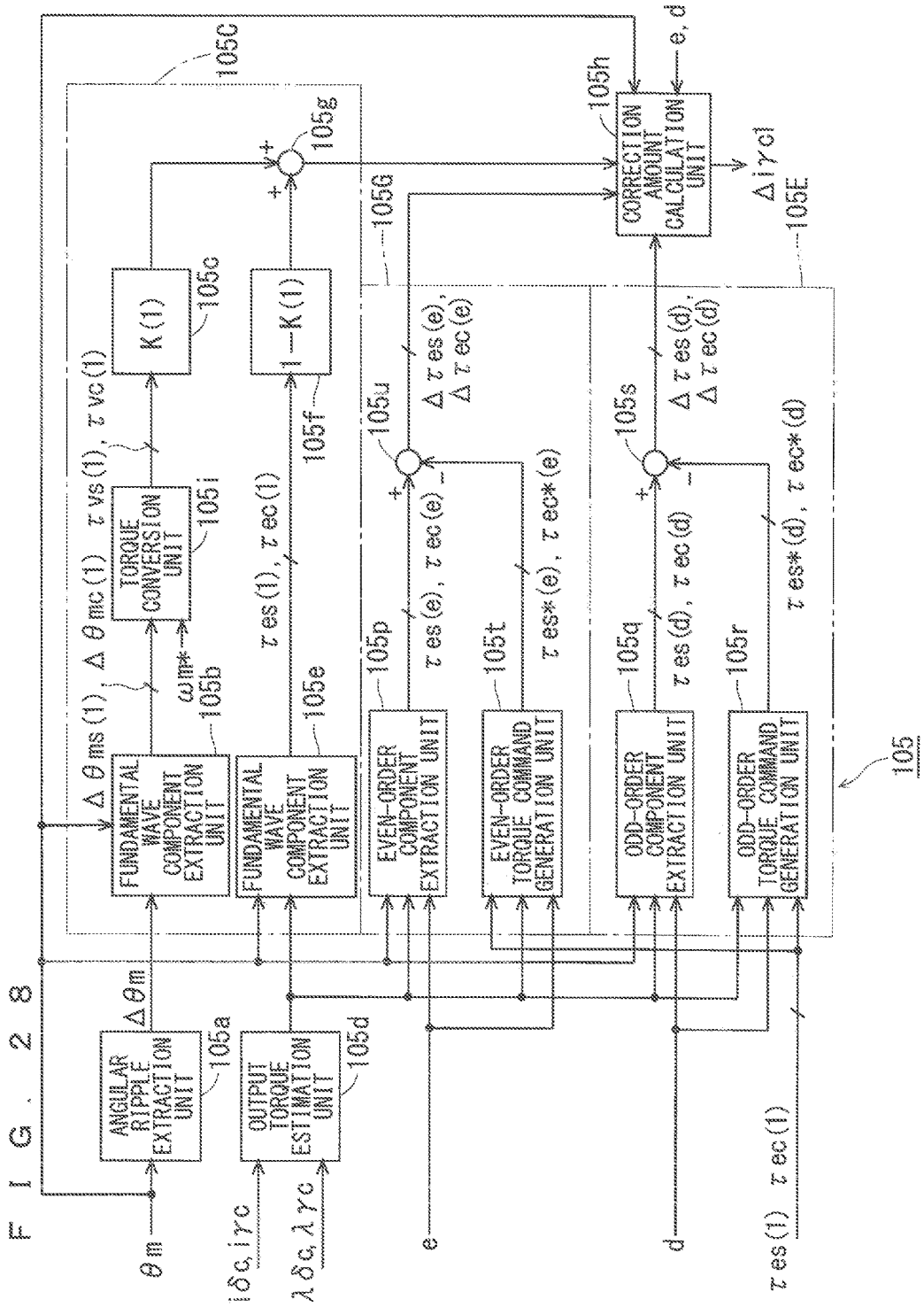
FIG. 28 is a block diagram illustrating the configuration of the γc-axis current correction unit used in a seventh embodiment.

FIG. 28 is a block diagram illustrating the configuration of the γc-axis current correction unit 105 used in the present embodiment. The γc-axis current correction unit 105 includes the angular ripple extraction unit 105a, the output torque estimation unit 105d, the correction amount calculation unit 105h, the fundamental wave component proration unit 105C, and the output torque even-order output unit 105G as in the sixth embodiment. In the present embodiment, the γc-axis current correction unit 105 further includes the output torque odd-order output unit 105E (see the fourth embodiment).

FIG. 29 is a block diagram illustrating the configuration of the correction amount calculation unit 105h in the present embodiment. The configuration differs from the configuration shown in FIG. 21 only in that the deviations Δτes(3) and Δτec(3) are input in place of the sine value component τes(3) and the cosine value component τec(3).

The effect of reducing the peak value of the motor current can be obtained also with such configuration as in the fifth embodiment.

However, the situation is further complicated to improve the peak value of the motor current by the interaction between the odd-order components and the even-order components.

FIG. 30 is a graph showing components of the output torque when only the equations e=2 and d=3 are used in the present embodiment. Due to the presence of the $2^{nd}$-order components τe(2) of the output torque τe, a phase in which 3rd-order components τe(3) of the output torque τe, which are required to reduce the peak value of the motor current, take a local maximum value matches a phase in which the fundamental wave components τe(1) take a local maximum value, in contrast to a case shown in FIG. 14.

When an inequation Te(0)≥K2·Te holds, the magnitude Te(2) of the $2^{nd}$-order components τe(2) and a magnitude Te(3) of the $3^{rd}$-order components τe(3) are calculated by the following equations (15) and (16):

$$Te(2) = -\frac{\cos\left(\frac{\pi}{10}\right) - 3 \cdot \frac{1 - \sin\left(\frac{\pi}{10}\right)}{1 - \sin\left(\frac{13\pi}{10}\right)}\cos\left(\frac{13\pi}{10}\right)}{2\cos\left(\frac{7\pi}{10}\right) + 3 \cdot \frac{1 + \sin\left(\frac{7\pi}{10}\right)}{1 - \sin\left(\frac{13\pi}{10}\right)}\cos\left(\frac{13\pi}{10}\right)} \cdot Te \approx K2 \cdot Te \quad (15)$$

$$Te(3) = -\frac{1 - \sin\left(\frac{\pi}{10}\right)}{1 - \sin\left(\frac{13\pi}{10}\right)} \cdot Te + \frac{1 + \sin\left(\frac{7\pi}{10}\right)}{1 - \sin\left(\frac{13\pi}{10}\right)} \cdot Te(2) \quad (16)$$

$$= -\left\{\frac{\frac{1 - \sin\left(\frac{\pi}{10}\right)}{1 - \sin\left(\frac{13\pi}{10}\right)} + \frac{\cos\left(\frac{\pi}{10}\right) - 3 \cdot \frac{1 - \sin\left(\frac{\pi}{10}\right)}{1 - \sin\left(\frac{13\pi}{10}\right)}\cos\left(\frac{13\pi}{10}\right)}{2\cos\left(\frac{7\pi}{10}\right) + 3 \cdot \frac{1 + \sin\left(\frac{7\pi}{10}\right)}{1 - \sin\left(\frac{13\pi}{10}\right)}\cos\left(\frac{13\pi}{10}\right)} \cdot \frac{1 + \sin\left(\frac{7\pi}{10}\right)}{1 - \sin\left(\frac{13\pi}{10}\right)}\right\} \cdot Te \approx K3 \cdot Te$$

FIG. 31 is a graph showing upper limits of the magnitudes Te(2) and Te(3), and the magnitude Te(0) of the $0^{th}$-order component τe(0) is expressed on the horizontal axis using the magnitude Te. An inequation 0≤Te(0)≤(¼)·Te is satisfied in an area (IV), an inequation (¼)·Te≤Te(0)≤K2·Te is satisfied in an area (V), and an inequation K2·Te≤Te(0) is satisfied in an area (VI). In the areas (IV) and (V), the upper limit of the magnitude Te(2) is equal to the magnitude Te(0). It is desirable that the magnitude Te(3) be zero in the area (IV). In the area (V), the upper limit of the magnitude Te(3) is a function of the magnitudes Te(0) and Te, and is [K3/(4·K2−1)]·(4·Te(0)−Te). In the area (VI), the magnitudes are as shown in the equations (15) and (16).

When the magnitudes Te(2) and Te(3) are equal to or smaller than the respective upper limits described above, the degree of suppression of the peak value of the motor current becomes conspicuous as the magnitudes Te(2) and Te(3) increase, but, when the magnitudes Te(2) and Te(3) take values greater than the respective upper limits, the peak value of the motor current may not be suppressed. It is thus desirable that the magnitudes Te(2) and Te(3) take the respective upper limits.

For such a reason, by assuming that the conditions on the area (VI) are conveniently satisfied in the present embodiment, the even-order torque command generation unit 105*t* can use the configuration shown in FIG. 25, and use a coefficient K2 (≈0.553) in place of the coefficient ½√2, and the odd-order torque command generation unit 105*r* can use the configuration shown in FIG. 13, and use a coefficient (−K3) (≈0.171) (a negative sign is required as the phase of the $3^{rd}$-order components τe(3) differs from that in the third embodiment by 180 degrees) in place of the coefficient g(d) (d=3).

Alternatively, if the areas (IV) and (V) are considered, the even-order torque command generation unit 105*t* uses the configuration shown in FIG. 22, and the even-order amplitude computing unit 1059 obtains the magnitude Te(2) by assuming that the equation e=2 holds. The odd-order torque command generation unit 105*r* uses the odd order d (=3) in place of the even order e in the configuration shown in FIG. 22. A block that obtains the magnitude Te(3) is used in place of the even-order amplitude computing unit 1059. However, a value π is used as the shift amount k shown in FIG. 22 to cause the phase in which the $3^{rd}$-order components τe(3) take the local maximum value to match the phase in which the fundamental wave components τe(1) take the local maximum value.

In a case where a fundamental wave frequency of the vibration torque τv corresponds to the equation n=2 as in a case where the mechanical load is the two-cylinder compressor, it is obvious that the third to seventh embodiments are applicable by translating the odd number d in the above-mentioned description into an integer 2·d and translating the even number e in the above-mentioned description into an integer 2·e.

Eighth Embodiment

Figure 32:
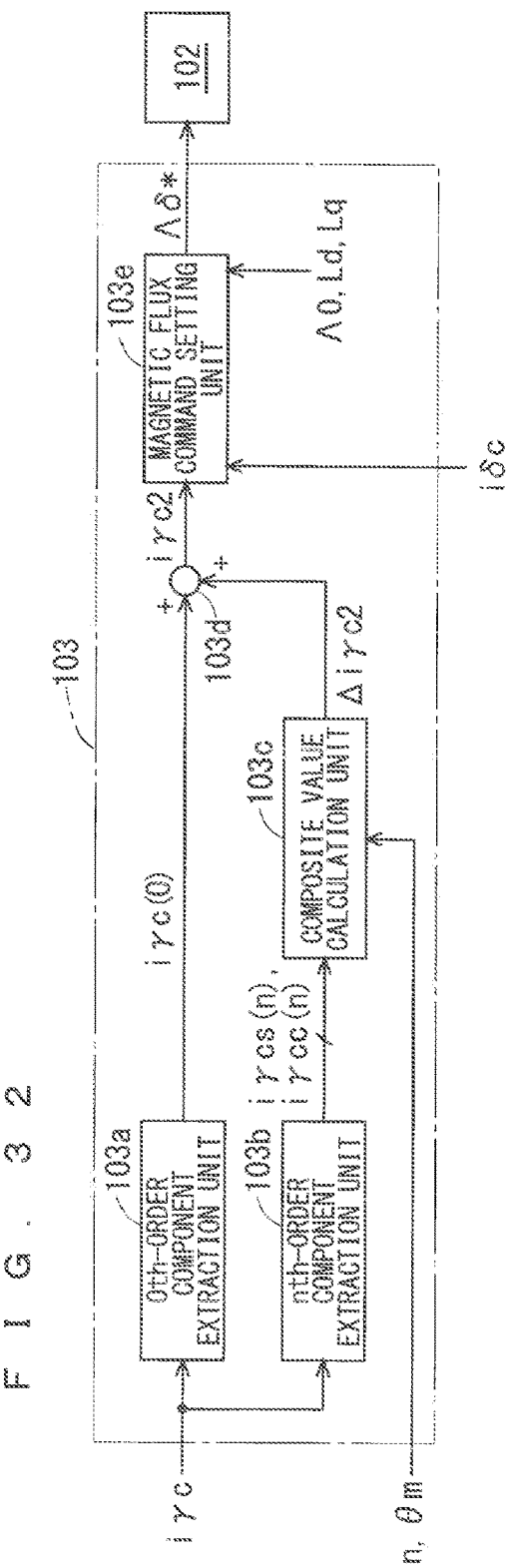
FIG. 32 is a block diagram illustrating the configuration of a primary magnetic flux command generation device used in the motor control device in an eighth embodiment.

FIG. 32 is a block diagram illustrating the configuration of a primary magnetic flux command generation device 103 used in the motor control device 1 in an eighth embodiment. The primary magnetic flux command generation device 103 receives the δc-axis current iδc, the γc-axis current iγc, the order n, and the rotational angle θm as inputs, and outputs the primary magnetic flux command Λδ* to the magnetic flux control unit 102. The primary magnetic flux command generation device 103 can be provided in the motor control device 1 illustrated in FIG. 1.

The primary magnetic flux command generation device 103 includes a $0^{th}$-order component extraction unit 103*a*, an $n^{th}$-order component extraction unit 103*b*, a composite value calculation unit 103*c*, an adder 103*d*, and a magnetic flux command setting unit 103*e*.

The $0^{th}$-order component extraction unit 103*a* performs the Fourier transform using the γc-axis current iγc as the function F(θm) in the equations (8) to obtain the value a0 as a $0^{th}$-order component iγc(0) of the γc-axis current iγc.

The $n^{th}$-order component extraction unit 103*b* also performs the Fourier transform using the γc-axis current iγc as the function F(θm) in the equations (8) to obtain the value bn as a sine value component iγcs(n) of the γc-axis current iγc for the $n^{th}$ order and the value an as a cosine value component iγcc(n) of the γc-axis current iγc for the $n^{th}$ order.

The composite value calculation unit 103*c* combines the sine value component iγcs(n) and the cosine value component iγcc(n) as with the composite value calculation unit 11y to obtain a second γc-axis current correction value Δiγc2. The combination corresponds to obtaining a composite value of the $n^{th}$-order components of the γc-axis current iγc as the second γc-axis current correction value Δiγc2.

The adder 103d adds the $0^{th}$-order component iγc(0) and the second γc-axis current correction value Δiγc2 to obtain a second corrected γc-axis current iγc2. The magnetic flux command setting unit 103e calculates the primary magnetic flux command Λδ* on the basis of the δc-axis current iδc and the second corrected γc-axis current iγc2.

While the function of the magnetic flux command setting unit 103e is known, for example, in Japanese Patent No. 5556875, the magnetic flux command setting unit 103e sets the primary magnetic flux command Λδ* by equations shown below by introducing the field magnetic flux Λ0 and a component Ld of the d axis and a component Lq of the q axis of inductance of the synchronous motor 3, for example. The q axis leads the d axis by an electrical angle of 90 degrees.

$$\Lambda\delta* = \sqrt{(\Lambda 0 - Ia \cdot \sin\beta*)^2 + (Lq \cdot Ia \cdot \cos\beta*)^2} \quad (17)$$
$$\beta* = \sin^{-1}\left[\frac{-\Lambda 0 + \Lambda 0^2 + 8 \cdot (Lq - Ld)^2 \cdot Ia^2}{4 \cdot (Lq - Ld) \cdot Ia}\right]$$
$$Ia = \sqrt{i\delta c^2 + i\gamma c2^2}$$

The primary magnetic flux control based on the primary magnetic flux command Λδ* determined using the equations (17) maximizes the torque with respect to the magnitude of the current [I]. The field magnetic flux Λ0 and the inductance of the synchronous motor 3 are instrumental constants of the synchronous motor 3, and thus can be stored in the primary magnetic flux command generation device 103.

It can be said that an angle β* is an angle by which a current Ia leads the q axis. It can be said that the current Ia is the absolute value of the current [I]. It can be said that the primary magnetic flux command Λδ* is obtained on the basis of the second corrected γc-axis current iγc2, the δc-axis current iδc, the field magnetic flux Λ0, and the inductance of the synchronous motor 3.

Alternatively, an equation Ia=√(id·id+iq·iq) may be used in place of the third equation of the equations (17) by introducing a d-axis component id and a q-axis component iq of the current [I]. Note that, in this case, relationships in equations (18) shown below are established by introducing the load angle φ and the amplitude Λδ of the primary magnetic flux (see Japanese Patent No. 5556875).

$$\tau e = P \cdot \Lambda\delta \cdot Ia \cdot \cos(\varphi - \beta), \tan\beta = -\frac{id}{iq}, \quad (18)$$
$$\lambda\delta \cdot \sin\varphi = Lq \cdot iq, \lambda\delta \cdot \cos\varphi = Ld \cdot id + \Lambda 0$$

FIG. 33 is a graph showing the dependence of the primary magnetic flux command Λδ* obtained by the equations (17) on the second corrected γc-axis current iγc2, in other words, a graph showing the primary magnetic flux command Λδ* set by the second corrected γc-axis current iγc2. The primary magnetic flux command Λδ* increases monotonically with increasing second corrected γc-axis current iγc2.

Instead of performing calculation in the equations (17), the magnetic flux command setting unit 103e may perform calculation using an approximation. Alternatively, the magnetic flux command setting unit 103e may store in advance a table including calculation results, and obtain the primary magnetic flux command Λδ* with reference to the table instead of performing sequential calculation.

As described above, by obtaining the primary magnetic flux command Λδ* in consideration of the $n^{th}$-order components of the γc-axis current iγc, the primary magnetic flux control can be performed in response to a variation of the γc-axis current iγc, which is affected by the $n^{th}$-order components of the output torque τe and the vibration torque τv. As can be seen from the equation (7), the γc-axis current iγc is a parameter relating to the output torque τe, is controlled so that an equation λγc=0 holds, in particular, in the primary magnetic flux control, and thus becomes a main parameter in a case where the primary magnetic flux command κδ* as a command value of the δc-axis component λδc of the primary magnetic flux is set in accordance with the output torque τe (because the number of pole pairs P is specific to the synchronous motor 3, and has a fixed value).

Figure 35:
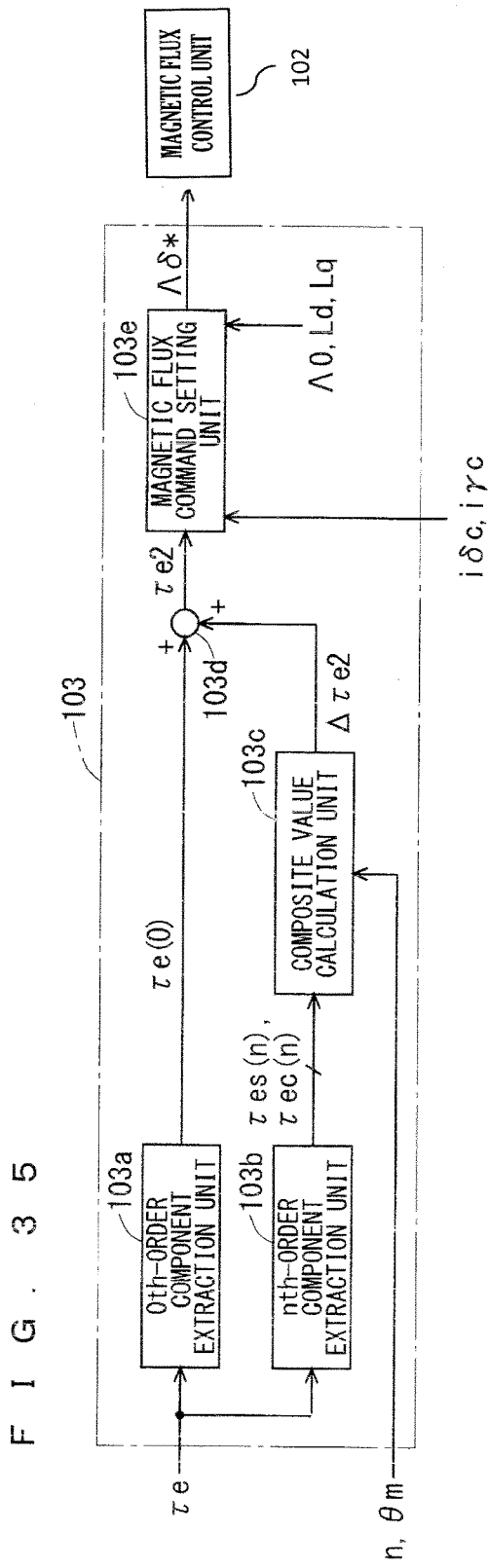
FIG. 35 is a block diagram illustrating a modification of the configuration of the primary magnetic flux command generation device used in the motor control device in the eighth embodiment.

The primary magnetic flux command Λδ* may be set from the $0^{th}$-order component and the $n^{th}$-order components of the output torque τe (regardless of whether this is a detected value or an estimated value). In this case, various amounts in the primary magnetic flux command generation device 103 are as shown in FIG. 35. The $0^{th}$-order component τe(0) of the output torque τe, the sine value component τes(n) and the cosine value component τec(n) of the output torque τe for the $n^{th}$ order, a composite value Δτe2, and output torque τe2 after correction are herein used. FIG. 36 is a graph showing the primary magnetic flux command Λδ* set from the output torque τe2 after correction. The magnetic flux command setting unit 103e sets the primary magnetic flux command Λδ* in accordance with this graph or an equation on which this graph is based.

Figure 37:
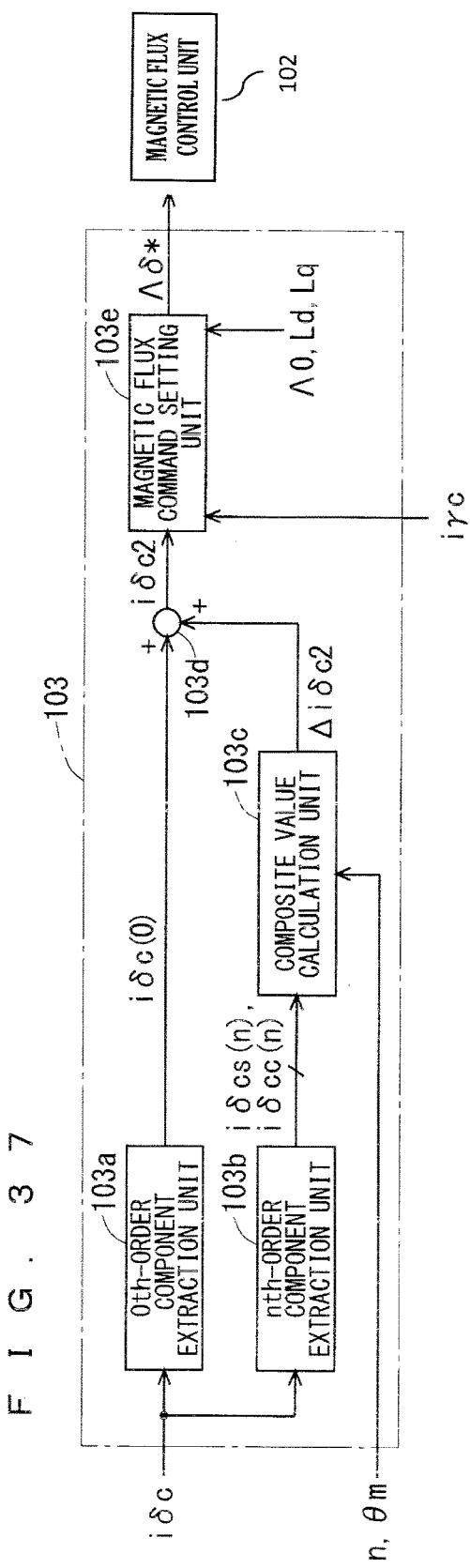
FIG. 37 is a block diagram illustrating a modification of the configuration of the primary magnetic flux command generation device used in the motor control device in the eighth embodiment.
Figure 38:
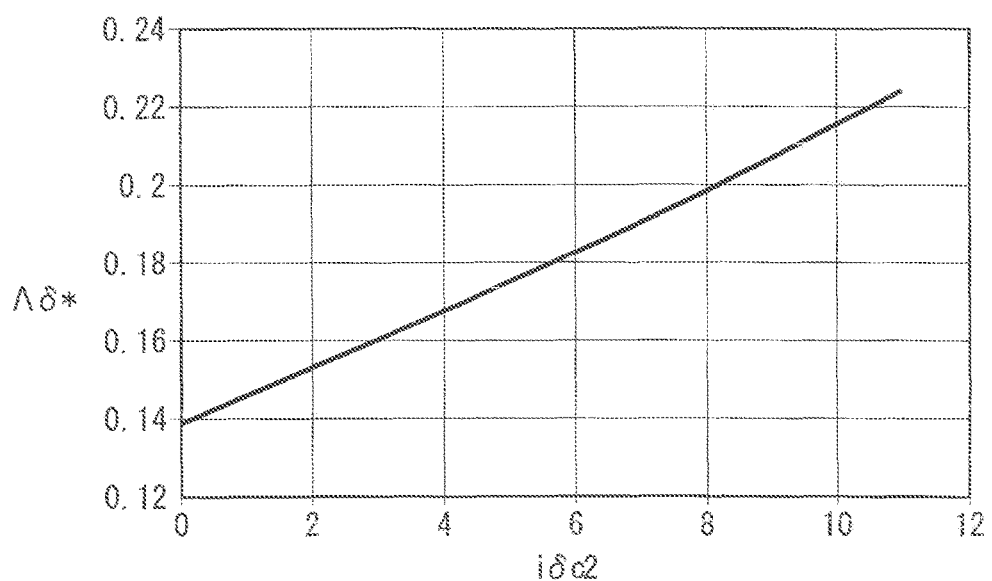
FIG. 38 is a graph showing the dependence of the primary magnetic flux command on a δc-axis current after correction.

According to the equations (18), the current Ia is also a parameter for setting the output torque τe, and, in consideration of the third equation of the equations (17), the δc-axis current iδc is also a parameter for setting the output torque τe. The primary magnetic flux command Λδ* may thus be set from a $0^{th}$-order component and $n^{th}$-order components of the δc-axis current iδc. In this case, various amounts in the primary magnetic flux command generation device 103 are as shown in FIG. 37. A $0^{th}$-order component iδc(0) of the δc-axis current iδc, a sine value component iδcs(n) and a cosine value component iδcc(n) of the δc-axis current iδc for the $n^{th}$ order, a composite value Δiδc2, and a δc-axis current iδc2 after correction are herein used. FIG. 38 is a graph showing the primary magnetic flux command Λδ* set from the δc-axis current iδc2 after correction. The magnetic flux command setting unit 103e sets the primary magnetic flux command Λδ* in accordance with this graph or an equation on which this graph is based. Similarly to the second corrected γc-axis current iγc2, an equation Ia=√(iδc2·iδc2+iγc·iγc) is used in place of the third equation of the equations (17).

Alternatively, in the primary magnetic flux command generation device 103, the $0^{th}$-order component extraction unit 103a, the $n^{th}$-order component extraction unit 103b, the composite value calculation unit 103c, and the adder 103d shown in FIG. 32 and those shown in FIG. 37 can be provided in pairs to obtain the second corrected γc-axis current iγc2 and the δc-axis current iδc2 after correction. In this case, the magnetic flux command setting unit 103e can handle the current Ia as √(iδc2·iδc2+iγc2·iγc2).

Figure 39:
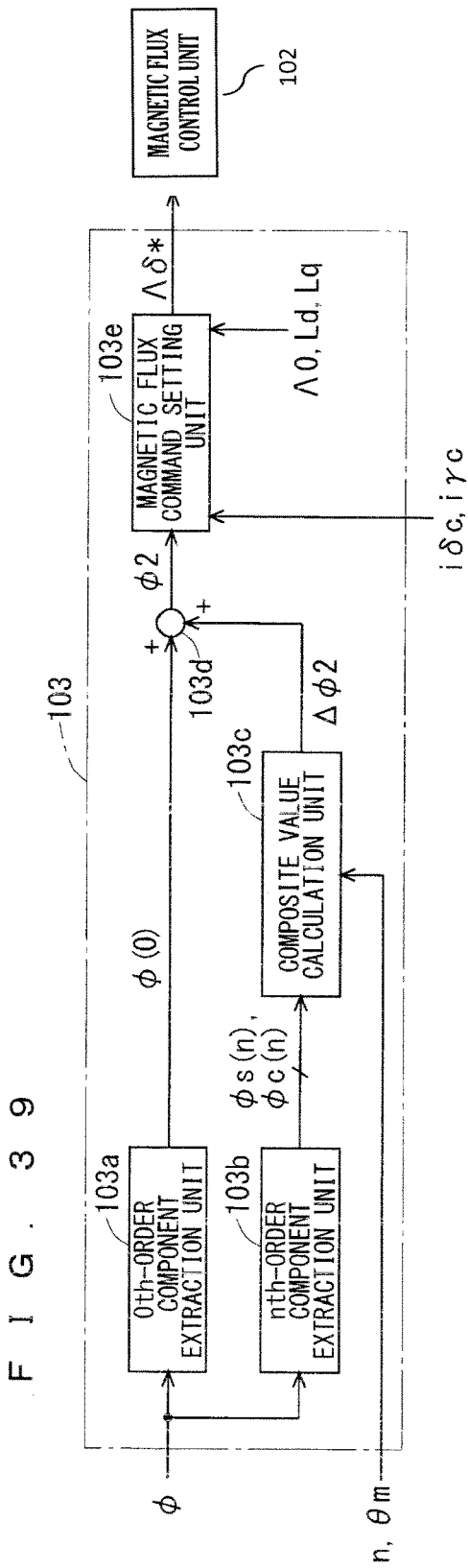
FIG. 39 is a block diagram illustrating a modification of the configuration of the primary magnetic flux command generation device used in the motor control device in the eighth embodiment.
Figure 40:
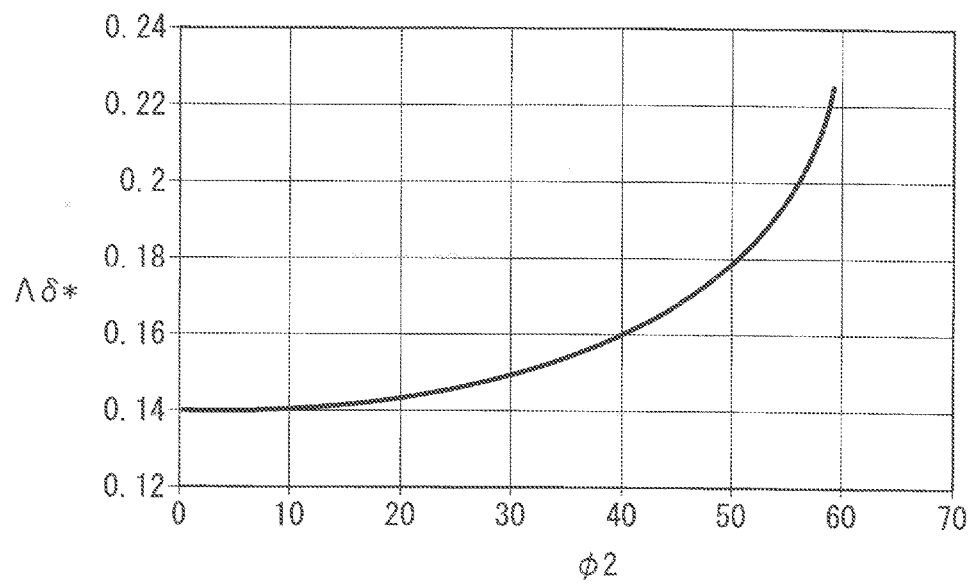
FIG. 40 is a graph showing the dependence of the primary magnetic flux command on a load angle after correction.

Similarly, the load angle φ is also a parameter for setting the output torque τe, and thus the primary magnetic flux command Λδ* may be set from a $0^{th}$-order component and $n^{th}$-order components of the load angle φ. In this case, various amounts in the primary magnetic flux command generation device 103 are as shown in FIG. 39. A $0^{th}$-order component φ(0) of the load angle φ, a sine value component φs(n) and a cosine value component φc(n) of the load angle φ for the $n^{th}$ order, a composite value Δφ2, and a load angle φ2 after correction are herein used. FIG. 40 is a graph showing the primary magnetic flux command Λδ* set from the load angle φ2 after correction. The magnetic flux command setting unit 103e sets the primary magnetic flux command Λδ* in accordance with this graph or an equation on which this graph is based.

As described in the first embodiment, the γc-axis current iγc is a target of correction based on the $n^{th}$-order components of the output torque τe and the vibration torque τv to correct the rotational speed command. It is thus desirable to use the same value or the same pair of values as the order n used in the first embodiment and as the order n used in the eighth embodiment. This provides the primary magnetic flux command Λδ* suitable for operation of the speed command correction device 12, and enables the primary magnetic flux control matching the corrected rotational speed command ωe*.

In the first embodiment, to suppress the ripple of the output torque τe and the vibration torque τv, only a ripple component thereof is used to perform calculation. In the eighth embodiment, however, there is a need to obtain the primary magnetic flux command corresponding to average torque, and thus the second corrected γc-axis current iγc2 is calculated also using the $0^{th}$-order component iγc(0), and the primary magnetic flux command Λδ* is calculated on the basis of the second corrected γc-axis current iγc2. The same applies to the other parameters.

Figure 41:
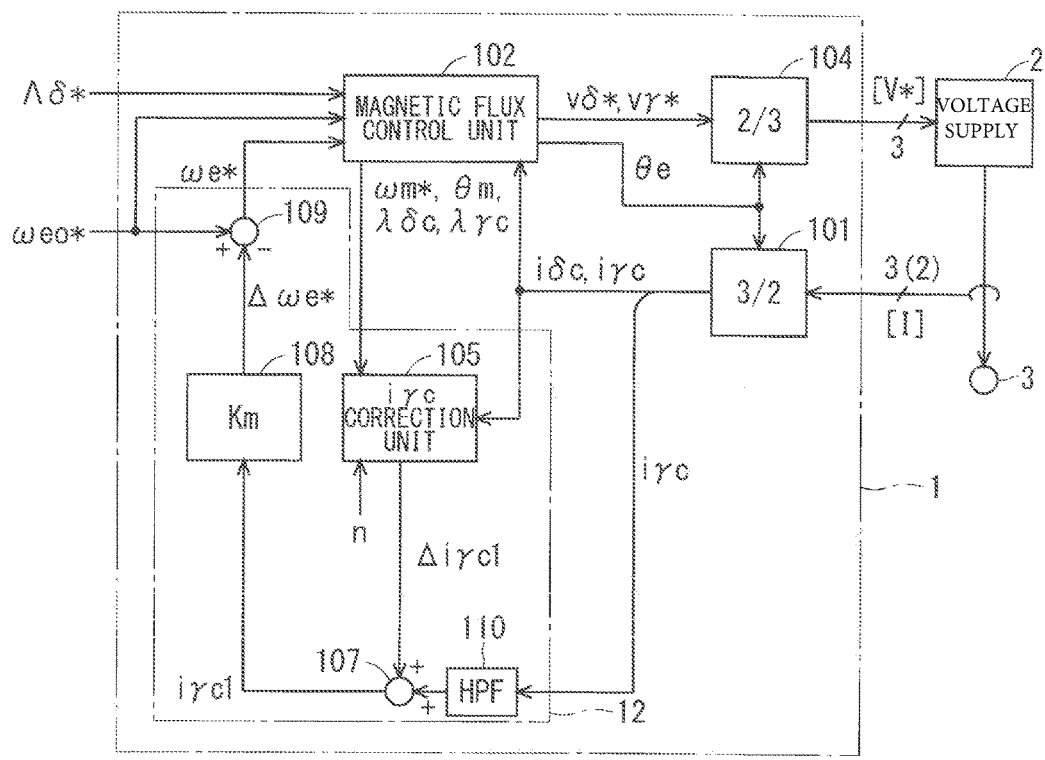
FIG. 41 is a block diagram illustrating the configuration of a modification of the motor control device and peripherals thereof.

FIG. 41 is a block diagram illustrating the configuration of a modification of the motor control device 1 and peripherals thereof. Compared with the configuration shown in FIG. 1, the high-pass filter 110 is at a different location in the motor control device 1. Specifically, the high-pass filter 110 removes a DC part from the γc-axis current iγc. The adder 107 adds the first γc-axis current correction value Δiγc1 to an output of the high-pass filter 110 to obtain the first corrected γc-axis current iγc1. The first corrected γc-axis current iγc1 is multiplied by the predetermined gain Km by the constant multiplication unit 108, so that the angular speed correction amount Δωe* is obtained.

The high-pass filter 110 is usually designed to always allow the first γc-axis current correction value Δiγc1 to pass therethrough. The modification shown in FIG. 41 thus has equivalent configuration to that in FIG. 1.

While the invention has been described in detail, the foregoing description is in all aspects illustrative and not restrictive. It is therefore understood that numerous modifications not having been described can be devised without departing from the scope of the invention.

The invention claimed is:

1. A speed command correction device for correcting a rotational speed command in a method of matching a primary magnetic flux with a primary magnetic flux command in a first axis on a basis of said primary magnetic flux command and said rotational speed command, said rotational speed command being a command value of a rotational speed on an electrical angle of a synchronous motor for driving a periodic load, said primary magnetic flux being a composite of a magnetic flux generated by a current flowing through said synchronous motor and a field magnetic flux of said synchronous motor, said first axis leading said field magnetic flux by a predetermined phase difference, said device comprising:
    a first subtractor that subtracts an angular speed correction amount from said rotational speed command to obtain a corrected rotational speed command;
    an adder that adds a second-axis current correction value to a second-axis current to obtain a corrected second-axis current, said second-axis current being a component of said current in a second axis leading said first axis by an electrical angle of 90 degrees;
    a DC part removal unit that removes a DC part from said corrected second-axis current to obtain said angular speed correction amount;
    an angular ripple extraction unit that obtains a rotational angle difference from a rotational angle on a mechanical angle of said synchronous motor, said rotational angle difference being a ripple component of said rotational angle to a time integral of an average value of an angular speed of said mechanical angle;
    a component extraction unit that extracts an $n^{th}$-order component of a fundamental frequency of said rotational angle from said rotational angle difference, n being a positive integer;
    a torque conversion unit that converts said $n^{th}$-order component into an $n^{th}$-order component of an estimated value of vibration torque of said synchronous motor; and
    a correction amount calculation unit that receives, as an input, said $n^{th}$-order component of said estimated value, and obtains said second-axis current correction value using an input into said correction amount calculation unit.

2. The speed command correction device according to claim 1, wherein
    said correction amount calculation unit obtains, as a coefficient of a Fourier series, a value obtained by performing proportional integral control on said input into said correction amount calculation unit, and obtains said second-axis current correction value from a result of said Fourier series.

3. A primary magnetic flux command generation device for outputting said primary magnetic flux command used in said method together with said rotational speed command corrected by said speed command correction device according to claim 1, said primary magnetic flux command generation device comprising:
    a fourth component extraction unit that extracts a $0^{th}$-order component of said second-axis current;
    a fifth component extraction unit that extracts an $n^{th}$-order component of said second-axis current;
    a composite value calculation unit that obtains a composite value of said $n^{th}$-order component of said second-axis current;
    a second adder that obtains a sum of said $0^{th}$-order component of said second-axis current and said $n^{th}$-order component of said second-axis current; and
    a magnetic flux command setting unit that sets said primary magnetic flux command on a basis of said sum obtained by said second adder, said current, said field magnetic flux, and inductance of said synchronous motor.

4. A primary magnetic flux command generation device for outputting said primary magnetic flux command used in said method together with said rotational speed command corrected by said speed command correction device according to claim 1, said primary magnetic flux command generation device comprising:
- a fourth component extraction unit that extracts a $0^{th}$-order component of a first-axis current being a component of said current in said first axis;
- a fifth component extraction unit that extracts an $n^{th}$-order component of said first-axis current;
- a composite value calculation unit that obtains a composite value of said $n^{th}$-order component of said first-axis current;
- a second adder that obtains a sum of said $0^{th}$-order component of said first-axis current and said $n^{th}$-order component of said first-axis current; and
- a magnetic flux command setting unit that sets said primary magnetic flux command on a basis of said sum obtained by said second adder, said current, said field magnetic flux, and inductance of said synchronous motor.

5. A primary magnetic flux command generation device for outputting said primary magnetic flux command used in said method together with said rotational speed command corrected by said speed command correction device according to claim 1, said primary magnetic flux command generation device comprising:
- a fourth component extraction unit that extracts a $0^{th}$-order component of a load angle being a phase difference of a phase of said primary magnetic flux from a phase of said field magnetic flux;
- a fifth component extraction unit that extracts an $n^{th}$-order component of said load angle;
- a composite value calculation unit that obtains a composite value of said $n^{th}$-order component of said load angle;
- a second adder that obtains a sum of said $0^{th}$-order component of said load angle and said $n^{th}$-order component of said load angle; and
- a magnetic flux command setting unit that sets said primary magnetic flux command on a basis of said sum obtained by said second adder, said current, said field magnetic flux, and inductance of said synchronous motor.

6. A speed command correction device for correcting a rotational speed command in a method of matching a primary magnetic flux with a primary magnetic flux command in a first axis on a basis of said primary magnetic flux command and said rotational speed command, said rotational speed command being a command value of a rotational speed on an electrical angle of a synchronous motor for driving a periodic load, said primary magnetic flux being a composite of a magnetic flux generated by a current flowing through said synchronous motor and a field magnetic flux of said synchronous motor, said first axis leading said field magnetic flux by a predetermined phase difference, said device comprising:
- a first subtractor that subtracts an angular speed correction amount from said rotational speed command to obtain a corrected rotational speed command;
- an adder that adds a second-axis current correction value to a second-axis current to obtain a corrected second-axis current, said second-axis current being a component of said current in a second axis leading said first axis by an electrical angle of 90 degrees;
- a DC part removal unit that removes a DC part from said corrected second-axis current to obtain said angular speed correction amount;
- an output torque estimation unit that obtains an estimated value of output torque of said synchronous motor from said primary magnetic flux, a first-axis current, and said second-axis current, said first-axis current being a component of said current in said first axis;
- a component extraction unit that extracts, from said estimated value, an $n^{th}$-order component of a fundamental frequency of a rotational angle as a mechanical angle of said synchronous motor, n being a positive integer; and
- a correction amount calculation unit that receives said $n^{th}$-order component as an input, and obtains said second-axis current correction value using said input into said correction amount calculation unit.

7. The speed command correction device according to claim 6, wherein
said correction amount calculation unit obtains, as a coefficient of a Fourier series, a value obtained by performing proportional integral control on said input into said correction amount calculation unit, and obtains said second-axis current correction value from a result of said Fourier series.

8. A primary magnetic flux command generation device for outputting said primary magnetic flux command used in said method together with said rotational speed command corrected by said speed command correction device according to claim 6, said primary magnetic flux command generation device comprising:
- a fourth component extraction unit that extracts a $0^{th}$-order component of output torque of said synchronous motor;
- a fifth component extraction unit that extracts an $n^{th}$-order component of said output torque;
- a composite value calculation unit that obtains a composite value of said $n^{th}$-order component of said output torque;
- a second adder that obtains a sum of said $0^{th}$-order component of said output torque and said $n^{th}$-order component of said output torque; and
- a magnetic flux command setting unit that sets said primary magnetic flux command on a basis of said sum obtained by said second adder, said current, said field magnetic flux, and inductance of said synchronous motor.

9. A primary magnetic flux command generation device for outputting said primary magnetic flux command used in said method together with said rotational speed command corrected by said speed command correction device according to claim 6, said primary magnetic flux command generation device comprising:
- a fourth component extraction unit that extracts a $0^{th}$-order component of said second-axis current;
- a fifth component extraction unit that extracts an $n^{th}$-order component of said second-axis current;
- a composite value calculation unit that obtains a composite value of said $n^{th}$-order component of said second-axis current;
- a second adder that obtains a sum of said $0^{th}$-order component of said second-axis current and said $n^{th}$-order component of said second-axis current; and
- a magnetic flux command setting unit that sets said primary magnetic flux command on a basis of said sum obtained by said second adder, said current, said field magnetic flux, and inductance of said synchronous motor.

10. A primary magnetic flux command generation device for outputting said primary magnetic flux command used in said method together with said rotational speed command corrected by said speed command correction device according to claim 6, said primary magnetic flux command generation device comprising:
a fourth component extraction unit that extracts a $0^{th}$-order component of a first-axis current being a component of said current in said first axis;
a fifth component extraction unit that extracts an $n^{th}$-order component of said first-axis current;
a composite value calculation unit that obtains a composite value of said $n^{th}$-order component of said first-axis current;
a second adder that obtains a sum of said $0^{th}$-order component of said first-axis current and said $n^{th}$-order component of said first-axis current; and
a magnetic flux command setting unit that sets said primary magnetic flux command on a basis of said sum obtained by said second adder, said current, said field magnetic flux, and inductance of said synchronous motor.

11. A primary magnetic flux command generation device for outputting said primary magnetic flux command used in said method together with said rotational speed command corrected by said speed command correction device according to claim 6, said primary magnetic flux command generation device comprising:
a fourth component extraction unit that extracts a $0^{th}$-order component of a load angle being a phase difference of a phase of said primary magnetic flux from a phase of said field magnetic flux;
a fifth component extraction unit that extracts an $n^{th}$-order component of said load angle;
a composite value calculation unit that obtains a composite value of said $n^{th}$-order component of said load angle;
a second adder that obtains a sum of said $0^{th}$-order component of said load angle and said $n^{th}$-order component of said load angle; and
a magnetic flux command setting unit that sets said primary magnetic flux command on a basis of said sum obtained by said second adder, said current, said field magnetic flux, and inductance of said synchronous motor.

12. A speed command correction device for correcting a rotational speed command in a method of matching a primary magnetic flux with a primary magnetic flux command in a first axis on a basis of said primary magnetic flux command and said rotational speed command, said rotational speed command being a command value of a rotational speed on an electrical angle of a synchronous motor for driving a periodic load, said primary magnetic flux being a composite of a magnetic flux generated by a current flowing through said synchronous motor and a field magnetic flux of said synchronous motor, said first axis leading said field magnetic flux by a predetermined phase difference, said device comprising:
a first subtractor that subtracts an angular speed correction amount from said rotational speed command to obtain a corrected rotational speed command;
an adder that adds a second-axis current correction value to a second-axis current to obtain a corrected second-axis current, said second-axis current being a component of said current in a second axis leading said first axis by an electrical angle of 90 degrees;
a DC part removal unit that removes a DC part from said corrected second-axis current to obtain said angular speed correction amount;
an angular ripple extraction unit that obtains a rotational angle difference from a rotational angle on a mechanical angle of said synchronous motor, said rotational angle difference being a ripple component of said rotational angle to a time integral of an average value of an angular speed of said mechanical angle;
a first component extraction unit that extracts an $n^{th}$-order component of a fundamental frequency of said rotational angle from said rotational angle difference, n being a positive integer;
a torque conversion unit that converts said $n^{th}$-order component into an $n^{th}$-order component of an estimated value of vibration torque of said synchronous motor;
an output torque estimation unit that obtains an estimated value of output torque of said synchronous motor from said primary magnetic flux, a first-axis current, and said second-axis current, said first-axis current being a component of said current in said first axis;
a second component extraction unit that extracts an $n^{th}$-order component of said fundamental frequency from said estimated value of output torque;
a proration unit that prorates said $n^{th}$-order component obtained by said torque conversion unit and said $n^{th}$-order component extracted by said second component extraction unit with a predetermined proration rate to respectively obtain a first value and a second value;
an adder that obtains a sum of said first value and said second value; and
a correction amount calculation unit that receives said sum as an input, and obtains said second-axis current correction value using said input into said correction amount calculation unit.

13. The speed command correction device according to claim 12, wherein
said first component extraction unit extracts a vibration torque suppression component from said rotational angle difference, said vibration torque suppression component being a component for at least one order including a $1^{st}$-order component of said fundamental frequency of said rotational angle,
said second component extraction unit extracts, from said estimated value of output torque, a component for an order corresponding to said vibration torque suppression component,
said speed command correction device further comprises a third component extraction unit that extracts an output torque suppression component from said estimated value of said output torque, said output torque suppression component being a component for at least one order other than said order corresponding to said vibration torque suppression component, and
said correction amount calculation unit further receives said output torque suppression component as an input, and obtains said second-axis current correction value using said input into said correction amount calculation unit.

14. The speed command correction device according to claim 12, wherein
said first component extraction unit extracts a $1^{st}$-order component of said fundamental frequency of said rotational angle,
said torque conversion unit converts a value extracted by said first component extraction unit into a $1^{st}$-order component of said estimated value of vibration torque,
said speed command correction device further comprises an odd-order component extraction unit that extracts an output torque odd-order suppression component from said estimated value of output torque, said output torque odd-order suppression component being a component for at least one odd order equal to or greater than a $3^{rd}$ order of said fundamental frequency;
an odd-order torque command generation unit that obtains a command value of said output torque odd-order suppression component on a basis of said $1^{st}$-order component of said fundamental frequency of said estimated value of output torque; and
a subtractor that obtains a difference of said output torque odd-order suppression component from said command value, and
said correction amount calculation unit further receives said difference as an input, and obtains said second-axis current correction value using said input into said correction amount calculation unit.

15. The speed command correction device according to claim 14, wherein
said speed command correction device further comprises an even-order component extraction unit that extracts an output torque even-order suppression component from said estimated value of output torque, said output torque even-order suppression component being a component for at least one even order of said fundamental frequency, and
said correction amount calculation unit further receives said output torque even-order suppression component as an input, and obtains said second-axis current correction value using said input into said correction amount calculation unit.

16. The speed command correction device according to claim 12, wherein
said first component extraction unit extracts a $1^{st}$-order component of said fundamental frequency of said rotational angle,
said torque conversion unit converts a value extracted by said first component extraction unit into a $1^{st}$-order component of said estimated value of vibration torque,
said speed command correction device further comprises an even-order component extraction unit that extracts an output torque even-order suppression component from said estimated value of output torque, said output torque even-order suppression component being a component for at least one even order of said fundamental frequency;
an even-order torque command generation unit that obtains a command value of said output torque even-order suppression component on a basis of said $1^{st}$-order component of said fundamental frequency of said estimated value of output torque; and
a subtractor that obtains a difference of said output torque even-order suppression component from said command value, and
said correction amount calculation unit further receives said difference as an input, and obtains said second-axis current correction value using said input into said correction amount calculation unit.

17. The speed command correction device according to claim 16, wherein
said speed command correction device further comprises an odd-order component extraction unit that extracts an output torque odd-order suppression component from said estimated value of output torque, said output torque odd-order suppression component being a component for at least one odd order of said fundamental frequency, and said correction amount calculation unit further receives said output torque odd-order suppression component as an input, and obtains said second-axis current correction value using said input into said correction amount calculation unit.

18. The speed command correction device according to claim 16, wherein
said speed command correction device further comprises an odd-order component extraction unit that extracts an output torque odd-order suppression component from said estimated value of output torque, said output torque odd-order suppression component being a component for at least one odd order equal to or greater than a $3^{rd}$ order of said fundamental frequency;
an odd-order torque command generation unit that obtains a command value of said output torque odd-order suppression component on a basis of said $1^{st}$-order component of said fundamental frequency of said estimated value of output torque; and
a subtractor that obtains a second difference of said output torque odd-order suppression component from said command value, and
said correction amount calculation unit further receives said second difference as an input, and obtains said second-axis current correction value using said input into said correction amount calculation unit.

19. The speed command correction device according to claim 16, wherein
said even-order torque command generation unit obtains said command value of said output torque even-order suppression component on a basis of said $1^{st}$-order component and a $0^{th}$-order component of said fundamental frequency of said estimated value of output torque.

20. The speed command correction device according to claim 12, wherein
said correction amount calculation unit obtains, as a coefficient of a Fourier series, a value obtained by performing proportional integral control on said input into said correction amount calculation unit, and obtains said second-axis current correction value from a result of said Fourier series.

21. A primary magnetic flux command generation device for outputting said primary magnetic flux command used in said method together with said rotational speed command corrected by said speed command correction device according to claim 12, said primary magnetic flux command generation device comprising:
a fourth component extraction unit that extracts a $0^{th}$-order component of output torque of said synchronous motor;
a fifth component extraction unit that extracts an $n^{th}$-order component of said output torque;
a composite value calculation unit that obtains a composite value of said $n^{th}$-order component of said output torque;
a second adder that obtains a sum of said $0^{th}$-order component of said output torque and said $n^{th}$-order component of said output torque; and
a magnetic flux command setting unit that sets said primary magnetic flux command on a basis of said sum obtained by said second adder, said current, said field magnetic flux, and inductance of said synchronous motor.

22. A primary magnetic flux command generation device for outputting said primary magnetic flux command used in said method together with said rotational speed command corrected by said speed command correction device according to claim 12, said primary magnetic flux command generation device comprising:
- a fourth component extraction unit that extracts a $0^{th}$-order component of said second-axis current;
- a fifth component extraction unit that extracts an $n^{th}$-order component of said second-axis current;
- a composite value calculation unit that obtains a composite value of said $n^{th}$-order component of said second-axis current;
- a second adder that obtains a sum of said $0^{th}$-order component of said second-axis current and said $n^{th}$-order component of said second-axis current; and
- a magnetic flux command setting unit that sets said primary magnetic flux command on a basis of said sum obtained by said second adder, said current, said field magnetic flux, and inductance of said synchronous motor.

23. A primary magnetic flux command generation device for outputting said primary magnetic flux command used in said method together with said rotational speed command corrected by said speed command correction device according to claim 12, said primary magnetic flux command generation device comprising:
- a fourth component extraction unit that extracts a $0^{th}$-order component of a first-axis current being a component of said current in said first axis;
- a fifth component extraction unit that extracts an $n^{th}$-order component of said first-axis current;
- a composite value calculation unit that obtains a composite value of said $n^{th}$-order component of said first-axis current;
- a second adder that obtains a sum of said $0^{th}$-order component of said first-axis current and said $n^{th}$-order component of said first-axis current; and
- a magnetic flux command setting unit that sets said primary magnetic flux command on a basis of said sum obtained by said second adder, said current, said field magnetic flux, and inductance of said synchronous motor.

24. A primary magnetic flux command generation device for outputting said primary magnetic flux command used in said method together with said rotational speed command corrected by said speed command correction device according to claim 12, said primary magnetic flux command generation device comprising:
- a fourth component extraction unit that extracts a $0^{th}$-order component of a load angle being a phase difference of a phase of said primary magnetic flux from a phase of said field magnetic flux;
- a fifth component extraction unit that extracts an $n^{th}$-order component of said load angle;
- a composite value calculation unit that obtains a composite value of said $n^{th}$-order component of said load angle;
- a second adder that obtains a sum of said $0^{th}$-order component of said load angle and said $n^{th}$-order component of said load angle; and
- a magnetic flux command setting unit that sets said primary magnetic flux command on a basis of said sum obtained by said second adder, said current, said field magnetic flux, and inductance of said synchronous motor.

25. A primary magnetic flux command generation device for outputting said primary magnetic flux command used in said method together with said rotational speed command corrected by said speed command correction device according to claim 1, said primary magnetic flux command generation device comprising:
- a fourth component extraction unit that extracts a $0^{th}$-order component of output torque of said synchronous motor;
- a fifth component extraction unit that extracts an $n^{th}$-order component of said output torque;
- a composite value calculation unit that obtains a composite value of said $n^{th}$-order component of said output torque;
- a second adder that obtains a sum of said $0^{th}$-order component of said output torque and said $n^{th}$-order component of said output torque; and
- a magnetic flux command setting unit that sets said primary magnetic flux command on a basis of said sum obtained by said second adder, said current, said field magnetic flux, and inductance of said synchronous motor.

\* \* \* \* \*